US011676232B2

(12) United States Patent
Watkins, Jr.

(10) Patent No.: US 11,676,232 B2
(45) **Date of Patent: *Jun. 13, 2023**

(54) APPARATUS FOR IMPROVING APPLICANT SELECTION BASED ON PERFORMANCE INDICES

(71) Applicant: East Carolina University, Greenville, NC (US)

(72) Inventor: Robert Todd Watkins, Jr., Chapel Hill, NC (US)

(73) Assignee: East Carolina University, Greenville, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/306,289

(22) Filed: May 3, 2021

(65) Prior Publication Data

US 2021/0256643 A1 Aug. 19, 2021

Related U.S. Application Data

(63) Continuation of application No. 16/116,177, filed on Aug. 29, 2018, now Pat. No. 11,010,849.
(Continued)

(51) Int. Cl.
*G06Q 10/0639* (2023.01)
*G06Q 50/20* (2012.01)
(Continued)

(52) U.S. Cl.
CPC ....... *G06Q 50/2053* (2013.01); *G06F 16/901* (2019.01); *G06F 16/904* (2019.01);
(Continued)

(58) Field of Classification Search
None
See application file for complete search history.

(56) References Cited

U.S. PATENT DOCUMENTS 6,789,047 B1 * 9/2004 Woodson ......... G06Q 10/06398 434/350
6,877,987 B2 4/2005 Kulack
(Continued)

FOREIGN PATENT DOCUMENTS

JP 11296061 10/1999
JP 2005157621 6/2005
(Continued)

OTHER PUBLICATIONS

"Insights & Impact" Using Teacher Effectiveness Data in Meaningful Ways, WestEd, pp. 1-7 (Year: 2016).*
(Continued)

*Primary Examiner* — Romain Jeanty
(74) *Attorney, Agent, or Firm* — Myers Bigel, P.A.

(57) ABSTRACT

Systems, methods, and computer program products for determining an application status of an applicant for an educational program may include receiving cohort performance data comprising first data entries for participants that have respectively achieved outcomes for the educational program and applicant performance data comprising second data entries for the applicant, calculating adjusted cohort performance data based on the cohort performance data and first data characteristics, providing a predictor model based on the adjusted cohort performance data and the outcomes, sequentially changing predictive parameters of the first data characteristics to create second data characteristics and creating an adjusted predictor model based on the second data characteristics and the outcomes, calculating adjusted applicant performance data based on the applicant performance data and the second data characteristics, and calculating a probability of success for the applicant in the educational program based on the adjusted applicant performance data and the adjusted predictor model.

21 Claims, 59 Drawing Sheets

Related U.S. Application Data

(60) Provisional application No. 62/552,707, filed on Aug. 31, 2017.

(51) Int. Cl.

| | |
|---|---|
| ***G06F 17/18*** | (2006.01) |
| ***G06F 16/901*** | (2019.01) |
| ***G06F 16/904*** | (2019.01) |
| ***G06F 16/906*** | (2019.01) |

(52) U.S. Cl.

CPC ............ *G06F 16/906* (2019.01); *G06F 17/18* (2013.01); *G06Q 10/0639* (2013.01)

(56) References Cited

U.S. PATENT DOCUMENTS

| | | | | |
|---|---|---|---|---|
| 8,412,736 | B1 | 4/2013 | Arnold et al. | |
| 8,812,960 | B1 | 8/2014 | Sun et al. | |
| 10,878,359 | B2 | 12/2020 | Watkins | |
| 10,878,711 | B2 | 12/2020 | Watkins | |
| 11,170,658 | B2 | 11/2021 | Watkins | |
| 2003/0180698 | A1 | 9/2003 | Salerian | |
| 2004/0180317 | A1* | 9/2004 | Bodner | G09B 7/00 434/353 |
| 2005/0196742 | A1 | 9/2005 | Harber | |
| 2006/0147890 | A1 | 7/2006 | Bradford et al. | |
| 2006/0282306 | A1 | 12/2006 | Thissen-Roe | |
| 2006/0286539 | A1 | 12/2006 | Tidwell-Scheuring | |
| 2007/0031801 | A1 | 2/2007 | Tidwell-Scheuring | |
| 2008/0187898 | A1 | 8/2008 | Hattie | |
| 2009/0280460 | A1 | 11/2009 | Yaskin | |
| 2010/0316986 | A1 | 12/2010 | De La Chica | |
| 2012/0141968 | A1 | 6/2012 | Li | |
| 2012/0208168 | A1 | 8/2012 | Atkinson | |
| 2013/0096892 | A1 | 4/2013 | Essa et al. | |
| 2013/0280690 | A1 | 10/2013 | Menon et al. | |
| 2015/0050637 | A1 | 2/2015 | James-Hatter et al. | |
| 2016/0217701 | A1 | 7/2016 | Brown et al. | |
| 2017/0032558 | A1 | 2/2017 | Mason, Jr. et al. | |
| 2017/0069215 | A1 | 3/2017 | Borofsky et al. | |
| 2017/0323211 | A1* | 11/2017 | Bencke | G06Q 10/00 |
| 2019/0114937 | A1* | 4/2019 | Capps | G06Q 10/0639 |

FOREIGN PATENT DOCUMENTS

| | | |
|---|---|---|
| JP | 2008310787 | 12/2008 |
| KR | 20090096040 | 9/2009 |
| KR | 20100042636 | 4/2010 |
| KR | 101009380 B1 | 1/2011 |
| WO | 2010066003 | 6/2010 |

OTHER PUBLICATIONS

Chinese 2nd Office Action, dated Sep. 5, 2016, for corresponding Chinese Application No. 201280014075.4, including English translation (30 pages).

Examiner's Report, dated Aug. 21, 2018, for corresponding Canadian Application No. 2,830,075 (8 pages).

Extended European Search Report, dated Jul. 8, 2014, for corresponding European Application No. 12760399.1 (6 pages).

Notice of Final Rejection, dated Jul. 27, 2018, for corresponding Korean Application No. 10-2013-7027083, including English translation (12 pages).

Notice of Preliminary Rejection, dated Jan. 18, 2018, for corresponding Korean Application No. 10-2013-7027083, including English translation (28 pages).

PCT Search Report and Written Opinion, dated Nov. 30, 2012, for corresponding PCT International Application No. PCT/US2012/030037 (10 pages).

* cited by examiner

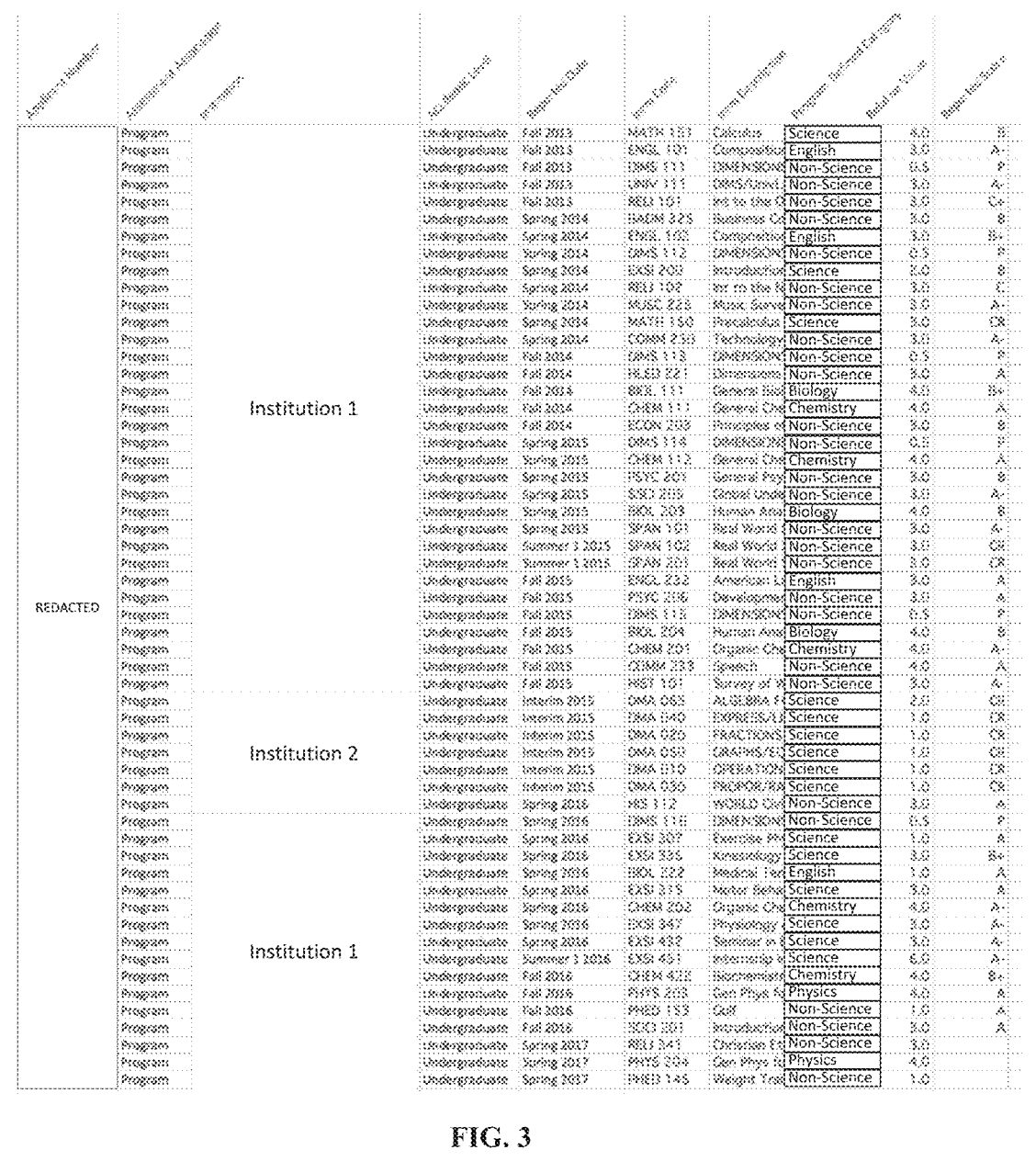

| [illegible] | [illegible] | [illegible] | [illegible] | [illegible] | [illegible] | [illegible] | [illegible] | [illegible] | [illegible] |
|---|---|---|---|---|---|---|---|---|---|
| REDACTED | Program | Institution 1 | Undergraduate | Fall 2013 | MATH 151 | Calculus | Science | 4.0 | B |
| | Program | | Undergraduate | Fall 2013 | ENGL 101 | Compositio | English | 3.0 | A- |
| | Program | | Undergraduate | Fall 2013 | DIMS 111 | DIMENSION | Non-Science | 0.5 | P |
| | Program | | Undergraduate | Fall 2013 | UNIV 111 | DIMS/Univ | Non-Science | 3.0 | A- |
| | Program | | Undergraduate | Fall 2013 | RELI 101 | Int to the O | Non-Science | 3.0 | C+ |
| | Program | | Undergraduate | Spring 2014 | BADM 325 | Business Co | Non-Science | 3.0 | B |
| | Program | | Undergraduate | Spring 2014 | ENGL 102 | Compositio | English | 3.0 | B+ |
| | Program | | Undergraduate | Spring 2014 | DIMS 112 | DIMENSION | Non-Science | 0.5 | P |
| | Program | | Undergraduate | Spring 2014 | EXSI 200 | Introductio | Science | 3.0 | B |
| | Program | | Undergraduate | Spring 2014 | RELI 102 | Int to the N | Non-Science | 3.0 | C |
| | Program | | Undergraduate | Spring 2014 | MUSC 223 | Music Surve | Non-Science | 3.0 | A- |
| | Program | | Undergraduate | Spring 2014 | MATH 150 | Precalculus | Science | 3.0 | CR |
| | Program | | Undergraduate | Spring 2014 | COMM 230 | Technology | Non-Science | 3.0 | A- |
| | Program | | Undergraduate | Fall 2014 | DIMS 113 | DIMENSION | Non-Science | 0.5 | P |
| | Program | | Undergraduate | Fall 2014 | HLED 221 | Dimensions | Non-Science | 3.0 | A |
| | Program | | Undergraduate | Fall 2014 | BIOL 111 | General Bio | Biology | 4.0 | B+ |
| | Program | | Undergraduate | Fall 2014 | CHEM 111 | General Che | Chemistry | 4.0 | A |
| | Program | | Undergraduate | Fall 2014 | ECON 203 | Principles of | Non-Science | 3.0 | B |
| | Program | | Undergraduate | Spring 2015 | DIMS 114 | DIMENSION | Non-Science | 0.5 | P |
| | Program | | Undergraduate | Spring 2015 | CHEM 112 | General Che | Chemistry | 4.0 | A |
| | Program | | Undergraduate | Spring 2015 | PSYC 201 | General Psy | Non-Science | 3.0 | B |
| | Program | | Undergraduate | Spring 2015 | SSCI 205 | Global Unde | Non-Science | 3.0 | A- |
| | Program | | Undergraduate | Spring 2015 | BIOL 203 | Human Ana | Biology | 4.0 | B |
| | Program | | Undergraduate | Spring 2015 | SPAN 101 | Real World | Non-Science | 3.0 | A- |
| | Program | | Undergraduate | Summer 1 2015 | SPAN 102 | Real World | Non-Science | 3.0 | CR |
| | Program | | Undergraduate | Summer 1 2015 | SPAN 201 | Real World | Non-Science | 3.0 | CR |
| | Program | | Undergraduate | Fall 2015 | ENGL 232 | American Li | English | 3.0 | A |
| | Program | | Undergraduate | Fall 2015 | PSYC 206 | Developme | Non-Science | 3.0 | A |
| | Program | | Undergraduate | Fall 2015 | DIMS 115 | DIMENSION | Non-Science | 0.5 | P |
| | Program | | Undergraduate | Fall 2015 | BIOL 204 | Human Ana | Biology | 4.0 | B |
| | Program | | Undergraduate | Fall 2015 | CHEM 201 | Organic Che | Chemistry | 4.0 | A- |
| | Program | | Undergraduate | Fall 2015 | COMM 233 | Speech | Non-Science | 4.0 | A |
| | Program | | Undergraduate | Fall 2015 | HIST 101 | Survey of W | Non-Science | 3.0 | A- |
| | Program | Institution 2 | Undergraduate | Interim 2015 | DMA 065 | ALGEBRA F | Science | 2.0 | CR |
| | Program | | Undergraduate | Interim 2015 | DMA 040 | EXPRESS/L | Science | 1.0 | CR |
| | Program | | Undergraduate | Interim 2015 | DMA 020 | FRACTIONS | Science | 1.0 | CR |
| | Program | | Undergraduate | Interim 2015 | DMA 050 | GRAPHS/E | Science | 1.0 | CR |
| | Program | | Undergraduate | Interim 2015 | DMA 010 | OPERATION | Science | 1.0 | CR |
| | Program | | Undergraduate | Interim 2015 | DMA 030 | PROPOR/RA | Science | 1.0 | CR |
| | Program | | Undergraduate | Spring 2016 | HIS 112 | WORLD Civ | Non-Science | 3.0 | A |
| | Program | Institution 1 | Undergraduate | Spring 2016 | DIMS 116 | DIMENSION | Non-Science | 0.5 | P |
| | Program | | Undergraduate | Spring 2016 | EXSI 307 | Exercise Ph | Science | 1.0 | A |
| | Program | | Undergraduate | Spring 2016 | EXSI 335 | Kinesiology | Science | 3.0 | B+ |
| | Program | | Undergraduate | Spring 2016 | BIOL 322 | Medical Ter | English | 1.0 | A |
| | Program | | Undergraduate | Spring 2016 | EXSI 315 | Motor Beha | Science | 3.0 | A |
| | Program | | Undergraduate | Spring 2016 | CHEM 202 | Organic Che | Chemistry | 4.0 | A- |
| | Program | | Undergraduate | Spring 2016 | EXSI 347 | Physiology | Science | 3.0 | A- |
| | Program | | Undergraduate | Spring 2016 | EXSI 432 | Seminar in | Science | 3.0 | A- |
| | Program | | Undergraduate | Summer 1 2016 | EXSI 451 | Internship | Science | 6.0 | A- |
| | Program | | Undergraduate | Fall 2016 | CHEM 421 | Biochemist | Chemistry | 4.0 | B+ |
| | Program | | Undergraduate | Fall 2016 | PHYS 203 | Gen Phys | Physics | 4.0 | A |
| | Program | | Undergraduate | Fall 2016 | PHED 153 | Golf | Non-Science | 1.0 | A |
| | Program | | Undergraduate | Fall 2016 | SOCI 201 | Introductio | Non-Science | 3.0 | A |
| | Program | | Undergraduate | Spring 2017 | RELI 341 | Christian E | Non-Science | 3.0 | |
| | Program | | Undergraduate | Spring 2017 | PHYS 204 | Gen Phys | Physics | 4.0 | |
| | Program | | Undergraduate | Spring 2017 | PHED 145 | Weight Trai | Non-Science | 1.0 | |

FIG. 3

| Applicant Number | Assessment Association | Institution | Academic Level | Reported Date | Item Code | Item Description | Program Defined Category | Relative Value | Reported Score |
|---|---|---|---|---|---|---|---|---|---|
| REDACTED | Milestone | AMERICAN DENTAL ASSOCIATION | Undergraduate | 27-Jul-16 | | Biology | | | 16 |
| | Milestone | AMERICAN DENTAL ASSOCIATION | Undergraduate | 27-Jul-16 | | Chemistry Inorganic | | | 15 |
| | Milestone | AMERICAN DENTAL ASSOCIATION | Undergraduate | 27-Jul-16 | | Chemistry Organic | | | 16 |
| | Milestone | AMERICAN DENTAL ASSOCIATION | Undergraduate | 27-Jul-16 | | Quantitative Reasoning | | | 19 |
| | Milestone | AMERICAN DENTAL ASSOCIATION | Undergraduate | 27-Jul-16 | | Reading Comprehension | | | 20 |
| | Milestone | AMERICAN DENTAL ASSOCIATION | Undergraduate | 29-Nov-19 | | Biology | | | 14 |
| | Milestone | AMERICAN DENTAL ASSOCIATION | Undergraduate | 29-Nov-19 | | Chemistry Inorganic | | | 18 |
| | Milestone | AMERICAN DENTAL ASSOCIATION | Undergraduate | 29-Nov-19 | | Chemistry Organic | | | 15 |
| | Milestone | AMERICAN DENTAL ASSOCIATION | Undergraduate | 29-Nov-19 | | Quantitative Reasoning | | | 18 |
| | Milestone | AMERICAN DENTAL ASSOCIATION | Undergraduate | 29-Nov-19 | | Reading Comprehension | | | 20 |

FIG. 4

| | | | | | | | | | |
|---|---|---|---|---|---|---|---|---|---|
| REDACTED | Program | Institution 1 | Undergraduate | Dec-16 | PHYS 203 | Gen Phys fo | Physics | 4.0 | A |
| | Program | | Undergraduate | Dec-16 | PHED 153 | Golf | Non-Science | 1.0 | A |
| | Program | | Undergraduate | Dec-16 | SOCI 201 | Introductio | Non-Science | 3.0 | A |
| | Program | | Undergraduate | Dec-13 | ENGL 101 | Compositio | English | 3.0 | A- |
| | Program | | Undergraduate | Dec-13 | UNIV 111 | DMS/Univl. | Non-Science | 3.0 | A- |
| | Program | | Undergraduate | May-14 | MUSC 225 | Music Surve | Non-Science | 3.0 | A- |
| | Program | | Undergraduate | May-14 | COMM 230 | Technology | Non-Science | 3.0 | A- |
| | Program | | Undergraduate | May-15 | SSCI 205 | Global Unde | Non-Science | 3.0 | A- |
| | Program | | Undergraduate | May-15 | SPAN 101 | Real World | Non-Science | 3.0 | A- |
| | Program | | Undergraduate | May-15 | CHEM 202 | Organic Che | Chemistry | 4.0 | A- |
| | Program | | Undergraduate | May-15 | EXSI 347 | Physiology | Science | 3.0 | A- |
| | Program | | Undergraduate | May-15 | EXSI 432 | Seminar in | Science | 3.0 | A- |
| | Program | | Undergraduate | Dec-15 | CHEM 201 | Organic Che | Chemistry | 4.0 | A- |
| | Program | | Undergraduate | Dec-15 | HIST 101 | Survey of W | Non-Science | 3.0 | A- |
| | Program | | Undergraduate | Jun-16 | EXSI 451 | Internship i | Science | 6.0 | A- |
| | Program | | Undergraduate | Dec-13 | MATH 151 | Calculus | Science | 4.0 | B |
| | Program | | Undergraduate | May-14 | BADM 325 | Business Co | Non-Science | 3.0 | B |
| | Program | | Undergraduate | May-14 | EXSI 200 | Introductio | Science | 2.0 | B |
| | Program | | Undergraduate | Dec-14 | ECON 203 | Principles o | Non-Science | 3.0 | B |
| | Program | | Undergraduate | May-15 | PSYC 201 | General Psy | Non-Science | 3.0 | B |
| | Program | | Undergraduate | May-15 | BIOL 203 | Human Ana | Biology | 4.0 | B |
| | Program | | Undergraduate | Dec-15 | BIOL 204 | Human Ana | Biology | 4.0 | B |
| | Program | | Undergraduate | May-14 | ENGL 102 | Compositio | English | 3.0 | B+ |
| | Program | | Undergraduate | Dec-14 | BIOL 111 | General Bio | Biology | 4.0 | B+ |
| | Program | | Undergraduate | May-15 | EXSI 335 | Kinesiology | Science | 3.0 | B+ |
| | Program | | Undergraduate | Dec-16 | CHEM 423 | Biochemistr | Chemistry | 4.0 | B+ |
| | Program | | Undergraduate | May-14 | RELI 102 | Int to the N | Non-Science | 3.0 | C |
| | Program | | Undergraduate | Dec-13 | RELI 101 | Int to the O | Non-Science | 3.0 | C+ |
| | Program | | Undergraduate | May-14 | MATH 150 | Precalculus | Science | 3.0 | CR |
| | Program | | Undergraduate | Jun-15 | SPAN 102 | Real World | Non-Science | 3.0 | CR |
| | Program | | Undergraduate | Jun-15 | SPAN 201 | Real World | Non-Science | 3.0 | CR |
| | Program | Institution 2 | Undergraduate | Dec-15 | DMA 065 | ALGEBRA F | Science | 2.0 | CR |
| | Program | | Undergraduate | Dec-15 | DMA 040 | EXPRESS/L | Science | 1.0 | CR |
| | Program | | Undergraduate | Dec-15 | DMA 020 | FRACTIONS | Science | 1.0 | CR |
| | Program | | Undergraduate | Dec-15 | DMA 050 | GRAPHS/EQ | Science | 1.0 | CR |
| | Program | | Undergraduate | Dec-15 | DMA 010 | OPERATION | Science | 1.0 | CR |
| | Program | | Undergraduate | Dec-15 | DMA 030 | PROPOR/RA | Science | 1.0 | CR |
| | Program | Institution 1 | Undergraduate | Dec-13 | DMS 111 | DIMENSION | Non-Science | 0.5 | P |
| | Program | | Undergraduate | May-14 | DMS 112 | DIMENSION | Non-Science | 0.5 | P |
| | Program | | Undergraduate | Dec-14 | DMS 113 | DIMENSION | Non-Science | 0.5 | P |
| | Program | | Undergraduate | May-15 | DMS 114 | DIMENSION | Non-Science | 0.5 | P |
| | Program | | Undergraduate | May-15 | DMS 116 | DIMENSION | Non-Science | 0.5 | P |
| | Program | | Undergraduate | Dec-15 | DMS 115 | DIMENSION | Non-Science | 0.5 | P |
| | Program | | Undergraduate | May-17 | RELI 341 | Christian Et | Non-Science | 3.0 | |
| | Program | | Undergraduate | May-17 | PHYS 204 | Gen Phys fo | Physics | 4.0 | |
| | Program | | Undergraduate | May-17 | PHED 145 | Weight Tra | Non-Science | 1.0 | |

FIG. 6

| Applicant Number | Assessment Association | Institution | Academic Level | Date | Item Code | Item Description | Program-Defined Category | Relative Value | Reported Score |
|---|---|---|---|---|---|---|---|---|---|
| REDACTED | Program | Institution 1 | Undergraduate | May-15 | BIOL 203 | Human Ana | Biology | 4.0 | B |
| | Program | | Undergraduate | Dec-15 | BIOL 204 | Human Ana | Biology | 4.0 | B |
| | Program | | Undergraduate | Dec-14 | BIOL 111 | General Biol | Biology | 4.0 | B+ |
| | Program | | Undergraduate | Dec-14 | CHEM 111 | General Che | Chemistry | 4.0 | A |
| | Program | | Undergraduate | May-15 | CHEM 112 | General Che | Chemistry | 4.0 | A |
| | Program | | Undergraduate | May-15 | CHEM 202 | Organic Che | Chemistry | 4.0 | A- |
| | Program | | Undergraduate | Dec-15 | CHEM 201 | Organic Che | Chemistry | 4.0 | A- |
| | Program | | Undergraduate | Dec-16 | CHEM 422 | Biochemistr | Chemistry | 4.0 | B+ |
| | Program | | Undergraduate | May-15 | BIOL 222 | Medical Ter | English | 1.0 | A |
| | Program | | Undergraduate | Dec-15 | ENGL 232 | American L | English | 3.0 | A |
| | Program | | Undergraduate | Dec-13 | ENGL 101 | Compositio | English | 3.0 | A- |
| | Program | | Undergraduate | May-14 | ENGL 102 | Compositio | English | 3.0 | B+ |
| | Program | | Undergraduate | Dec-14 | HLED 221 | Dimensions | Non-Science | 3.0 | A |
| | Program | | Undergraduate | May-15 | HIS 112 | WORLD Civ | Non-Science | 3.0 | A |
| | Program | | Undergraduate | Dec-15 | PSYC 206 | Developme | Non-Science | 3.0 | A |
| | Program | | Undergraduate | Dec-15 | COMM 233 | Speech | Non-Science | 4.0 | A |
| | Program | | Undergraduate | Dec-16 | PHED 153 | Golf | Non-Science | 1.0 | A |
| | Program | | Undergraduate | Dec-16 | SOCI 201 | Introductio | Non-Science | 3.0 | A |
| | Program | | Undergraduate | Dec-13 | UNIV 111 | DIMS/UnivL | Non-Science | 3.0 | A- |
| | Program | | Undergraduate | May-14 | MUSC 225 | Music Surve | Non-Science | 3.0 | A- |
| | Program | | Undergraduate | May-14 | COMM 230 | Technology | Non-Science | 3.0 | A- |
| | Program | | Undergraduate | May-15 | SSCI 205 | Global Unde | Non-Science | 3.0 | A- |
| | Program | | Undergraduate | May-15 | SPAN 101 | Real World | Non-Science | 3.0 | A- |
| | Program | | Undergraduate | Dec-15 | HIST 101 | Survey of W | Non-Science | 3.0 | A- |
| | Program | | Undergraduate | May-14 | BADM 325 | Business Co | Non-Science | 3.0 | B |
| | Program | | Undergraduate | Dec-14 | ECON 203 | Principles o | Non-Science | 3.0 | B |
| | Program | | Undergraduate | May-15 | PSYC 201 | General Psy | Non-Science | 3.0 | B |
| | Program | | Undergraduate | May-14 | RELI 102 | Int to the N | Non-Science | 3.0 | C |
| | Program | | Undergraduate | Dec-13 | RELI 101 | Int to the O | Non-Science | 3.0 | C+ |
| | Program | | Undergraduate | Dec-16 | PHYS 203 | Gen Phys fo | Physics | 4.0 | A |
| | Program | | Undergraduate | May-15 | EXSI 307 | Exercise Phy | Science | 1.0 | A |
| | Program | | Undergraduate | May-15 | EXSI 315 | Motor Beha | Science | 3.0 | A |
| | Program | | Undergraduate | May-15 | EXSI 347 | Physiology o | Science | 3.0 | A- |
| | Program | | Undergraduate | May-15 | EXSI 433 | Seminar in E | Science | 3.0 | A- |
| | Program | | Undergraduate | Jun-16 | EXSI 451 | Internship ir | Science | 6.0 | A- |
| | Program | | Undergraduate | Dec-13 | MATH 151 | Calculus | Science | 4.0 | B |
| | Program | | Undergraduate | May-14 | EXSI 200 | Introductior | Science | 2.0 | B |
| | Program | | Undergraduate | May-15 | EXSI 335 | Kinesiology | Science | 3.0 | B+ |

FIG. 7

| Applicant Number | Institutional Association | Institution | Academic Level | Date | Item Code | Item Description | Program Defined Category | Relative Value | Reported Score |
|---|---|---|---|---|---|---|---|---|---|
| REDACTED | Program | Institution 1 | Undergraduate | Dec-16 | CHEM 422 | Biochemistry | Chemistry | 4.0 | B+ |
| | Program | | Undergraduate | May-15 | BIOL 222 | Medical Terminology | Non-Science | 1.0 | A |
| | Program | | Undergraduate | Dec-15 | ENGL 232 | American Lit Survey II A2 | Non-Science | 3.0 | A |
| | Program | | Undergraduate | Dec-13 | ENGL 101 | Composition I | Non-Science | 3.0 | A- |
| | Program | | Undergraduate | May-14 | ENGL 102 | Composition II | Non-Science | 3.0 | B+ |
| | Program | | Undergraduate | Dec-14 | HLED 221 | Dimensions of Personal Health | Non-Science | 3.0 | A |
| | Program | | Undergraduate | May-15 | HIS 112 | WORLD CivilizationS II | Non-Science | 3.0 | A |
| | Program | | Undergraduate | Dec-15 | PSYC 206 | Developmental Psychology | Non-Science | 3.0 | A |
| | Program | | Undergraduate | Dec-15 | COMM 233 | Speech | Non-Science | 4.0 | A |
| | Program | | Undergraduate | Dec-16 | PHED 113 | Golf | Non-Science | 1.0 | A |
| | Program | | Undergraduate | Dec-16 | SOCI 201 | Introduction to Sociology | Non-Science | 3.0 | A |
| | Program | | Undergraduate | Dec-13 | UNIV 111 | DIMS/UnivLife in Global Soci | Non-Science | 3.0 | A- |
| | Program | | Undergraduate | May-14 | MUSC 225 | Music Survey | Non-Science | 3.0 | A- |
| | Program | | Undergraduate | May-14 | COMM 230 | Technology & American Society | Non-Science | 3.0 | A- |
| | Program | | Undergraduate | May-15 | SSO 205 | Global Understanding | Non-Science | 3.0 | A- |
| | Program | | Undergraduate | May-15 | SPAN 101 | Real World Spanish; Get Ready! | Non-Science | 3.0 | A- |
| | Program | Institution 2 | Undergraduate | Dec-15 | HIST 101 | Survey of Western Civilization I | Non-Science | 3.0 | A- |
| | Program | | Undergraduate | May-14 | BADM 325 | Business Communications Appl | Non-Science | 3.0 | B |
| | Program | | Undergraduate | Dec-14 | ECON 303 | Principles of Economics I | Non-Science | 3.0 | B |
| | Program | | Undergraduate | May-15 | PSYC 201 | General Psychology | Non-Science | 3.0 | B |
| | Program | | Undergraduate | May-14 | RELI 102 | Int to the New Testament | Non-Science | 3.0 | C |
| | Program | | Undergraduate | Dec-13 | RELI 101 | Int to the Old Testament | Non-Science | 3.0 | C+ |
| | Program | | Undergraduate | Dec-16 | PHYS 203 | Gen Phys for Scientist/Eng I | Science | 4.0 | A |
| | Program | | Undergraduate | May-15 | EXSI 307 | Exercise Physiology Lab | Science | 1.0 | A |
| | Program | | Undergraduate | May-15 | EXSI 315 | Motor Behavior | Science | 3.0 | A |
| | Program | | Undergraduate | May-15 | EXSI 347 | Physiology of Sport/Exercise | Science | 3.0 | A- |
| | Program | | Undergraduate | May-15 | EXSI 432 | Seminar in Exercise Science | Science | 3.0 | A- |
| | Program | | Undergraduate | Jun-16 | EXSI 451 | Internship in Exercise Science | Science | 6.0 | A- |
| | Program | | Undergraduate | Dec-13 | MATH 151 | Calculus | Science | 4.0 | B |
| | Program | | Undergraduate | May-14 | EXSI 200 | Introduction to Exercise Sci | Science | 2.0 | B |
| | Program | | Undergraduate | May-15 | EXSI 333 | Kinesiology | Science | 3.0 | B+ |
| | Milestone | AMERICAN DENTAL ASSOCIATION | Undergraduate | Nov-17 | | Biology | | | 14 |
| | Milestone | AMERICAN DENTAL ASSOCIATION | Undergraduate | Jul-17 | | Chemistry Inorganic | | | 15 |
| | Milestone | AMERICAN DENTAL ASSOCIATION | Undergraduate | Nov-17 | | Chemistry Organic | | | 15 |
| | Milestone | AMERICAN DENTAL ASSOCIATION | Undergraduate | Jul-17 | | Biology | | | 16 |
| | Milestone | AMERICAN DENTAL ASSOCIATION | Undergraduate | Jul-17 | | Chemistry Organic | | | 18 |
| | Milestone | AMERICAN DENTAL ASSOCIATION | Undergraduate | Nov-17 | | Chemistry Inorganic | | | 18 |
| | Milestone | AMERICAN DENTAL ASSOCIATION | Undergraduate | Nov-17 | | Quantitative Reasoning | | | 18 |
| | Milestone | AMERICAN DENTAL ASSOCIATION | Undergraduate | Jul-17 | | Quantitative Reasoning | | | 19 |
| | Milestone | AMERICAN DENTAL ASSOCIATION | Undergraduate | Jul-17 | | Reading Comprehension | | | 20 |
| | Milestone | AMERICAN DENTAL ASSOCIATION | Undergraduate | Nov-17 | | Reading Comprehension | | | 20 |

FIG. 8

| Applicant Identifier | Assessment Association | Institution | Academic Level | Date | Item Code | Item Description | Program-Defined Category | Relative Value | Reported Score |
|---|---|---|---|---|---|---|---|---|---|
| REDACTED | Program | Institution 1 | Undergraduate | Dec-15 | CHEM 422 | Biochemistry | Chemistry | 4.0 | B+ |
| | Program | | Undergraduate | May-15 | BIOL 222 | Medical Terminology | Non-Science | 1.0 | A |
| | Program | | Undergraduate | Dec-15 | ENGL 232 | American Lit Survey II A2 | Non-Science | 3.0 | A |
| | Program | | Undergraduate | Dec-13 | ENGL 101 | Composition I | Non-Science | 3.0 | A- |
| | Program | | Undergraduate | May-14 | ENGL 102 | Composition II | Non-Science | 3.0 | B+ |
| | Program | | Undergraduate | Dec-14 | HLED 221 | Dimensions of Personal Health | Non-Science | 3.0 | A |
| | Program | | Undergraduate | May-15 | HIS 112 | WORLD CivilizationS II | Non-Science | 3.0 | A |
| | Program | | Undergraduate | Dec-15 | PSYC 206 | Developmental Psychology | Non-Science | 3.0 | A |
| | Program | | Undergraduate | Dec-15 | COMM 233 | Speech | Non-Science | 4.0 | A |
| | Program | | Undergraduate | Dec-16 | PHED 153 | Golf | Non-Science | 1.0 | A |
| | Program | | Undergraduate | Dec-15 | SOCI 201 | Introduction to Sociology | Non-Science | 3.0 | A |
| | Program | | Undergraduate | Dec-13 | UNIV 111 | DIMS&UnivLife in Global Soci | Non-Science | 3.0 | A- |
| | Program | | Undergraduate | May-14 | MUSC 225 | Music Survey | Non-Science | 3.0 | A- |
| | Program | | Undergraduate | May-14 | COMM 230 | Technology & American Society | Non-Science | 3.0 | A- |
| | Program | | Undergraduate | May-15 | SSCI 205 | Global Understanding | Non-Science | 3.0 | A- |
| | Program | | Undergraduate | May-15 | SPAN 101 | Real World Spanish: Get Ready! | Non-Science | 3.0 | A- |
| | Program | Institution 2 | Undergraduate | Dec-15 | HIST 101 | Survey of Western Civilization I | Non-Science | 3.0 | A- |
| | Program | | Undergraduate | May-14 | BADM 325 | Business Communications Appl | Non-Science | 3.0 | B |
| | Program | | Undergraduate | Dec-14 | ECON 203 | Principles of Economics I | Non-Science | 3.0 | B |
| | Program | | Undergraduate | May-15 | PSYC 201 | General Psychology | Non-Science | 3.0 | B |
| | Program | | Undergraduate | May-14 | RELI 102 | Int to the New Testament | Non-Science | 3.0 | C |
| | Program | | Undergraduate | Dec-13 | RELI 101 | Int to the Old Testament | Non-Science | 3.0 | C+ |
| | Program | | Undergraduate | Dec-15 | PHYS 203 | Gen Phys for Scientist/Eng I | Science | 4.0 | A |
| | Program | | Undergraduate | May-15 | EXSI 307 | Exercise Physiology Lab | Science | 1.0 | A |
| | Program | | Undergraduate | May-15 | EXSI 315 | Motor Behavior | Science | 3.0 | A |
| | Program | | Undergraduate | May-15 | EXSI 347 | Physiology of Sport/Exercise | Science | 3.0 | A- |
| | Program | | Undergraduate | May-15 | EXSI 432 | Seminar in Exercise Science | Science | 3.0 | A- |
| | Program | | Undergraduate | Jun-16 | EXSI 491 | Internship in Exercise Science | Science | 6.0 | A- |
| | Program | | Undergraduate | Dec-13 | MATH 151 | Calculus | Science | 4.0 | B |
| | Program | | Undergraduate | May-14 | EXSI 200 | Introduction to Exercise Sci | Science | 2.0 | B |
| | Program | | Undergraduate | May-15 | EXSI 335 | Kinesiology | Science | 3.0 | B+ |
| | Milestone | AMERICAN DENTAL ASSOCIATION | Undergraduate | Nov-17 | DAT BIOL | Biology | Biology | | 14 |
| | Milestone | AMERICAN DENTAL ASSOCIATION | Undergraduate | Jul-17 | DAT CHEM | Chemistry Inorganic | Chemistry | | 15 |
| | Milestone | AMERICAN DENTAL ASSOCIATION | Undergraduate | Nov-17 | DAT CHEM | Chemistry Organic | Chemistry | | 15 |
| | Milestone | AMERICAN DENTAL ASSOCIATION | Undergraduate | Jul-17 | DAT BIOL | Biology | Biology | | 16 |
| | Milestone | AMERICAN DENTAL ASSOCIATION | Undergraduate | Jul-17 | DAT CHEM | Chemistry Organic | Chemistry | | 16 |
| | Milestone | AMERICAN DENTAL ASSOCIATION | Undergraduate | Nov-17 | DAT CHEM | Chemistry Inorganic | Chemistry | | 18 |
| | Milestone | AMERICAN DENTAL ASSOCIATION | Undergraduate | Nov-17 | DAT QUANT | Quantitative Reasoning | Science | | 18 |
| | Milestone | AMERICAN DENTAL ASSOCIATION | Undergraduate | Jul-17 | DAT QUANT | Quantitative Reasoning | Science | | 19 |
| | Milestone | AMERICAN DENTAL ASSOCIATION | Undergraduate | Jul-17 | DAT READ | Reading Comprehension | Non-Science | | 20 |
| | Milestone | AMERICAN DENTAL ASSOCIATION | Undergraduate | Nov-17 | DAT READ | Reading Comprehension | Non-Science | | 20 |

FIG. 9

| Applicant Number | Assessment Association | Institution | Academic Level | Date | Item Code | Item Description | Program-Defined Category | Relative Value | Reported Score |
|---|---|---|---|---|---|---|---|---|---|
| REDACTED | Program | Institution 1 | Undergraduate | May-15 | BIOL 223 | Medical Terminology | Non-Science | 1.0 | A |
| | Program | | Undergraduate | Dec-15 | ENGL 232 | American Lit Survey II A2 | Non-Science | 3.0 | A |
| | Program | | Undergraduate | Dec-13 | ENGL 101 | Composition I | Non-Science | 3.0 | A- |
| | Program | | Undergraduate | May-14 | ENGL 102 | Composition II | Non-Science | 3.0 | B+ |
| | Program | | Undergraduate | Dec-14 | HLED 221 | Dimensions of Personal Health | Non-Science | 3.0 | A |
| | Program | | Undergraduate | May-15 | HIS 112 | WORLD CivilizationS II | Non-Science | 3.0 | A |
| | Program | | Undergraduate | Dec-15 | PSYC 206 | Developmental Psychology | Non-Science | 3.0 | A |
| | Program | | Undergraduate | Dec-15 | COMM 233 | Speech | Non-Science | 4.0 | A |
| | Program | | Undergraduate | Dec-16 | PHED 153 | Golf | Non-Science | 1.0 | A |
| | Program | | Undergraduate | Dec-16 | SOCI 201 | Introduction to Sociology | Non-Science | 3.0 | A |
| | Program | | Undergraduate | Dec-13 | UNIV 111 | DIMS/UnivLife in Global Soci | Non-Science | 3.0 | A- |
| | Program | | Undergraduate | May-14 | MUSC 225 | Music Survey | Non-Science | 3.0 | A- |
| | Program | | Undergraduate | May-14 | COMM 230 | Technology & American Society | Non-Science | 3.0 | A- |
| | Program | | Undergraduate | May-15 | SSCI 205 | Global Understanding | Non-Science | 3.0 | A- |
| | Program | Institution 2 | Undergraduate | May-13 | SPAN 101 | Real World Spanish: Get Ready! | Non-Science | 3.0 | A- |
| | Program | | Undergraduate | Dec-15 | HIST 101 | Survey of Western Civilization I | Non-Science | 3.0 | A- |
| | Program | | Undergraduate | May-14 | BADM 325 | Business Communications Appl | Non-Science | 3.0 | B |
| | Program | | Undergraduate | Dec-14 | ECON 203 | Principles of Economics I | Non-Science | 3.0 | B |
| | Program | | Undergraduate | May-15 | PSYC 201 | General Psychology | Non-Science | 3.0 | B |
| | Program | | Undergraduate | May-14 | RELI 102 | Int to the New Testament | Non-Science | 3.0 | C |
| | Program | | Undergraduate | Dec-13 | RELI 101 | Int to the Old Testament | Non-Science | 3.0 | C+ |
| | Program | | Undergraduate | Dec-16 | PHYS 203 | Gen Phys for Scientist/Eng I | Science | 4.0 | A |
| | Program | | Undergraduate | May-15 | EXSI 307 | Exercise Physiology Lab | Science | 1.0 | A |
| | Program | | Undergraduate | May-15 | EXSI 315 | Motor Behavior | Science | 3.0 | A |
| | Program | | Undergraduate | May-15 | EXSI 347 | Physiology of Sport/Exercise | Science | 3.0 | A- |
| | Program | | Undergraduate | May-15 | EXSI 432 | Seminar in Exercise Science | Science | 3.0 | A- |
| | Program | | Undergraduate | Jun-16 | EXSI 451 | Internship in Exercise Science | Science | 6.0 | A- |
| | Program | | Undergraduate | Dec-13 | MATH 151 | Calculus | Science | 4.0 | B |
| | Program | | Undergraduate | May-14 | EXSI 200 | Introduction to Exercise Sci | Science | 2.0 | B |
| | Program | | Undergraduate | May-15 | EXSI 335 | Kinesiology | Science | 3.0 | B+ |
| | Milestone | AMERICAN DENTAL ASSOCIATION | Undergraduate | Nov-17 | DAT BIOL | Biology | Biology | | 14 |
| | Milestone | AMERICAN DENTAL ASSOCIATION | Undergraduate | Jul-17 | DAT CHEM | Chemistry Inorganic | Chemistry | | 15 |
| | Milestone | AMERICAN DENTAL ASSOCIATION | Undergraduate | Nov-17 | DAT CHEM | Chemistry Organic | Chemistry | | 15 |
| | Milestone | AMERICAN DENTAL ASSOCIATION | Undergraduate | Jul-17 | DAT BIOL | Biology | Biology | | 16 |
| | Milestone | AMERICAN DENTAL ASSOCIATION | Undergraduate | Jul-17 | DAT CHEM | Chemistry Organic | Chemistry | | 16 |
| | Milestone | AMERICAN DENTAL ASSOCIATION | Undergraduate | Nov-17 | DAT CHEM | Chemistry Inorganic | Chemistry | | 18 |
| | Milestone | AMERICAN DENTAL ASSOCIATION | Undergraduate | Nov-17 | DAT QUANT | Quantitative Reasoning | Science | | 18 |
| | Milestone | AMERICAN DENTAL ASSOCIATION | Undergraduate | Jul-17 | DAT QUANT | Quantitative Reasoning | Science | | 19 |
| | Milestone | AMERICAN DENTAL ASSOCIATION | Undergraduate | Jul-17 | DAT READ | Reading Comprehension | Non-Science | | 20 |
| | Milestone | AMERICAN DENTAL ASSOCIATION | Undergraduate | Nov-17 | DAT READ | Reading Comprehension | Non-Science | | 20 |

FIG. 10

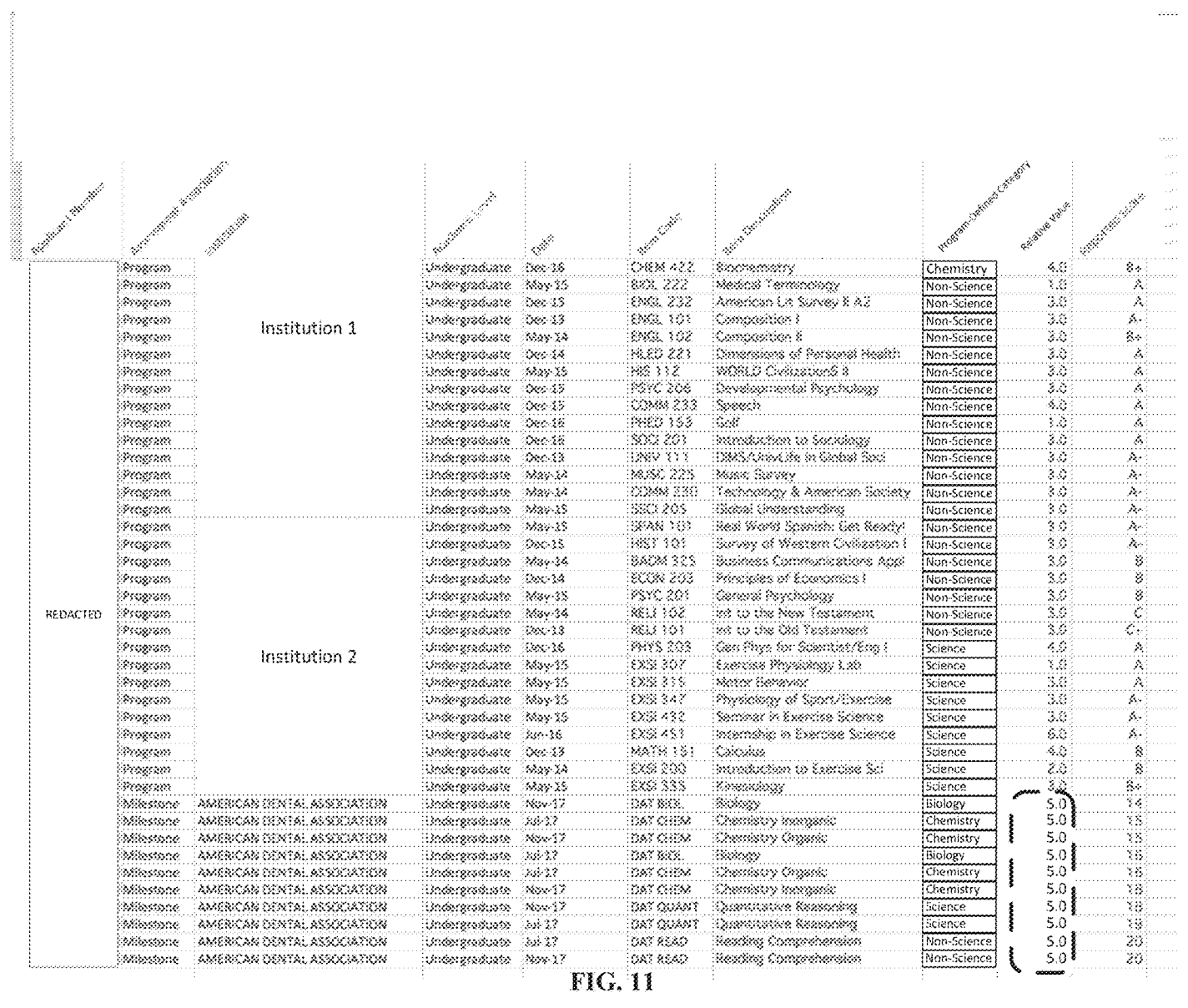

| [illegible] | [illegible] | [illegible] | [illegible] | Date | Item Code | Item Description | Program-Defined Category | Relative Value | [illegible] |
|---|---|---|---|---|---|---|---|---|---|
| REDACTED | Program | Institution 1 | Undergraduate | Dec-16 | CHEM 422 | Biochemistry | Chemistry | 4.0 | B+ |
| | Program | | Undergraduate | May-15 | BIOL 222 | Medical Terminology | Non-Science | 1.0 | A |
| | Program | | Undergraduate | Dec-15 | ENGL 232 | American Lit Survey II A2 | Non-Science | 3.0 | A |
| | Program | | Undergraduate | Dec-13 | ENGL 101 | Composition I | Non-Science | 3.0 | A- |
| | Program | | Undergraduate | May-14 | ENGL 102 | Composition II | Non-Science | 3.0 | B+ |
| | Program | | Undergraduate | Dec-14 | HLED 221 | Dimensions of Personal Health | Non-Science | 3.0 | A |
| | Program | | Undergraduate | May-15 | HIS 112 | WORLD CivilizationS II | Non-Science | 3.0 | A |
| | Program | | Undergraduate | Dec-15 | PSYC 206 | Developmental Psychology | Non-Science | 3.0 | A |
| | Program | | Undergraduate | Dec-15 | COMM 233 | Speech | Non-Science | 4.0 | A |
| | Program | | Undergraduate | Dec-16 | PHED 153 | Golf | Non-Science | 1.0 | A |
| | Program | | Undergraduate | Dec-16 | SOCI 201 | Introduction to Sociology | Non-Science | 3.0 | A |
| | Program | | Undergraduate | Dec-13 | UNIV 111 | DMS/UnivLife in Global Soci | Non-Science | 3.0 | A- |
| | Program | | Undergraduate | May-14 | MUSC 225 | Music Survey | Non-Science | 3.0 | A- |
| | Program | | Undergraduate | May-14 | COMM 230 | Technology & American Society | Non-Science | 3.0 | A- |
| | Program | | Undergraduate | May-15 | SSCI 205 | Global Understanding | Non-Science | 3.0 | A- |
| | Program | Institution 2 | Undergraduate | May-15 | SPAN 101 | Real World Spanish: Get Ready! | Non-Science | 3.0 | A- |
| | Program | | Undergraduate | Dec-15 | HIST 101 | Survey of Western Civilization I | Non-Science | 3.0 | A- |
| | Program | | Undergraduate | May-14 | BADM 325 | Business Communications Appl | Non-Science | 3.0 | B |
| | Program | | Undergraduate | Dec-14 | ECON 203 | Principles of Economics I | Non-Science | 3.0 | B |
| | Program | | Undergraduate | May-15 | PSYC 201 | General Psychology | Non-Science | 3.0 | B |
| | Program | | Undergraduate | May-14 | RELI 102 | Int to the New Testament | Non-Science | 3.0 | C |
| | Program | | Undergraduate | Dec-13 | RELI 101 | Int to the Old Testament | Non-Science | 3.0 | C+ |
| | Program | | Undergraduate | Dec-16 | PHYS 203 | Gen Phys for Scientist/Eng I | Science | 4.0 | A |
| | Program | | Undergraduate | May-15 | EXSI 307 | Exercise Physiology Lab | Science | 1.0 | A |
| | Program | | Undergraduate | May-15 | EXSI 315 | Motor Behavior | Science | 3.0 | A |
| | Program | | Undergraduate | May-15 | EXSI 347 | Physiology of Sport/Exercise | Science | 3.0 | A- |
| | Program | | Undergraduate | May-15 | EXSI 432 | Seminar in Exercise Science | Science | 3.0 | A- |
| | Program | | Undergraduate | Jun-16 | EXSI 451 | Internship in Exercise Science | Science | 6.0 | A- |
| | Program | | Undergraduate | Dec-13 | MATH 151 | Calculus | Science | 4.0 | B |
| | Program | | Undergraduate | May-14 | EXSI 200 | Introduction to Exercise Sci | Science | 2.0 | B |
| | Program | | Undergraduate | May-15 | EXSI 335 | Kinesiology | Science | 3.0 | B+ |
| | Milestone | AMERICAN DENTAL ASSOCIATION | Undergraduate | Nov-17 | DAT BIOL | Biology | Biology | 5.0 | 14 |
| | Milestone | AMERICAN DENTAL ASSOCIATION | Undergraduate | Jul-17 | DAT CHEM | Chemistry Inorganic | Chemistry | 5.0 | 15 |
| | Milestone | AMERICAN DENTAL ASSOCIATION | Undergraduate | Nov-17 | DAT CHEM | Chemistry Organic | Chemistry | 5.0 | 15 |
| | Milestone | AMERICAN DENTAL ASSOCIATION | Undergraduate | Jul-17 | DAT BIOL | Biology | Biology | 5.0 | 16 |
| | Milestone | AMERICAN DENTAL ASSOCIATION | Undergraduate | Jul-17 | DAT CHEM | Chemistry Organic | Chemistry | 5.0 | 16 |
| | Milestone | AMERICAN DENTAL ASSOCIATION | Undergraduate | Nov-17 | DAT CHEM | Chemistry Inorganic | Chemistry | 5.0 | 18 |
| | Milestone | AMERICAN DENTAL ASSOCIATION | Undergraduate | Nov-17 | DAT QUANT | Quantitative Reasoning | Science | 5.0 | 18 |
| | Milestone | AMERICAN DENTAL ASSOCIATION | Undergraduate | Jul-17 | DAT QUANT | Quantitative Reasoning | Science | 5.0 | 19 |
| | Milestone | AMERICAN DENTAL ASSOCIATION | Undergraduate | Jul-17 | DAT READ | Reading Comprehension | Non-Science | 5.0 | 20 |
| | Milestone | AMERICAN DENTAL ASSOCIATION | Undergraduate | Nov-17 | DAT READ | Reading Comprehension | Non-Science | 5.0 | 20 |

FIG. 11

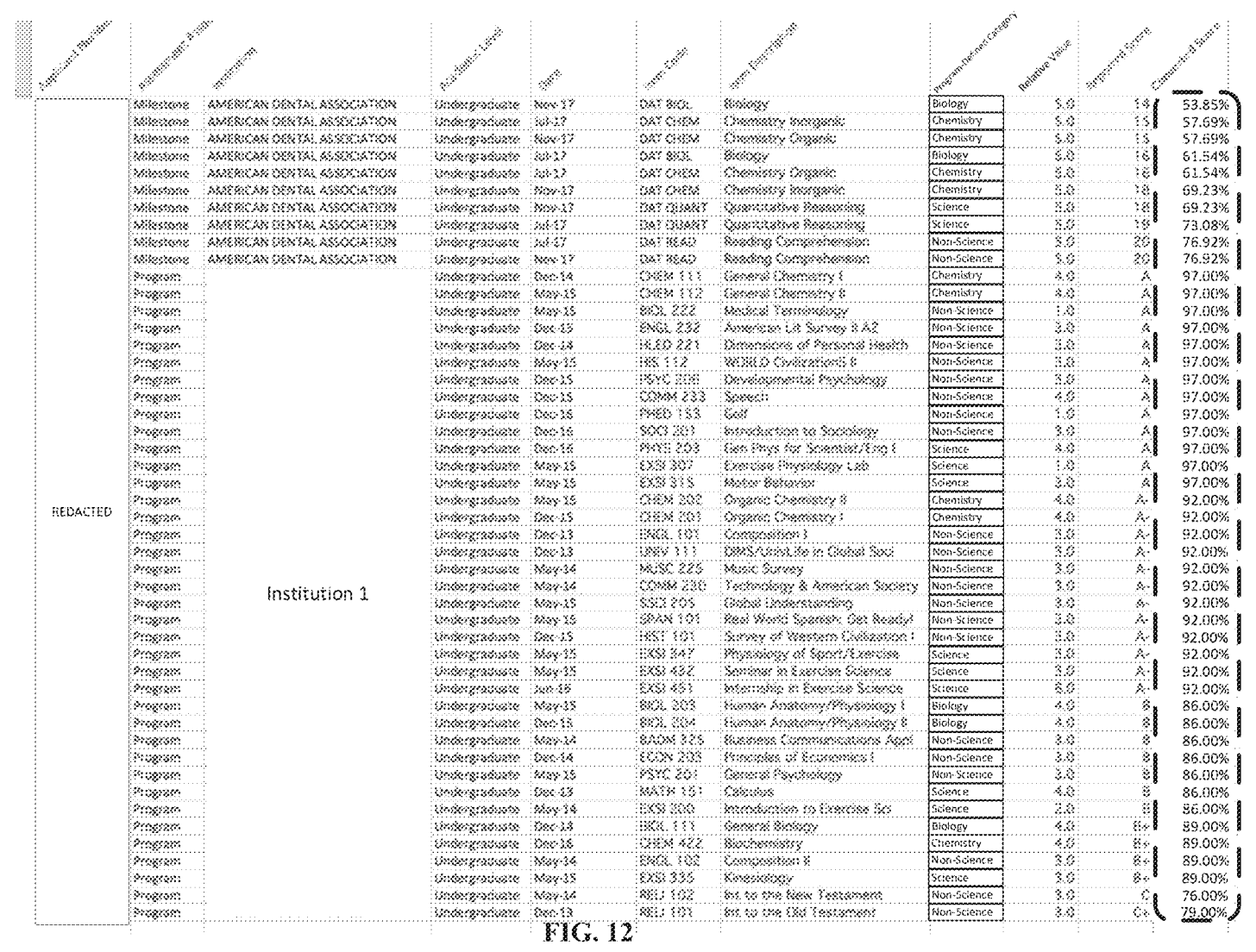

| Applicant Number | Assessment Auth. | Institution | Academic Level | Date | Item Code | Item Description | Program-Defined Category | Relative Value | Suggested Score | Converted Score |
|---|---|---|---|---|---|---|---|---|---|---|
| REDACTED | Milestone | AMERICAN DENTAL ASSOCIATION | Undergraduate | Nov-17 | DAT BIOL | Biology | Biology | 5.0 | 14 | 53.85% |
| | Milestone | AMERICAN DENTAL ASSOCIATION | Undergraduate | Jul-17 | DAT CHEM | Chemistry Inorganic | Chemistry | 5.0 | 15 | 57.69% |
| | Milestone | AMERICAN DENTAL ASSOCIATION | Undergraduate | Nov-17 | DAT CHEM | Chemistry Organic | Chemistry | 5.0 | 15 | 57.69% |
| | Milestone | AMERICAN DENTAL ASSOCIATION | Undergraduate | Jul-17 | DAT BIOL | Biology | Biology | 5.0 | 16 | 61.54% |
| | Milestone | AMERICAN DENTAL ASSOCIATION | Undergraduate | Jul-17 | DAT CHEM | Chemistry Organic | Chemistry | 5.0 | 16 | 61.54% |
| | Milestone | AMERICAN DENTAL ASSOCIATION | Undergraduate | Nov-17 | DAT CHEM | Chemistry Inorganic | Chemistry | 5.0 | 18 | 69.23% |
| | Milestone | AMERICAN DENTAL ASSOCIATION | Undergraduate | Nov-17 | DAT QUANT | Quantitative Reasoning | Science | 5.0 | 18 | 69.23% |
| | Milestone | AMERICAN DENTAL ASSOCIATION | Undergraduate | Jul-17 | DAT QUANT | Quantitative Reasoning | Science | 5.0 | 19 | 73.08% |
| | Milestone | AMERICAN DENTAL ASSOCIATION | Undergraduate | Jul-17 | DAT READ | Reading Comprehension | Non-Science | 5.0 | 20 | 76.92% |
| | Milestone | AMERICAN DENTAL ASSOCIATION | Undergraduate | Nov-17 | DAT READ | Reading Comprehension | Non-Science | 5.0 | 20 | 76.92% |
| | Program | Institution 1 | Undergraduate | Dec-14 | CHEM 111 | General Chemistry I | Chemistry | 4.0 | A | 97.00% |
| | Program | | Undergraduate | May-15 | CHEM 112 | General Chemistry II | Chemistry | 4.0 | A | 97.00% |
| | Program | | Undergraduate | May-15 | BIOL 222 | Medical Terminology | Non-Science | 1.0 | A | 97.00% |
| | Program | | Undergraduate | Dec-15 | ENGL 232 | American Lit Survey II A2 | Non-Science | 3.0 | A | 97.00% |
| | Program | | Undergraduate | Dec-14 | HLED 221 | Dimensions of Personal Health | Non-Science | 3.0 | A | 97.00% |
| | Program | | Undergraduate | May-15 | HIS 112 | WORLD Civilization II | Non-Science | 3.0 | A | 97.00% |
| | Program | | Undergraduate | Dec-15 | PSYC 208 | Developmental Psychology | Non-Science | 3.0 | A | 97.00% |
| | Program | | Undergraduate | Dec-15 | COMM 233 | Speech | Non-Science | 4.0 | A | 97.00% |
| | Program | | Undergraduate | Dec-16 | PHED 153 | Golf | Non-Science | 1.0 | A | 97.00% |
| | Program | | Undergraduate | Dec-16 | SOCI 201 | Introduction to Sociology | Non-Science | 3.0 | A | 97.00% |
| | Program | | Undergraduate | Dec-16 | PHYS 203 | Gen Phys for Scientist/Eng I | Science | 4.0 | A | 97.00% |
| | Program | | Undergraduate | May-15 | EXSI 307 | Exercise Physiology Lab | Science | 1.0 | A | 97.00% |
| | Program | | Undergraduate | May-15 | EXSI 315 | Motor Behavior | Science | 3.0 | A | 97.00% |
| | Program | | Undergraduate | May-15 | CHEM 202 | Organic Chemistry II | Chemistry | 4.0 | A- | 92.00% |
| | Program | | Undergraduate | Dec-15 | CHEM 201 | Organic Chemistry I | Chemistry | 4.0 | A- | 92.00% |
| | Program | | Undergraduate | Dec-13 | ENGL 101 | Composition I | Non-Science | 3.0 | A- | 92.00% |
| | Program | | Undergraduate | Dec-13 | UNIV 111 | DIMS/UnivLife in Global Soci | Non-Science | 3.0 | A- | 92.00% |
| | Program | | Undergraduate | May-14 | MUSC 225 | Music Survey | Non-Science | 3.0 | A- | 92.00% |
| | Program | | Undergraduate | May-14 | COMM 230 | Technology & American Society | Non-Science | 3.0 | A- | 92.00% |
| | Program | | Undergraduate | May-15 | SSCI 205 | Global Understanding | Non-Science | 3.0 | A- | 92.00% |
| | Program | | Undergraduate | May-15 | SPAN 101 | Real World Spanish: Get Ready! | Non-Science | 3.0 | A- | 92.00% |
| | Program | | Undergraduate | Dec-15 | HIST 101 | Survey of Western Civilization I | Non-Science | 3.0 | A- | 92.00% |
| | Program | | Undergraduate | May-15 | EXSI 347 | Physiology of Sport/Exercise | Science | 3.0 | A- | 92.00% |
| | Program | | Undergraduate | May-15 | EXSI 432 | Seminar in Exercise Science | Science | 3.0 | A- | 92.00% |
| | Program | | Undergraduate | Jun-16 | EXSI 451 | Internship in Exercise Science | Science | 6.0 | A- | 92.00% |
| | Program | | Undergraduate | May-15 | BIOL 203 | Human Anatomy/Physiology I | Biology | 4.0 | B | 86.00% |
| | Program | | Undergraduate | Dec-15 | BIOL 204 | Human Anatomy/Physiology II | Biology | 4.0 | B | 86.00% |
| | Program | | Undergraduate | May-14 | BADM 325 | Business Communications Appl | Non-Science | 3.0 | B | 86.00% |
| | Program | | Undergraduate | Dec-14 | ECON 203 | Principles of Economics I | Non-Science | 3.0 | B | 86.00% |
| | Program | | Undergraduate | May-15 | PSYC 201 | General Psychology | Non-Science | 3.0 | B | 86.00% |
| | Program | | Undergraduate | Dec-13 | MATH 151 | Calculus | Science | 4.0 | B | 86.00% |
| | Program | | Undergraduate | May-14 | EXSI 300 | Introduction to Exercise Sci | Science | 2.0 | B | 86.00% |
| | Program | | Undergraduate | Dec-14 | BIOL 111 | General Biology | Biology | 4.0 | B+ | 89.00% |
| | Program | | Undergraduate | Dec-16 | CHEM 422 | Biochemistry | Chemistry | 4.0 | B+ | 89.00% |
| | Program | | Undergraduate | May-14 | ENGL 102 | Composition II | Non-Science | 3.0 | B+ | 89.00% |
| | Program | | Undergraduate | May-15 | EXSI 335 | Kinesiology | Science | 3.0 | B+ | 89.00% |
| | Program | | Undergraduate | May-14 | RELI 102 | Int. to the New Testament | Non-Science | 3.0 | C | 76.00% |
| | Program | | Undergraduate | Dec-13 | RELI 101 | Int. to the Old Testament | Non-Science | 3.0 | C+ | 79.00% |

FIG. 12

| | | |
|---|---|---|
| Institution 1 | MT | 0.80 |
| Institution 2 | MT | 0.75 |
| Institution3 | NC | 1.00 |
| Institution 4 | NC | 1.00 |
| Institution 5 | NC | 1.00 |
| Institution 6 | NC | 1.00 |
| Institution7 | NC | 0.95 |
| Institution 8 | NC | 0.95 |
| Institution 9 | NC | 0.90 |
| Institution 10 | NC | 0.90 |
| Institution 11 | NC | 0.90 |
| Institution 12 | NC | 0.90 |
| Institution 13 | NC | 0.90 |
| Institution 14 | NC | 0.90 |
| Institution 15 | NC | 0.85 |
| Institution 16 | NC | 0.85 |
| Institution 17 | NC | 0.85 |
| Institution 18 | NC | 0.85 |
| Institution 19 | NC | 0.85 |
| Institution 20 | NC | 0.85 |
| Institution 21 | NC | 0.85 |
| Institution 22 | NC | 0.85 |
| Institution 23 | NC | 0.85 |
| Institution 24 | NC | 0.85 |
| Institution 25 | NC | 0.85 |
| Institution 26 | NC | 0.85 |
| Institution 27 | NC | 0.85 |
| Institution 28 | NC | 0.85 |
| Institution 29 | NC | 0.85 |
| Institution 30 | NC | 0.85 |
| Institution 31 | NC | 0.85 |
| Institution 32 | NC | 0.85 |
| Institution 33 | NC | 0.85 |
| Institution 34 | NC | 0.85 |
| Institution 35 | NC | 0.85 |
| Institution 36 | NC | 0.85 |
| Institution 37 | NC | 0.85 |
| Institution 38 | NC | 0.85 |
| Institution 39 | NC | 0.80 |
| Institution 40 | NC | 0.80 |
| Institution 41 | NC | 0.80 |
| Institution 42 | NC | 0.80 |
| Institution 43 | NC | 0.80 |
| Institution 44 | NC | 0.80 |
| Institution 45 | NC | 0.80 |
| Institution 46 | NC | 0.80 |
| Institution 47 | NC | 0.80 |
| Institution 48 | NC | 0.80 |
| Institution 49 | NC | 0.80 |
| Institution 50 | NC | 0.80 |
| Institution 51 | NC | 0.80 |
| Institution 52 | NC | 0.80 |
| Institution 53 | ND | 0.90 |
| Institution 54 | ND | 0.85 |
| Institution 55 | ND | 0.85 |
| Institution 56 | ND | 0.85 |
| Institution 57 | ND | 0.75 |

FIG. 14

| Applicant Identifier | Assessment Attribution | Institution | Institution Rigor Index | Academic Level | Date | Item Code | Item Description | Program-Defined Category | Relative Value | Converted Score |
|---|---|---|---|---|---|---|---|---|---|---|
| REDACTED | Program | Institution 17 | 0.85 | Undergraduate | Dec-13 | ENGL 101 | Composition I | Non-Science | 3.0 | 92.00% |
| | Program | | 0.85 | Undergraduate | Dec-13 | UNIV 111 | DMS/UnivLife in Global Soci | Non-Science | 3.0 | 92.00% |
| | Program | | 0.85 | Undergraduate | Dec-13 | RELI 101 | Int to the Old Testament | Non-Science | 3.0 | 79.00% |
| | Program | | 0.85 | Undergraduate | Dec-13 | MATH 151 | Calculus | Science | 4.0 | 86.00% |
| | Program | | 0.85 | Undergraduate | May-14 | MUSC 225 | Music Survey | Non-Science | 3.0 | 92.00% |
| | Program | | 0.85 | Undergraduate | May-14 | COMM 230 | Technology & American Society | Non-Science | 3.0 | 92.00% |
| | Program | | 0.85 | Undergraduate | May-14 | BADM 325 | Business Communications Appl | Non-Science | 3.0 | 86.00% |
| | Program | | 0.85 | Undergraduate | May-14 | ENGL 102 | Composition II | Non-Science | 3.0 | 89.00% |
| | Program | | 0.85 | Undergraduate | May-14 | RELI 102 | Int to the New Testament | Non-Science | 3.0 | 76.00% |
| | Program | | 0.85 | Undergraduate | May-14 | EXSI 200 | Introduction to Exercise Sci | Science | 2.0 | 86.00% |
| | Program | | 0.85 | Undergraduate | Dec-14 | BIOL 111 | General Biology | Biology | 4.0 | 89.00% |
| | Program | | 0.85 | Undergraduate | Dec-14 | CHEM 111 | General Chemistry I | Chemistry | 4.0 | 97.50% |
| | Program | | 0.85 | Undergraduate | Dec-14 | HLED 221 | Dimensions of Personal Health | Non-Science | 3.0 | 97.50% |
| | Program | | 0.85 | Undergraduate | Dec-14 | ECON 203 | Principles of Economics I | Non-Science | 3.0 | 86.00% |
| | Program | | 0.85 | Undergraduate | May-15 | BIOL 203 | Human Anatomy/Physiology I | Biology | 4.0 | 86.00% |
| | Program | | 0.85 | Undergraduate | May-15 | CHEM 112 | General Chemistry II | Chemistry | 4.0 | 97.00% |
| | Program | | 0.85 | Undergraduate | May-15 | CHEM 202 | Organic Chemistry II | Chemistry | 4.0 | 92.00% |
| | Program | | 0.85 | Undergraduate | May-15 | BIOL 222 | Medical Terminology | Non-Science | 1.0 | 97.00% |
| | Program | Institution 2 | 0.85 | Undergraduate | May-15 | HIS 112 | WORLD CivilizationS II | Non-Science | 3.0 | 97.00% |
| | Program | Institution 17 | 0.85 | Undergraduate | May-15 | SSCI 205 | Global Understanding | Non-Science | 3.0 | 92.00% |
| | Program | | 0.85 | Undergraduate | May-15 | SPAN 101 | Real World Spanish: Get Ready! | Non-Science | 3.0 | 92.00% |
| | Program | | 0.85 | Undergraduate | May-15 | PSYC 201 | General Psychology | Non-Science | 3.0 | 86.00% |
| | Program | | 0.85 | Undergraduate | May-15 | EXSI 307 | Exercise Physiology Lab | Science | 1.0 | 97.00% |
| | Program | | 0.85 | Undergraduate | May-15 | EXSI 315 | Motor Behavior | Science | 3.0 | 97.00% |
| | Program | | 0.85 | Undergraduate | May-15 | EXSI 347 | Physiology of Sport/Exercise | Science | 3.0 | 92.00% |
| | Program | | 0.85 | Undergraduate | May-15 | EXSI 432 | Seminar in Exercise Science | Science | 3.0 | 92.50% |
| | Program | | 0.85 | Undergraduate | May-15 | EXSI 335 | Kinesiology | Science | 3.0 | 89.00% |
| | Program | | 0.85 | Undergraduate | Dec-15 | BIOL 204 | Human Anatomy/Physiology II | Biology | 4.0 | 86.00% |
| | Program | | 0.85 | Undergraduate | Dec-15 | CHEM 201 | Organic Chemistry I | Chemistry | 4.0 | 92.00% |
| | Program | | 0.85 | Undergraduate | Dec-15 | ENGL 232 | American Lit Survey II A2 | Non-Science | 3.0 | 97.00% |
| | Program | | 0.85 | Undergraduate | Dec-15 | PSYC 206 | Developmental Psychology | Non-Science | 3.0 | 97.00% |
| | Program | | 0.85 | Undergraduate | Dec-15 | COMM 233 | Speech | Non-Science | 4.0 | 97.00% |
| | Program | | 0.85 | Undergraduate | Dec-15 | HIST 101 | Survey of Western Civilization I | Non-Science | 3.0 | 92.00% |
| | Program | | 0.85 | Undergraduate | Jun-16 | EXSI 457 | Internship in Exercise Science | Science | 6.0 | 92.00% |
| | Program | | 0.85 | Undergraduate | Dec-16 | CHEM 422 | Biochemistry | Chemistry | 4.0 | 89.00% |
| | Program | | 0.85 | Undergraduate | Dec-16 | PHED 153 | Golf | Non-Science | 1.0 | 97.00% |
| | Program | | 0.85 | Undergraduate | Dec-16 | SOCI 201 | Introduction to Sociology | Non-Science | 3.0 | 97.50% |
| | Program | | 0.85 | Undergraduate | Dec-16 | PHYS 235 | Gen Phys for Scientist/Eng I | Science | 4.0 | 97.50% |
| | Milestone | AMERICAN DENTAL ASSOCIATION | 1.00 | Undergraduate | Jul-17 | DAT BIOL | Biology | Biology | 5.0 | 63.54% |
| | Milestone | AMERICAN DENTAL ASSOCIATION | 1.00 | Undergraduate | Jul-17 | DAT CHEM | Chemistry Inorganic | Chemistry | 5.0 | 57.69% |
| | Milestone | AMERICAN DENTAL ASSOCIATION | 1.00 | Undergraduate | Jul-17 | DAT CHEM | Chemistry Organic | Chemistry | 5.0 | 63.54% |
| | Milestone | AMERICAN DENTAL ASSOCIATION | 1.00 | Undergraduate | Jul-17 | DAT READ | Reading Comprehension | Non-Science | 5.0 | 76.92% |
| | Milestone | AMERICAN DENTAL ASSOCIATION | 1.00 | Undergraduate | Jul-17 | DAT QUANT | Quantitative Reasoning | Science | 5.0 | 73.08% |
| | Milestone | AMERICAN DENTAL ASSOCIATION | 1.00 | Undergraduate | Nov-17 | DAT BIOL | Biology | Biology | 5.0 | 53.85% |
| | Milestone | AMERICAN DENTAL ASSOCIATION | 1.00 | Undergraduate | Nov-17 | DAT CHEM | Chemistry Organic | Chemistry | 5.0 | 57.69% |
| | Milestone | AMERICAN DENTAL ASSOCIATION | 1.00 | Undergraduate | Nov-17 | DAT CHEM | Chemistry Inorganic | Chemistry | 5.0 | 69.23% |
| | Milestone | AMERICAN DENTAL ASSOCIATION | 1.00 | Undergraduate | Nov-17 | DAT READ | Reading Comprehension | Non-Science | 5.0 | 76.92% |
| | Milestone | AMERICAN DENTAL ASSOCIATION | 1.00 | Undergraduate | Nov-17 | DAT QUANT | Quantitative Reasoning | Science | 5.0 | 69.23% |

FIG. 15

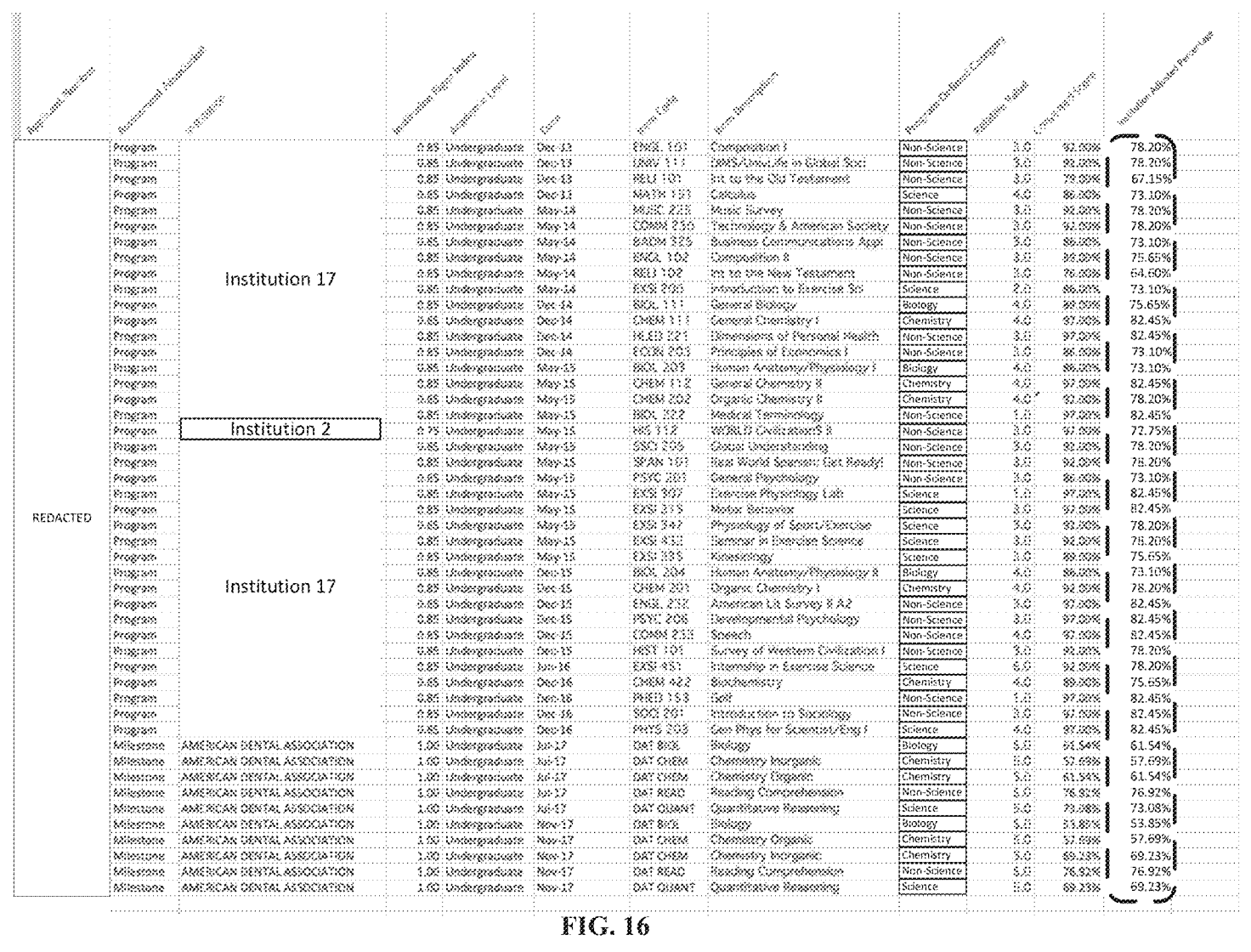

| Applicant Number | Assessment Identifier | Institution | Institution Rigor Index | Academic Level | Term | Item Code | Item Description | Program Defined Category | Credits Value | Grade Percentage | Institution Adjusted Percentage |
|---|---|---|---|---|---|---|---|---|---|---|---|
| REDACTED | Program | Institution 17 | 0.85 | Undergraduate | Dec-13 | ENGL 101 | Composition I | Non-Science | 3.0 | 92.00% | 78.20% |
| | Program | | 0.85 | Undergraduate | Dec-13 | UNIV 111 | DMS/LivLife in Global Soc | Non-Science | 3.0 | 92.00% | 78.20% |
| | Program | | 0.85 | Undergraduate | Dec-13 | RELI 101 | Int to the Old Testament | Non-Science | 3.0 | 79.00% | 67.15% |
| | Program | | 0.85 | Undergraduate | Dec-13 | MATH 151 | Calculus | Science | 4.0 | 86.00% | 73.10% |
| | Program | | 0.85 | Undergraduate | May-14 | MUSC 225 | Music Survey | Non-Science | 3.0 | 92.00% | 78.20% |
| | Program | | 0.85 | Undergraduate | May-14 | COMM 250 | Technology & American Society | Non-Science | 3.0 | 92.00% | 78.20% |
| | Program | | 0.85 | Undergraduate | May-14 | BADM 325 | Business Communications Appl | Non-Science | 3.0 | 86.00% | 73.10% |
| | Program | | 0.85 | Undergraduate | May-14 | ENGL 102 | Composition II | Non-Science | 3.0 | 89.00% | 75.65% |
| | Program | | 0.85 | Undergraduate | May-14 | RELI 102 | Int to the New Testament | Non-Science | 3.0 | 76.00% | 64.60% |
| | Program | | 0.85 | Undergraduate | May-14 | EXSI 200 | Introduction to Exercise Sci | Science | 2.0 | 86.00% | 73.10% |
| | Program | | 0.85 | Undergraduate | Dec-14 | BIOL 111 | General Biology | Biology | 4.0 | 89.00% | 75.65% |
| | Program | | 0.85 | Undergraduate | Dec-14 | CHEM 111 | General Chemistry I | Chemistry | 4.0 | 97.00% | 82.45% |
| | Program | | 0.85 | Undergraduate | Dec-14 | HLED 221 | Dimensions of Personal Health | Non-Science | 3.0 | 97.00% | 82.45% |
| | Program | | 0.85 | Undergraduate | Dec-14 | ECON 203 | Principles of Economics I | Non-Science | 3.0 | 86.00% | 73.10% |
| | Program | | 0.85 | Undergraduate | May-15 | BIOL 203 | Human Anatomy/Physiology I | Biology | 4.0 | 86.00% | 73.10% |
| | Program | | 0.85 | Undergraduate | May-15 | CHEM 112 | General Chemistry II | Chemistry | 4.0 | 97.00% | 82.45% |
| | Program | | 0.85 | Undergraduate | May-15 | CHEM 202 | Organic Chemistry II | Chemistry | 4.0 | 92.00% | 78.20% |
| | Program | | 0.85 | Undergraduate | May-15 | BIOL 322 | Medical Terminology | Non-Science | 1.0 | 97.00% | 82.45% |
| | Program | Institution 2 | 0.75 | Undergraduate | May-15 | HIS 112 | WORLD CivilizationS II | Non-Science | 3.0 | 97.00% | 72.75% |
| | Program | Institution 17 | 0.85 | Undergraduate | May-15 | SSCI 205 | Global Understanding | Non-Science | 3.0 | 92.00% | 78.20% |
| | Program | | 0.85 | Undergraduate | May-15 | SPAN 101 | Real World Spanish: Get Ready! | Non-Science | 3.0 | 92.00% | 78.20% |
| | Program | | 0.85 | Undergraduate | May-15 | PSYC 201 | General Psychology | Non-Science | 3.0 | 86.00% | 73.10% |
| | Program | | 0.85 | Undergraduate | May-15 | EXSI 307 | Exercise Physiology Lab | Science | 1.0 | 97.00% | 82.45% |
| | Program | | 0.85 | Undergraduate | May-15 | EXSI 315 | Motor Behavior | Science | 3.0 | 97.00% | 82.45% |
| | Program | | 0.85 | Undergraduate | May-15 | EXSI 347 | Physiology of Sport/Exercise | Science | 3.0 | 92.00% | 78.20% |
| | Program | | 0.85 | Undergraduate | May-15 | EXSI 432 | Seminar in Exercise Science | Science | 3.0 | 92.00% | 78.20% |
| | Program | | 0.85 | Undergraduate | May-15 | EXSI 335 | Kinesiology | Science | 3.0 | 89.00% | 75.65% |
| | Program | | 0.85 | Undergraduate | Dec-15 | BIOL 204 | Human Anatomy/Physiology II | Biology | 4.0 | 86.00% | 73.10% |
| | Program | | 0.85 | Undergraduate | Dec-15 | CHEM 201 | Organic Chemistry I | Chemistry | 4.0 | 92.00% | 78.20% |
| | Program | | 0.85 | Undergraduate | Dec-15 | ENGL 232 | American Lit Survey II A2 | Non-Science | 3.0 | 97.00% | 82.45% |
| | Program | | 0.85 | Undergraduate | Dec-15 | PSYC 208 | Developmental Psychology | Non-Science | 3.0 | 97.00% | 82.45% |
| | Program | | 0.85 | Undergraduate | Dec-15 | COMM 233 | Speech | Non-Science | 4.0 | 97.00% | 82.45% |
| | Program | | 0.85 | Undergraduate | Dec-15 | HIST 101 | Survey of Western Civilization I | Non-Science | 3.0 | 92.00% | 78.20% |
| | Program | | 0.85 | Undergraduate | Jun-16 | EXSI 451 | Internship in Exercise Science | Science | 6.0 | 92.00% | 78.20% |
| | Program | | 0.85 | Undergraduate | Dec-16 | CHEM 422 | Biochemistry | Chemistry | 4.0 | 89.00% | 75.65% |
| | Program | | 0.85 | Undergraduate | Dec-16 | PHED 153 | Golf | Non-Science | 1.0 | 97.00% | 82.45% |
| | Program | | 0.85 | Undergraduate | Dec-16 | SOCI 201 | Introduction to Sociology | Non-Science | 3.0 | 97.00% | 82.45% |
| | Program | | 0.85 | Undergraduate | Dec-16 | PHYS 203 | Gen Phys for Scientist/Eng I | Science | 4.0 | 97.00% | 82.45% |
| | Milestone | AMERICAN DENTAL ASSOCIATION | 1.00 | Undergraduate | Jul-17 | DAT BIOL | Biology | Biology | 5.0 | 61.54% | 61.54% |
| | Milestone | AMERICAN DENTAL ASSOCIATION | 1.00 | Undergraduate | Jul-17 | DAT CHEM | Chemistry Inorganic | Chemistry | 5.0 | 57.69% | 57.69% |
| | Milestone | AMERICAN DENTAL ASSOCIATION | 1.00 | Undergraduate | Jul-17 | DAT CHEM | Chemistry Organic | Chemistry | 5.0 | 61.54% | 61.54% |
| | Milestone | AMERICAN DENTAL ASSOCIATION | 1.00 | Undergraduate | Jul-17 | DAT READ | Reading Comprehension | Non-Science | 5.0 | 76.92% | 76.92% |
| | Milestone | AMERICAN DENTAL ASSOCIATION | 1.00 | Undergraduate | Jul-17 | DAT QUANT | Quantitative Reasoning | Science | 5.0 | 73.08% | 73.08% |
| | Milestone | AMERICAN DENTAL ASSOCIATION | 1.00 | Undergraduate | Nov-17 | DAT BIOL | Biology | Biology | 5.0 | 53.85% | 53.85% |
| | Milestone | AMERICAN DENTAL ASSOCIATION | 1.00 | Undergraduate | Nov-17 | DAT CHEM | Chemistry Organic | Chemistry | 5.0 | 57.69% | 57.69% |
| | Milestone | AMERICAN DENTAL ASSOCIATION | 1.00 | Undergraduate | Nov-17 | DAT CHEM | Chemistry Inorganic | Chemistry | 5.0 | 69.23% | 69.23% |
| | Milestone | AMERICAN DENTAL ASSOCIATION | 1.00 | Undergraduate | Nov-17 | DAT READ | Reading Comprehension | Non-Science | 5.0 | 76.92% | 76.92% |
| | Milestone | AMERICAN DENTAL ASSOCIATION | 1.00 | Undergraduate | Nov-17 | DAT QUANT | Quantitative Reasoning | Science | 5.0 | 69.23% | 69.23% |

FIG. 16

| Applicant Identifier | Assessment Association | Institution | Institution Rigor Index | Academic Level | Academic Level Index | Term | Item Code | Item Description | Program-Defined Category | Relative Value | Unweighted Score | Institution Adjusted Percentage |
|---|---|---|---|---|---|---|---|---|---|---|---|---|
| REDACTED | Program | Institution 17 | 0.85 | Undergraduate | 1.00 | Dec-13 | ENGL 101 | Composition I | Non-Science | 3.0 | 92.00% | 78.20% |
| | Program | Institution 17 | 0.85 | Undergraduate | 1.00 | Dec-13 | UNIV 111 | DMS/UnivLife in Global Soc | Non-Science | 3.0 | 92.00% | 78.20% |
| | Program | Institution 17 | 0.85 | Undergraduate | 1.00 | Dec-13 | RELI 101 | Int to the Old Testament | Non-Science | 3.0 | 79.00% | 67.15% |
| | Program | Institution 17 | 0.85 | Undergraduate | 1.00 | Dec-13 | MATH 151 | Calculus | Science | 4.0 | 86.00% | 73.10% |
| | Program | Institution 17 | 0.85 | Undergraduate | 1.00 | May-14 | MUSC 2[illegible] | Music Survey | Non-Science | 3.0 | 92.00% | 78.20% |
| | Program | Institution 17 | 0.85 | Undergraduate | 1.00 | May-14 | COMM 230 | Technology & American Society | Non-Science | 3.0 | 92.00% | 78.20% |
| | Program | Institution 17 | 0.85 | Undergraduate | 1.00 | May-14 | BADM 325 | Business Communications Appl | Non-Science | 3.0 | 86.00% | 73.10% |
| | Program | Institution 17 | 0.85 | Undergraduate | 1.00 | May-14 | ENGL 102 | Composition II | Non-Science | 3.0 | 89.00% | 75.65% |
| | Program | Institution 17 | 0.85 | Undergraduate | 1.00 | May-14 | RELI 102 | Int to the New Testament | Non-Science | 3.0 | 76.00% | 64.60% |
| | Program | Institution 17 | 0.85 | Undergraduate | 1.00 | May-14 | EXSI 200 | Introduction to Exercise Sci | Science | 2.0 | 86.00% | 73.10% |
| | Program | Institution 17 | 0.85 | Undergraduate | 1.00 | Dec-14 | BIOL 111 | General Biology | Biology | 4.0 | 89.00% | 75.65% |
| | Program | Institution 17 | 0.85 | Undergraduate | 1.00 | Dec-14 | CHEM 111 | General Chemistry I | Chemistry | 4.0 | 97.00% | 82.45% |
| | Program | Institution 17 | 0.85 | Undergraduate | 1.00 | Dec-14 | HLED 221 | Dimensions of Personal Health | Non-Science | 3.0 | 97.00% | 82.45% |
| | Program | Institution 17 | 0.85 | Undergraduate | 1.00 | Dec-14 | ECON 203 | Principles of Economics I | Non-Science | 3.0 | 86.00% | 73.10% |
| | Program | Institution 17 | 0.85 | Undergraduate | 1.00 | May-15 | BIOL 203 | Human Anatomy/Physiology I | Biology | 4.0 | 86.00% | 73.10% |
| | Program | Institution 17 | 0.85 | Undergraduate | 1.00 | May-15 | CHEM 112 | General Chemistry II | Chemistry | 4.0 | 97.00% | 82.45% |
| | Program | Institution 17 | 0.85 | Undergraduate | 1.00 | May-15 | CHEM 202 | Organic Chemistry II | Chemistry | 4.0 | 92.00% | 78.20% |
| | Program | Institution 17 | 0.85 | Undergraduate | 1.00 | May-15 | BIOL 2[illegible] | Medical Terminology | Non-Science | 1.0 | 97.00% | 82.45% |
| | Program | Institution 2 | 0.75 | Undergraduate | 1.00 | May-15 | HIS 112 | WORLD CivilizationS II | Non-Science | 3.0 | 97.00% | 72.75% |
| | Program | Institution 17 | 0.85 | Undergraduate | 1.00 | May-15 | SSCI 205 | Global Understanding | Non-Science | 3.0 | 92.00% | 78.20% |
| | Program | Institution 17 | 0.85 | Undergraduate | 1.00 | May-15 | SPAN 101 | Real World Spanish: Get Ready! | Non-Science | 3.0 | 92.00% | 78.20% |
| | Program | Institution 17 | 0.85 | Undergraduate | 1.00 | May-15 | PSYC 201 | General Psychology | Non-Science | 3.0 | 86.00% | 73.10% |
| | Program | Institution 17 | 0.85 | Undergraduate | 1.00 | May-15 | EXSI 307 | Exercise Physiology Lab | Science | 1.0 | 97.00% | 82.45% |
| | Program | Institution 17 | 0.85 | Undergraduate | 1.00 | May-15 | EXSI 315 | Motor Behavior | Science | 3.0 | 97.00% | 82.45% |
| | Program | Institution 17 | 0.85 | Undergraduate | 1.00 | May-15 | EXSI 347 | Physiology of Sport/Exercise | Science | 3.0 | 92.00% | 78.20% |
| | Program | Institution 17 | 0.85 | Undergraduate | 1.00 | May-15 | EXSI 432 | Seminar in Exercise Science | Science | 3.0 | 92.00% | 78.20% |
| | Program | Institution 17 | 0.85 | Undergraduate | 1.00 | May-15 | EXSI 3[illegible] | Kinesiology | Science | 3.0 | 89.00% | 75.65% |
| | Program | Institution 17 | 0.85 | Undergraduate | 1.00 | Dec-15 | BIOL 204 | Human Anatomy/Physiology II | Biology | 4.0 | 86.00% | 73.10% |
| | Program | Institution 17 | 0.85 | Undergraduate | 1.00 | Dec-15 | CHEM 201 | Organic Chemistry I | Chemistry | 4.0 | 92.00% | 78.20% |
| | Program | Institution 17 | 0.85 | Undergraduate | 1.00 | Dec-15 | ENGL 232 | American Lit Survey II A2 | Non-Science | 3.0 | 97.00% | 82.45% |
| | Program | Institution 17 | 0.85 | Undergraduate | 1.00 | Dec-15 | PSYC 206 | Developmental Psychology | Non-Science | 3.0 | 97.00% | 82.45% |
| | Program | Institution 17 | 0.85 | Undergraduate | 1.00 | Dec-15 | COMM 233 | Speech | Non-Science | 4.0 | 97.00% | 82.45% |
| | Program | Institution 17 | 0.85 | Undergraduate | 1.00 | Dec-15 | HIST 101 | Survey of Western Civilization I | Non-Science | 3.0 | 92.00% | 78.20% |
| | Program | Institution 17 | 0.85 | Undergraduate | 1.00 | Jun-16 | EXSI 451 | Internship in Exercise Science | Science | 6.0 | 92.00% | 78.20% |
| | Program | Institution 17 | 0.85 | Undergraduate | 1.00 | Dec-16 | CHEM 422 | Biochemistry | Chemistry | 4.0 | 89.00% | 75.65% |
| | Program | Institution 17 | 0.85 | Undergraduate | 1.00 | Dec-16 | PHED 133 | Golf | Non-Science | 1.0 | 97.00% | 82.45% |
| | Program | Institution 17 | 0.85 | Undergraduate | 1.00 | Dec-16 | SOCI 201 | Introduction to Sociology | Non-Science | 3.0 | 97.00% | 82.45% |
| | Program | Institution 17 | 0.85 | Undergraduate | 1.00 | Dec-16 | PHYS 203 | Gen Phys for Scientist/Eng I | Science | 4.0 | 97.00% | 82.45% |
| | Milestone | AMERICAN DENTAL ASSOCIATION | 1.00 | Undergraduate | 1.00 | Jul-17 | DAT BIOL | Biology | Biology | 5.0 | 61.54% | 61.54% |
| | Milestone | AMERICAN DENTAL ASSOCIATION | 1.00 | Undergraduate | 1.00 | Jul-17 | DAT CHEM | Chemistry Inorganic | Chemistry | 5.0 | 57.69% | 57.69% |
| | Milestone | AMERICAN DENTAL ASSOCIATION | 1.00 | Undergraduate | 1.00 | Jul-17 | DAT CHEM | Chemistry Organic | Chemistry | 5.0 | 61.54% | 61.54% |
| | Milestone | AMERICAN DENTAL ASSOCIATION | 1.00 | Undergraduate | 1.00 | Jul-17 | DAT READ | Reading Comprehension | Non-Science | 5.0 | 76.92% | 76.92% |
| | Milestone | AMERICAN DENTAL ASSOCIATION | 1.00 | Undergraduate | 1.00 | Jul-17 | DAT QUANT | Quantitative Reasoning | Science | 5.0 | 73.08% | 73.08% |
| | Milestone | AMERICAN DENTAL ASSOCIATION | 1.00 | Undergraduate | 1.00 | Nov-17 | DAT BIOL | Biology | Biology | 5.0 | 53.85% | 53.85% |
| | Milestone | AMERICAN DENTAL ASSOCIATION | 1.00 | Undergraduate | 1.00 | Nov-17 | DAT CHEM | Chemistry Organic | Chemistry | 5.0 | 57.69% | 57.69% |
| | Milestone | AMERICAN DENTAL ASSOCIATION | 1.00 | Undergraduate | 1.00 | Nov-17 | DAT CHEM | Chemistry Inorganic | Chemistry | 5.0 | 69.23% | 69.23% |
| | Milestone | AMERICAN DENTAL ASSOCIATION | 1.00 | Undergraduate | 1.00 | Nov-17 | DAT READ | Reading Comprehension | Non-Science | 5.0 | 76.92% | 76.92% |
| | Milestone | AMERICAN DENTAL ASSOCIATION | 1.00 | Undergraduate | 1.00 | Nov-17 | DAT QUANT | Quantitative Reasoning | Science | 5.0 | 69.23% | 69.23% |

FIG. 17

| Applicant Number | Assessment Association | Institution | Institution Rigor Index | Academic Level | Academic Level Index | Date | Item Code | Item Description | Program-Defined Category | Credit Value | Converted Score | Institution Adjusted Percentage | Academic Level Adjusted Percentage |
|---|---|---|---|---|---|---|---|---|---|---|---|---|---|
| REDACTED | Program | Institution 17 | 0.85 | Undergraduate | 1.00 | Dec-13 | ENGL 101 | Composition I | Non-Science | 3.0 | 92.00% | 78.20% | 78.20% |
| | Program | Institution 17 | 0.85 | Undergraduate | 1.00 | Dec-13 | UNIV 111 | DMS/UnivLife in Global Soc | Non-Science | 3.0 | 92.00% | 78.20% | 78.20% |
| | Program | Institution 17 | 0.85 | Undergraduate | 1.00 | Dec-13 | RELI 101 | Int to the Old Testament | Non-Science | 3.0 | 79.00% | 67.15% | 67.15% |
| | Program | Institution 17 | 0.85 | Undergraduate | 1.00 | Dec-13 | MATH 151 | Calculus | Science | 4.0 | 86.00% | 73.10% | 73.10% |
| | Program | Institution 17 | 0.85 | Undergraduate | 1.00 | May-14 | MUSC 225 | Music Survey | Non-Science | 3.0 | 92.00% | 78.20% | 78.20% |
| | Program | Institution 17 | 0.85 | Undergraduate | 1.00 | May-14 | COMM 230 | Technology & American Society | Non-Science | 3.0 | 92.00% | 78.20% | 78.20% |
| | Program | Institution 17 | 0.85 | Undergraduate | 1.00 | May-14 | BADM 325 | Business Communications Appl | Non-Science | 3.0 | 86.00% | 73.10% | 73.10% |
| | Program | Institution 17 | 0.85 | Undergraduate | 1.00 | May-14 | ENGL 102 | Composition II | Non-Science | 3.0 | 89.00% | 75.65% | 75.65% |
| | Program | Institution 17 | 0.85 | Undergraduate | 1.00 | May-14 | RELI 102 | Int to the New Testament | Non-Science | 3.0 | 76.00% | 64.60% | 64.60% |
| | Program | Institution 17 | 0.85 | Undergraduate | 1.00 | May-14 | EXSI 200 | Introduction to Exercise Sci | Science | 2.0 | 86.00% | 73.10% | 73.10% |
| | Program | Institution 17 | 0.85 | Undergraduate | 1.00 | Dec-14 | BIOL 111 | General Biology | Biology | 4.0 | 89.00% | 75.65% | 75.65% |
| | Program | Institution 17 | 0.85 | Undergraduate | 1.00 | Dec-14 | CHEM 111 | General Chemistry I | Chemistry | 4.0 | 97.00% | 82.45% | 82.45% |
| | Program | Institution 17 | 0.85 | Undergraduate | 1.00 | Dec-14 | HLED 221 | Dimensions of Personal Health | Non-Science | 3.0 | 97.00% | 82.45% | 82.45% |
| | Program | Institution 17 | 0.85 | Undergraduate | 1.00 | Dec-14 | ECON 203 | Principles of Economics I | Non-Science | 3.0 | 86.00% | 73.10% | 73.10% |
| | Program | Institution 17 | 0.85 | Undergraduate | 1.00 | May-15 | BIOL 203 | Human Anatomy/Physiology I | Biology | 4.0 | 86.00% | 73.10% | 73.10% |
| | Program | Institution 17 | 0.85 | Undergraduate | 1.00 | May-15 | CHEM 112 | General Chemistry II | Chemistry | 4.0 | 97.00% | 82.45% | 82.45% |
| | Program | Institution 17 | 0.85 | Undergraduate | 1.00 | May-15 | CHEM 202 | Organic Chemistry II | Chemistry | 4.0 | 92.00% | 78.20% | 78.20% |
| | Program | Institution 17 | 0.85 | Undergraduate | 1.00 | May-15 | BIOL 222 | Medical Terminology | Non-Science | 1.0 | 97.00% | 82.45% | 82.45% |
| | Program | Institution 2 | 0.75 | Undergraduate | 1.00 | May-15 | HIS 112 | WORLD Civilizations II | Non-Science | 3.0 | 97.00% | 72.75% | 72.75% |
| | Program | Institution 17 | 0.85 | Undergraduate | 1.00 | May-15 | SSO 205 | Global Understanding | Non-Science | 3.0 | 92.00% | 78.20% | 78.20% |
| | Program | Institution 17 | 0.85 | Undergraduate | 1.00 | May-15 | SPAN 101 | Real World Spanish: Get Ready! | Non-Science | 3.0 | 92.00% | 78.20% | 78.20% |
| | Program | Institution 17 | 0.85 | Undergraduate | 1.00 | May-15 | PSYC 201 | General Psychology | Non-Science | 3.0 | 86.00% | 73.10% | 73.10% |
| | Program | Institution 17 | 0.85 | Undergraduate | 1.00 | May-15 | EXSI 307 | Exercise Physiology Lab | Science | 1.0 | 97.00% | 82.45% | 82.45% |
| | Program | Institution 17 | 0.85 | Undergraduate | 1.00 | May-15 | EXSI 318 | Motor Behavior | Science | 3.0 | 97.00% | 82.45% | 82.45% |
| | Program | Institution 17 | 0.85 | Undergraduate | 1.00 | May-15 | EXSI 347 | Physiology of Sport/Exercise | Science | 3.0 | 92.00% | 78.20% | 78.20% |
| | Program | Institution 17 | 0.85 | Undergraduate | 1.00 | May-15 | EXSI 432 | Seminar in Exercise Science | Science | 3.0 | 92.00% | 78.20% | 78.20% |
| | Program | Institution 17 | 0.85 | Undergraduate | 1.00 | May-15 | EXSI 335 | Kinesiology | Science | 3.0 | 89.00% | 75.65% | 75.65% |
| | Program | Institution 17 | 0.85 | Undergraduate | 1.00 | Dec-15 | BIOL 204 | Human Anatomy/Physiology II | Biology | 4.0 | 86.00% | 73.10% | 73.10% |
| | Program | Institution 17 | 0.85 | Undergraduate | 1.00 | Dec-15 | CHEM 201 | Organic Chemistry I | Chemistry | 4.0 | 92.00% | 78.20% | 78.20% |
| | Program | Institution 17 | 0.85 | Undergraduate | 1.00 | Dec-15 | ENGL 232 | American Lit Survey II AZ | Non-Science | 3.0 | 97.00% | 82.45% | 82.45% |
| | Program | Institution 17 | 0.85 | Undergraduate | 1.00 | Dec-15 | PSYC 306 | Developmental Psychology | Non-Science | 3.0 | 97.00% | 82.45% | 82.45% |
| | Program | Institution 17 | 0.85 | Undergraduate | 1.00 | Dec-15 | COMM 253 | Speech | Non-Science | 4.0 | 97.00% | 82.45% | 82.45% |
| | Program | Institution 17 | 0.85 | Undergraduate | 1.00 | Dec-15 | HIST 101 | Survey of Western Civilization I | Non-Science | 3.0 | 92.00% | 78.20% | 78.20% |
| | Program | Institution 17 | 0.85 | Undergraduate | 1.00 | Jun-16 | EXSI 481 | Internship in Exercise Science | Science | 6.0 | 92.00% | 78.20% | 78.20% |
| | Program | Institution 17 | 0.85 | Undergraduate | 1.00 | Dec-16 | CHEM 422 | Biochemistry | Chemistry | 4.0 | 89.00% | 75.65% | 75.65% |
| | Program | Institution 17 | 0.85 | Undergraduate | 1.00 | Dec-16 | PHED 153 | Golf | Non-Science | 1.0 | 97.00% | 82.45% | 82.45% |
| | Program | Institution 17 | 0.85 | Undergraduate | 1.00 | Dec-16 | SOCI 201 | Introduction to Sociology | Non-Science | 3.0 | 97.00% | 82.45% | 82.45% |
| | Program | Institution 17 | 0.85 | Undergraduate | 1.00 | Dec-16 | PHYS 203 | Gen Phys for Scientist/Eng I | Science | 4.0 | 97.00% | 82.45% | 82.45% |
| | Milestone | AMERICAN DENTAL ASSOCIATION | 1.00 | Undergraduate | 1.00 | Jul-17 | DAT BIOL | Biology | Biology | 5.0 | 61.54% | 61.54% | 61.54% |
| | Milestone | AMERICAN DENTAL ASSOCIATION | 1.00 | Undergraduate | 1.00 | Jul-17 | DAT CHEM | Chemistry Inorganic | Chemistry | 5.0 | 57.69% | 57.69% | 57.69% |
| | Milestone | AMERICAN DENTAL ASSOCIATION | 1.00 | Undergraduate | 1.00 | Jul-17 | DAT CHEM | Chemistry Organic | Chemistry | 5.0 | 61.54% | 61.54% | 61.54% |
| | Milestone | AMERICAN DENTAL ASSOCIATION | 1.00 | Undergraduate | 1.00 | Jul-17 | DAT READ | Reading Comprehension | Non-Science | 5.0 | 76.92% | 76.92% | 76.92% |
| | Milestone | AMERICAN DENTAL ASSOCIATION | 1.00 | Undergraduate | 1.00 | Jul-17 | DAT QUANT | Quantitative Reasoning | Science | 5.0 | 73.08% | 73.08% | 73.08% |
| | Milestone | AMERICAN DENTAL ASSOCIATION | 1.00 | Undergraduate | 1.00 | Nov-17 | DAT BIOL | Biology | Biology | 5.0 | 53.85% | 53.85% | 53.85% |
| | Milestone | AMERICAN DENTAL ASSOCIATION | 1.00 | Undergraduate | 1.00 | Nov-17 | DAT CHEM | Chemistry Organic | Chemistry | 5.0 | 57.69% | 57.69% | 57.69% |
| | Milestone | AMERICAN DENTAL ASSOCIATION | 1.00 | Undergraduate | 1.00 | Nov-17 | DAT CHEM | Chemistry Inorganic | Chemistry | 5.0 | 69.23% | 69.23% | 69.23% |
| | Milestone | AMERICAN DENTAL ASSOCIATION | 1.00 | Undergraduate | 1.00 | Nov-17 | DAT READ | Reading Comprehension | Non-Science | 5.0 | 76.92% | 76.92% | 76.92% |
| | Milestone | AMERICAN DENTAL ASSOCIATION | 1.00 | Undergraduate | 1.00 | Nov-17 | DAT QUANT | Quantitative Reasoning | Science | 5.0 | 69.23% | 69.23% | 69.23% |

FIG. 18

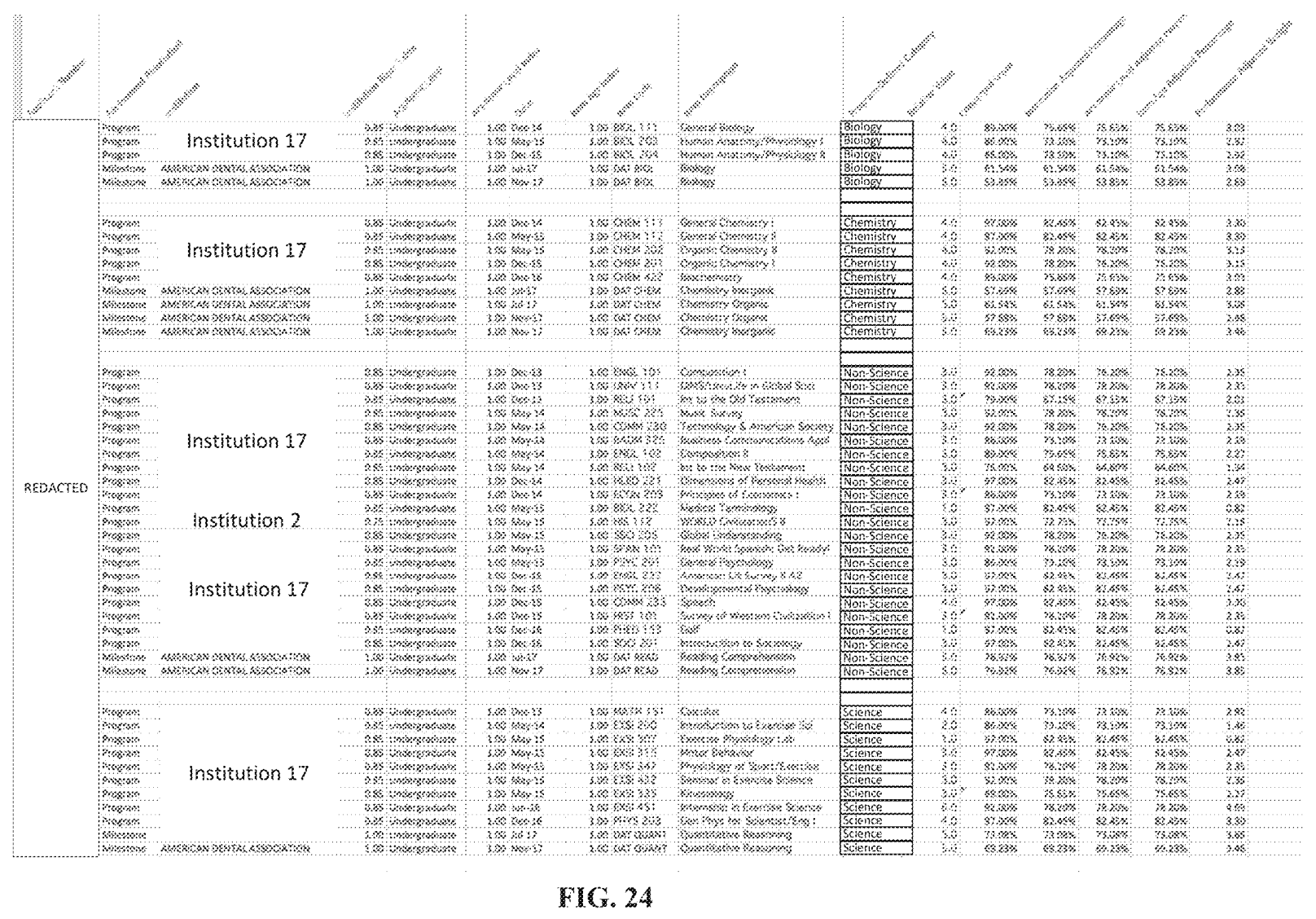

| | | | | | | | | | | | | | | | | |
|---|---|---|---|---|---|---|---|---|---|---|---|---|---|---|---|---|
| REDACTED | Program | Institution 17 | 0.85 | Undergraduate | 1.00 | Dec-14 | 1.00 | BIOL 111 | General Biology | Biology | 4.0 | 89.00% | 75.65% | 75.65% | 75.65% | 3.03 |
| | Program | | 0.85 | Undergraduate | 1.00 | May-15 | 1.00 | BIOL 202 | Human Anatomy/Physiology I | Biology | 4.0 | 86.00% | 73.10% | 73.10% | 73.10% | 2.92 |
| | Program | | 0.85 | Undergraduate | 1.00 | Dec-15 | 1.00 | BIOL 204 | Human Anatomy/Physiology II | Biology | 4.0 | 86.00% | 73.10% | 73.10% | 73.10% | 2.92 |
| | Milestone | AMERICAN DENTAL ASSOCIATION | 1.00 | Undergraduate | 1.00 | Jul-17 | 1.00 | DAT BIOL | Biology | Biology | 5.0 | 61.54% | 61.54% | 61.54% | 61.54% | 3.08 |
| | Milestone | AMERICAN DENTAL ASSOCIATION | 1.00 | Undergraduate | 1.00 | Nov-17 | 1.00 | DAT BIOL | Biology | Biology | 5.0 | 53.85% | 53.85% | 53.85% | 53.85% | 2.69 |
| | | | | | | | | | | | | | | | | |
| | Program | Institution 17 | 0.85 | Undergraduate | 1.00 | Dec-14 | 1.00 | CHEM 111 | General Chemistry I | Chemistry | 4.0 | 97.00% | 82.45% | 82.45% | 82.45% | 3.30 |
| | Program | | 0.85 | Undergraduate | 1.00 | May-15 | 1.00 | CHEM 112 | General Chemistry II | Chemistry | 4.0 | 97.00% | 82.45% | 82.45% | 82.45% | 3.30 |
| | Program | | 0.85 | Undergraduate | 1.00 | May-15 | 1.00 | CHEM 202 | Organic Chemistry II | Chemistry | 4.0 | 92.00% | 78.20% | 78.20% | 78.20% | 3.13 |
| | Program | | 0.85 | Undergraduate | 1.00 | Dec-15 | 1.00 | CHEM 201 | Organic Chemistry I | Chemistry | 4.0 | 92.00% | 78.20% | 78.20% | 78.20% | 3.13 |
| | Program | | 0.85 | Undergraduate | 1.00 | Dec-16 | 1.00 | CHEM 422 | Biochemistry | Chemistry | 4.0 | 89.00% | 75.65% | 75.65% | 75.65% | 3.03 |
| | Milestone | AMERICAN DENTAL ASSOCIATION | 1.00 | Undergraduate | 1.00 | Jul-17 | 1.00 | DAT CHEM | Chemistry Inorganic | Chemistry | 5.0 | 57.69% | 57.69% | 57.69% | 57.69% | 2.88 |
| | Milestone | AMERICAN DENTAL ASSOCIATION | 1.00 | Undergraduate | 1.00 | Jul-17 | 1.00 | DAT CHEM | Chemistry Organic | Chemistry | 5.0 | 61.54% | 61.54% | 61.54% | 61.54% | 3.08 |
| | Milestone | AMERICAN DENTAL ASSOCIATION | 1.00 | Undergraduate | 1.00 | Nov-17 | 1.00 | DAT CHEM | Chemistry Organic | Chemistry | 5.0 | 57.69% | 57.69% | 57.69% | 57.69% | 2.88 |
| | Milestone | AMERICAN DENTAL ASSOCIATION | 1.00 | Undergraduate | 1.00 | Nov-17 | 1.00 | DAT CHEM | Chemistry Inorganic | Chemistry | 5.0 | 69.23% | 69.23% | 69.23% | 69.23% | 3.46 |
| | | | | | | | | | | | | | | | | |
| | Program | Institution 17 | 0.85 | Undergraduate | 1.00 | Dec-13 | 1.00 | ENGL 101 | Composition I | Non-Science | 3.0 | 92.00% | 78.20% | 78.20% | 78.20% | 2.35 |
| | Program | | 0.85 | Undergraduate | 1.00 | Dec-13 | 1.00 | UNIV 111 | UNIV Life in Global Soc | Non-Science | 3.0 | 92.00% | 78.20% | 78.20% | 78.20% | 2.35 |
| | Program | | 0.85 | Undergraduate | 1.00 | Dec-13 | 1.00 | RELI 101 | Int to the Old Testament | Non-Science | 3.0 | 79.00% | 67.15% | 67.15% | 67.15% | 2.01 |
| | Program | | 0.85 | Undergraduate | 1.00 | May-14 | 1.00 | MUSC 225 | Music Survey | Non-Science | 3.0 | 92.00% | 78.20% | 78.20% | 78.20% | 2.35 |
| | Program | | 0.85 | Undergraduate | 1.00 | May-14 | 1.00 | COMM 230 | Technology & American Society | Non-Science | 3.0 | 92.00% | 78.20% | 78.20% | 78.20% | 2.35 |
| | Program | | 0.85 | Undergraduate | 1.00 | May-14 | 1.00 | BADM 325 | Business Communications Appl | Non-Science | 3.0 | 86.00% | 73.10% | 73.10% | 73.10% | 2.19 |
| | Program | | 0.85 | Undergraduate | 1.00 | May-14 | 1.00 | ENGL 102 | Composition II | Non-Science | 3.0 | 89.00% | 75.65% | 75.65% | 75.65% | 2.27 |
| | Program | | 0.85 | Undergraduate | 1.00 | May-14 | 1.00 | RELI 102 | Int to the New Testament | Non-Science | 3.0 | 76.00% | 64.60% | 64.60% | 64.60% | 1.94 |
| | Program | | 0.85 | Undergraduate | 1.00 | Dec-14 | 1.00 | HLED 221 | Dimensions of Personal Health | Non-Science | 3.0 | 97.00% | 82.45% | 82.45% | 82.45% | 2.47 |
| | Program | | 0.85 | Undergraduate | 1.00 | Dec-14 | 1.00 | ECON 209 | Principles of Economics I | Non-Science | 3.0 | 86.00% | 73.10% | 73.10% | 73.10% | 2.19 |
| | Program | | 0.85 | Undergraduate | 1.00 | May-15 | 1.00 | BIOL 222 | Medical Terminology | Non-Science | 1.0 | 97.00% | 82.45% | 82.45% | 82.45% | 0.82 |
| | Program | Institution 2 | 0.75 | Undergraduate | 1.00 | May-15 | 1.00 | HIS 112 | WORLD Civilization II | Non-Science | 3.0 | 97.00% | 72.75% | 72.75% | 72.75% | 2.18 |
| | Program | | 0.85 | Undergraduate | 1.00 | May-15 | 1.00 | SSO 205 | Global Understanding | Non-Science | 3.0 | 92.00% | 78.20% | 78.20% | 78.20% | 2.35 |
| | Program | Institution 17 | 0.85 | Undergraduate | 1.00 | May-15 | 1.00 | SPAN 101 | Real World Spanish: Get Ready! | Non-Science | 3.0 | 92.00% | 78.20% | 78.20% | 78.20% | 2.35 |
| | Program | | 0.85 | Undergraduate | 1.00 | May-15 | 1.00 | PSYC 201 | General Psychology | Non-Science | 3.0 | 86.00% | 73.10% | 73.10% | 73.10% | 2.19 |
| | Program | | 0.85 | Undergraduate | 1.00 | Dec-15 | 1.00 | ENGL 232 | American Lit Survey II A2 | Non-Science | 3.0 | 97.00% | 82.45% | 82.45% | 82.45% | 2.47 |
| | Program | | 0.85 | Undergraduate | 1.00 | Dec-15 | 1.00 | PSYC 208 | Developmental Psychology | Non-Science | 3.0 | 97.00% | 82.45% | 82.45% | 82.45% | 2.47 |
| | Program | | 0.85 | Undergraduate | 1.00 | Dec-15 | 1.00 | COMM 233 | Speech | Non-Science | 4.0 | 97.00% | 82.45% | 82.45% | 82.45% | 3.30 |
| | Program | | 0.85 | Undergraduate | 1.00 | Dec-15 | 1.00 | HIST 101 | Survey of Western Civilization I | Non-Science | 3.0 | 92.00% | 78.20% | 78.20% | 78.20% | 2.35 |
| | Program | | 0.85 | Undergraduate | 1.00 | Dec-16 | 1.00 | PHED 113 | Golf | Non-Science | 1.0 | 97.00% | 82.45% | 82.45% | 82.45% | 0.82 |
| | Program | | 0.85 | Undergraduate | 1.00 | Dec-16 | 1.00 | SOCI 201 | Introduction to Sociology | Non-Science | 3.0 | 97.00% | 82.45% | 82.45% | 82.45% | 2.47 |
| | Milestone | AMERICAN DENTAL ASSOCIATION | 1.00 | Undergraduate | 1.00 | Jul-17 | 1.00 | DAT READ | Reading Comprehension | Non-Science | 5.0 | 76.92% | 76.92% | 76.92% | 76.92% | 3.85 |
| | Milestone | AMERICAN DENTAL ASSOCIATION | 1.00 | Undergraduate | 1.00 | Nov-17 | 1.00 | DAT READ | Reading Comprehension | Non-Science | 5.0 | 76.92% | 76.92% | 76.92% | 76.92% | 3.85 |
| | | | | | | | | | | | | | | | | |
| | Program | Institution 17 | 0.85 | Undergraduate | 1.00 | Dec-13 | 1.00 | MATH 151 | Calculus | Science | 4.0 | 86.00% | 73.10% | 73.10% | 73.10% | 2.92 |
| | Program | | 0.85 | Undergraduate | 1.00 | May-14 | 1.00 | EXSI 200 | Introduction to Exercise Sci | Science | 2.0 | 86.00% | 73.10% | 73.10% | 73.10% | 1.46 |
| | Program | | 0.85 | Undergraduate | 1.00 | May-15 | 1.00 | EXSI 307 | Exercise Physiology Lab | Science | 1.0 | 97.00% | 82.45% | 82.45% | 82.45% | 0.82 |
| | Program | | 0.85 | Undergraduate | 1.00 | May-15 | 1.00 | EXSI 315 | Motor Behavior | Science | 3.0 | 97.00% | 82.45% | 82.45% | 82.45% | 2.47 |
| | Program | | 0.85 | Undergraduate | 1.00 | May-15 | 1.00 | EXSI 347 | Physiology of Sport/Exercise | Science | 3.0 | 92.00% | 78.20% | 78.20% | 78.20% | 2.35 |
| | Program | | 0.85 | Undergraduate | 1.00 | May-15 | 1.00 | EXSI 432 | Seminar in Exercise Science | Science | 3.0 | 92.00% | 78.20% | 78.20% | 78.20% | 2.35 |
| | Program | | 0.85 | Undergraduate | 1.00 | May-15 | 1.00 | EXSI 335 | Kinesiology | Science | 3.0 | 89.00% | 75.65% | 75.65% | 75.65% | 2.27 |
| | Program | | 0.85 | Undergraduate | 1.00 | Jun-16 | 1.00 | EXSI 451 | Internship in Exercise Science | Science | 6.0 | 92.00% | 78.20% | 78.20% | 78.20% | 4.69 |
| | Program | | 0.85 | Undergraduate | 1.00 | Dec-16 | 1.00 | PHYS 203 | Gen Phys for Scientist/Eng I | Science | 4.0 | 97.00% | 82.45% | 82.45% | 82.45% | 3.30 |
| | Milestone | | 1.00 | Undergraduate | 1.00 | Jul-17 | 1.00 | DAT QUANT | Quantitative Reasoning | Science | 5.0 | 73.08% | 73.08% | 73.08% | 73.08% | 3.65 |
| | Milestone | AMERICAN DENTAL ASSOCIATION | 1.00 | Undergraduate | 1.00 | Nov-17 | 1.00 | DAT QUANT | Quantitative Reasoning | Science | 5.0 | 69.23% | 69.23% | 69.23% | 69.23% | 3.46 |

FIG. 24

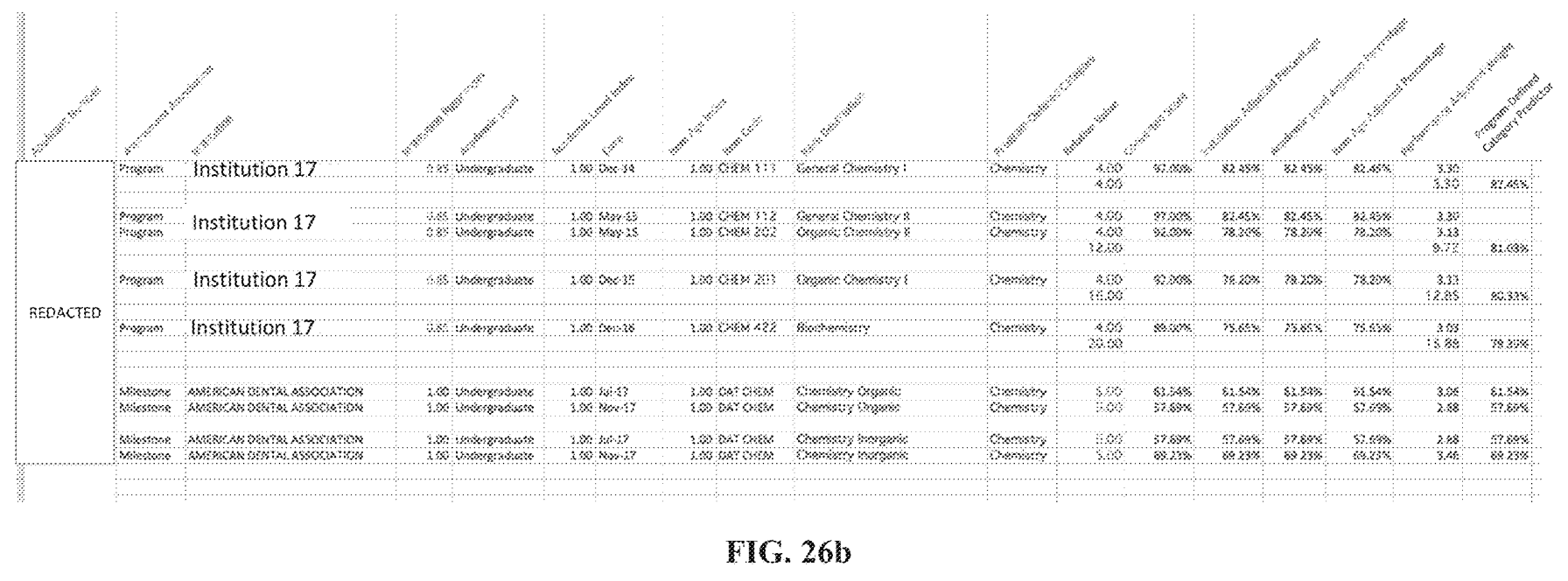

| [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | [illegible] | Program-Defined Category Predictor |
|---|---|---|---|---|---|---|---|---|---|---|---|---|---|---|---|---|---|
| REDACTED | Program | Institution 17 | 0.85 | Undergraduate | 1.00 | Dec-14 | 1.00 | CHEM 111 | General Chemistry I | Chemistry | 4.00 | 97.00% | 82.45% | 82.45% | 82.45% | 3.30 | |
| | | | | | | | | | | | 4.00 | | | | | 3.30 | 82.45% |
| | Program | Institution 17 | 0.85 | Undergraduate | 1.00 | May-15 | 1.00 | CHEM 112 | General Chemistry II | Chemistry | 4.00 | 97.00% | 82.45% | 82.45% | 82.45% | 3.30 | |
| | Program | | 0.85 | Undergraduate | 1.00 | May-15 | 1.00 | CHEM 202 | Organic Chemistry II | Chemistry | 4.00 | 92.00% | 78.20% | 78.20% | 78.20% | 3.13 | |
| | | | | | | | | | | | 12.00 | | | | | 9.73 | 81.03% |
| | Program | Institution 17 | 0.85 | Undergraduate | 1.00 | Dec-15 | 1.00 | CHEM 201 | Organic Chemistry I | Chemistry | 4.00 | 92.00% | 78.20% | 78.20% | 78.20% | 3.13 | |
| | | | | | | | | | | | 16.00 | | | | | 12.85 | 80.33% |
| | Program | Institution 17 | 0.85 | Undergraduate | 1.00 | Dec-16 | 1.00 | CHEM 422 | Biochemistry | Chemistry | 4.00 | 89.00% | 75.65% | 75.65% | 75.65% | 3.03 | |
| | | | | | | | | | | | 20.00 | | | | | 15.88 | 79.39% |
| | Milestone | AMERICAN DENTAL ASSOCIATION | 1.00 | Undergraduate | 1.00 | Jul-17 | 1.00 | DAT CHEM | Chemistry Organic | Chemistry | 5.00 | 61.54% | 61.54% | 61.54% | 61.54% | 3.08 | 61.54% |
| | Milestone | AMERICAN DENTAL ASSOCIATION | 1.00 | Undergraduate | 1.00 | Nov-17 | 1.00 | DAT CHEM | Chemistry Organic | Chemistry | 5.00 | 57.69% | 57.69% | 57.69% | 57.69% | 2.88 | 57.69% |
| | Milestone | AMERICAN DENTAL ASSOCIATION | 1.00 | Undergraduate | 1.00 | Jul-17 | 1.00 | DAT CHEM | Chemistry Inorganic | Chemistry | 5.00 | 57.69% | 57.69% | 57.69% | 57.69% | 2.88 | 57.69% |
| | Milestone | AMERICAN DENTAL ASSOCIATION | 1.00 | Undergraduate | 1.00 | Nov-17 | 1.00 | DAT CHEM | Chemistry Inorganic | Chemistry | 5.00 | 69.23% | 69.23% | 69.23% | 69.23% | 3.46 | 69.23% |

FIG. 26b

| Applicant Number | Achievement Type | Institution | Institution Rigor Index | Academic Level | Assessment Level Index | Date | Item Age Index | Item Code | Item Description | Program-Defined Category | Weighted Value | Converted Score | Institution Adjusted Percentage | Assessment Level Adjusted Percentage | Item Age Adjusted Percentage | Performance Adjusted Weight | Program-Defined Category Predictor |
|---|---|---|---|---|---|---|---|---|---|---|---|---|---|---|---|---|---|
| REDACTED | Program | | 0.85 | Undergraduate | 1.00 | Dec-13 | 1.00 | ENGL 101 | Composition I | Non-Science | 3.00 | 92.00% | 78.20% | 78.20% | 78.20% | 2.35 | |
| | Program | Institution 17 | 0.85 | Undergraduate | 1.00 | Dec-13 | 1.00 | UNIV 111 | DMS/Univ Life in Global Soci | Non-Science | 3.00 | 92.00% | 78.20% | 78.20% | 78.20% | 2.35 | |
| | Program | | 0.85 | Undergraduate | 1.00 | Dec-13 | 1.00 | RELI 101 | Int to the Old Testament | Non-Science | 3.00 | 79.00% | 67.15% | 67.15% | 67.15% | 2.01 | |
| | | | | | | | | | | | 9.00 | | | | | 6.71 | 74.53% |
| | | | | | | | | | | | | | | | | | |
| | Program | | 0.85 | Undergraduate | 1.00 | May-14 | 1.00 | MUSC 225 | Music Survey | Non-Science | 3.00 | 92.00% | 78.20% | 78.20% | 78.20% | 2.35 | |
| | Program | | 0.85 | Undergraduate | 1.00 | May-14 | 1.00 | COMM 330 | Technology & American Society | Non-Science | 3.00 | 92.00% | 78.20% | 78.20% | 78.20% | 2.35 | |
| | Program | Institution 17 | 0.85 | Undergraduate | 1.00 | May-14 | 1.00 | BADM 335 | Business Communications Appl | Non-Science | 3.00 | 86.00% | 73.10% | 73.10% | 73.10% | 2.13 | |
| | Program | | 0.85 | Undergraduate | 1.00 | May-14 | 1.00 | ENGL 102 | Composition II | Non-Science | 3.00 | 89.00% | 75.65% | 75.65% | 75.65% | 2.27 | |
| | Program | | 0.85 | Undergraduate | 1.00 | May-14 | 1.00 | RELI 102 | Int to the New Testament | Non-Science | 3.00 | 76.00% | 64.60% | 64.60% | 64.60% | 1.94 | |
| | | | | | | | | | | | 24.00 | | | | | 17.80 | 74.16% |
| | | | | | | | | | | | | | | | | | |
| | Program | Institution 17 | 0.85 | Undergraduate | 1.00 | Dec-14 | 1.00 | HLED 221 | Dimensions of Personal Health | Non-Science | 3.00 | 97.00% | 82.45% | 82.45% | 82.45% | 2.47 | |
| | Program | | 0.85 | Undergraduate | 1.00 | Dec-14 | 1.00 | ECON 203 | Principles of Economics I | Non-Science | 3.00 | 86.00% | 73.10% | 73.10% | 73.10% | 2.19 | |
| | | | | | | | | | | | 30.00 | | | | | 22.47 | 74.89% |
| | | | | | | | | | | | | | | | | | |
| | Program | Institution 17 | 0.85 | Undergraduate | 1.00 | May-15 | 1.00 | BIOL 222 | Medical Terminology | Non-Science | 1.00 | 97.00% | 82.45% | 82.45% | 82.45% | 0.82 | |
| | Program | Institution 2 | 0.85 | Undergraduate | 1.00 | May-15 | 1.00 | HIS 112 | WORLD CivilizationS II | Non-Science | 3.00 | 97.00% | 82.45% | 82.45% | 82.45% | 2.47 | |
| | Program | | 0.85 | Undergraduate | 1.00 | May-15 | 1.00 | SSCI 205 | Global Understanding | Non-Science | 3.00 | 92.00% | 78.20% | 78.20% | 78.20% | 2.35 | |
| | Program | Institution 17 | 0.85 | Undergraduate | 1.00 | May-15 | 1.00 | SPAN 101 | Real World Spanish: Get Ready! | Non-Science | 3.00 | 92.00% | 78.20% | 78.20% | 78.20% | 2.35 | |
| | Program | | 0.85 | Undergraduate | 1.00 | May-15 | 1.00 | PSYC 201 | General Psychology | Non-Science | 3.00 | 86.00% | 73.10% | 73.10% | 73.10% | 2.19 | |
| | | | | | | | | | | | 43.00 | | | | | 32.65 | 75.93% |
| | | | | | | | | | | | | | | | | | |
| | Program | | 0.85 | Undergraduate | 1.00 | Dec-15 | 1.00 | ENGL 232 | American Lit Survey II A2 | Non-Science | 3.00 | 97.00% | 82.45% | 82.45% | 82.45% | 2.47 | |
| | Program | Institution 17 | 0.85 | Undergraduate | 1.00 | Dec-15 | 1.00 | PSYC 206 | Developmental Psychology | Non-Science | 3.00 | 97.00% | 82.45% | 82.45% | 82.45% | 2.47 | |
| | Program | | 0.85 | Undergraduate | 1.00 | Dec-15 | 1.00 | COMM 233 | Speech | Non-Science | 4.00 | 97.00% | 82.45% | 82.45% | 82.45% | 3.30 | |
| | Program | | 0.85 | Undergraduate | 1.00 | Dec-15 | 1.00 | HIST 101 | Survey of Western Civilization I | Non-Science | 3.00 | 92.00% | 78.20% | 78.20% | 78.20% | 2.35 | |
| | | | | | | | | | | | 56.00 | | | | | 43.24 | 77.21% |
| | | | | | | | | | | | | | | | | | |
| | Program | Institution 17 | 0.85 | Undergraduate | 1.00 | Dec-16 | 1.00 | PHED 153 | Golf | Non-Science | 1.00 | 97.00% | 82.45% | 82.45% | 82.45% | 0.82 | |
| | Program | | 0.85 | Undergraduate | 1.00 | Dec-16 | 1.00 | SOCI 201 | Introduction to Sociology | Non-Science | 3.00 | 97.00% | 82.45% | 82.45% | 82.45% | 2.47 | |
| | | | | | | | | | | | 60.00 | | | | | 46.54 | 77.56% |
| | | | | | | | | | | | | | | | | | |
| | Milestone | AMERICAN DENTAL ASSOCIATION | 1.00 | Undergraduate | 1.00 | Jul-17 | 1.00 | DAT READ | Reading Comprehension | Non-Science | 5.00 | 76.92% | 76.92% | 76.92% | 76.92% | 3.85 | 76.92% |
| | Milestone | AMERICAN DENTAL ASSOCIATION | 1.00 | Undergraduate | 1.00 | Nov-17 | 1.00 | DAT READ | Reading Comprehension | Non-Science | 5.00 | 76.92% | 76.92% | 76.92% | 76.92% | 3.85 | 76.92% |

FIG. 26c

| | 2013.4 | 2014.1 | 2014.2 | 2014.3 | 2014.4 | 2015.1 | 2015.2 | 2015.3 | 2015.4 | 2016.1 | 2016.2 | 2016.3 | 2016.4 | 2017.1 | 2017.2 | 2017.3 | 2017.4 |
|---|---|---|---|---|---|---|---|---|---|---|---|---|---|---|---|---|---|
| Program | | | | | 75.65 | 74.38 | 74.38 | 74.38 | 73.95 | 73.95 | 73.95 | 73.95 | 73.95 | 73.95 | 73.95 | | |
| Milestone | | | | | | | | | | | | | | | 61.54 | | 53.85 |

| | 2013.4 | 2014.1 | 2014.2 | 2014.3 | 2014.4 | 2015.1 | 2015.2 | 2015.3 | 2015.4 | 2016.1 | 2016.2 | 2016.3 | 2016.4 | 2017.1 | 2017.2 | 2017.3 | 2017.4 |
|---|---|---|---|---|---|---|---|---|---|---|---|---|---|---|---|---|---|
| Program | | | | | 82.45 | 81.03 | 81.03 | 81.03 | 80.33 | 80.33 | 80.33 | 80.33 | 79.39 | 79.39 | | | |
| Milestone | | | | | | | | | | | | | | | 61.54 | | 57.69 |
| Milestone | | | | | | | | | | | | | | | 57.69 | | 69.23 |

| | 2013.4 | 2014.1 | 2014.2 | 2014.3 | 2014.4 | 2015.1 | 2015.2 | 2015.3 | 2015.4 | 2016.1 | 2016.2 | 2016.3 | 2016.4 | 2017.1 | 2017.2 | 2017.3 | 2017.4 |
|---|---|---|---|---|---|---|---|---|---|---|---|---|---|---|---|---|---|
| Program | 74.52 | 74.16 | 74.16 | 74.16 | 74.89 | 75.93 | 75.93 | 75.93 | 77.21 | 77.21 | 77.21 | 77.21 | 77.56 | 77.56 | | | |
| Milestone | | | | | | | | | | | | | | | 76.92 | | 76.92 |

| Banner ID | | Biology | Chemistry | Non-Science | Science | | Outcome |
|---|---|---|---|---|---|---|---|
| | | 91.71 | 94.18 | 94.54 | 86.76 | | 95.35 |
| | | 88.10 | 89.78 | 94.59 | 88.13 | | 93.43 |
| | | 97.45 | 96.59 | 94.55 | 89.95 | | 93.40 |
| | | 93.61 | 85.50 | 96.72 | 86.33 | | 93.06 |
| | | 88.43 | 85.67 | 89.71 | 88.30 | | 92.99 |
| | | 78.93 | 79.96 | 86.21 | 82.87 | | 92.58 |
| | | 93.70 | 89.71 | 93.57 | 91.54 | | 92.10 |
| | | 82.33 | 76.32 | 88.19 | 85.31 | | 91.39 |
| | | 86.84 | 76.03 | 91.41 | 84.91 | | 89.62 |
| | | 92.06 | 88.73 | 94.47 | 88.02 | | 89.61 |
| | | 89.25 | 87.93 | 91.70 | 89.99 | | 89.19 |
| | | 79.96 | 87.85 | 68.90 | 52.03 | | 89.16 |
| Student Listing | | 88.79 | 90.51 | 91.83 | 87.47 | | 88.80 |
| | | 91.87 | 84.79 | 94.05 | 90.26 | | 88.62 |
| | | 75.42 | 82.78 | 90.76 | 82.07 | | 88.41 |
| | | 86.16 | 81.26 | 91.64 | 80.04 | | 88.29 |
| | | 78.77 | 73.63 | 91.55 | 88.00 | | 87.98 |
| | | 78.89 | 80.61 | 96.99 | 89.40 | | 87.86 |
| | | 74.55 | 76.11 | 77.18 | 73.43 | | 87.70 |
| | | 80.72 | 76.62 | 76.92 | 85.71 | | 87.68 |
| | | 82.15 | 87.18 | 79.81 | 80.51 | | 87.45 |
| | | 86.58 | 85.43 | 95.39 | 94.28 | | 87.32 |
| | | 86.87 | 75.68 | 87.51 | 78.68 | | 87.12 |
| | | 77.85 | 78.82 | 80.40 | 78.35 | | 87.09 |
| | | 75.70 | 73.53 | 78.80 | 78.58 | | 87.07 |
| | | 84.18 | 71.12 | 89.86 | 80.54 | | 86.97 |
| | | 85.11 | 77.25 | 93.27 | 81.36 | | 86.28 |
| | | 80.66 | 82.96 | 91.90 | 78.47 | | 86.15 |
| | | 77.95 | 76.32 | 89.98 | 81.87 | | 85.92 |
| | | 86.79 | 83.31 | 89.75 | 79.93 | | 85.69 |
| | | 81.79 | 72.98 | 84.59 | 73.63 | | 85.58 |
| | | 77.74 | 68.86 | 89.48 | 73.02 | | 85.57 |
| | | 73.52 | 63.98 | 74.38 | 69.19 | | 85.28 |
| | | 75.71 | 72.91 | 86.99 | 77.66 | | 85.25 |
| | | 80.62 | 75.72 | 82.83 | 75.62 | | 85.19 |
| | | 81.23 | 74.60 | 88.27 | 86.21 | | 85.14 |
| | | 88.70 | 84.72 | 91.42 | 85.58 | | 85.05 |
| | | 76.34 | 83.78 | 88.61 | 78.37 | | 84.96 |
| | | 75.66 | 64.38 | 78.61 | 69.79 | | 84.66 |
| | | 67.11 | 66.46 | 71.80 | 69.70 | | 84.53 |
| | | 75.88 | 73.87 | 68.25 | 69.84 | | 84.43 |
| | | 89.08 | 82.25 | 90.05 | 87.16 | | 84.10 |
| | | 74.58 | 67.34 | 75.50 | 67.06 | | 84.05 |
| | | 88.26 | 87.40 | 89.18 | 88.43 | | 83.92 |
| | | 77.86 | 68.73 | 80.09 | 75.42 | | 83.64 |
| | | 91.87 | 77.12 | 86.91 | 90.35 | | 83.56 |
| | | 72.94 | 77.18 | 78.10 | 78.07 | | 83.54 |
| | | 75.23 | 78.06 | 73.93 | 79.54 | | 83.51 |
| | | 83.92 | 77.45 | 79.44 | 79.54 | | 83.46 |
| | | 74.88 | 70.78 | 75.65 | 70.24 | | 83.46 |
| | | 72.27 | 71.39 | 75.96 | 72.29 | | 83.26 |
| | | 80.26 | 75.76 | 83.02 | 80.09 | | 83.18 |
| | | 69.30 | 61.79 | 72.39 | 71.22 | | 83.13 |

FIG. 29

```
##
## Call:
## dr(formula = Outcome ~ Biology + Chemistry + NonScience + Science,
##     data = data.19.20, method = "sir", nslices = 8)
##
```

FIG. 31

```
## Method:
## sir with 8 slices, n = 98.
##
## Slice Sizes:
## 12 12 12 12 12 12 13 13
```

FIG. 32

```
## Estimated Basis Vectors for Central Subspace:
##               Dir1   Dir2    Dir3    Dir4
## Biology    -0.644  0.440  0.0941  0.7601
## Chemistry  -0.676 -0.669  0.1204 -0.2228
## NonScience -0.145  0.587  0.5054 -0.6095
## Science     0.327 -0.120 -0.8492  0.0325
```

FIG. 33

```
##
##                Dir1   Dir2   Dir3   Dir4
## Eigenvalues 0.451 0.0724 0.0491 0.0262
## R^2(OLS|dr) 0.993 0.9994 0.9999 1.0000
```

FIG. 34

```
## Large-sample Marginal Dimension Tests:
##              Stat df  p.value
## 0D vs >= 1D 58.64 28 0.000606
## 1D vs >= 2D 14.48 18 0.697410
## 2D vs >= 3D  7.38 10 0.689176
## 3D vs >= 4D  2.56  4 0.633081
```

FIG. 35

2.2. Linear Regression of Outcome on Composite Score

```
##
## Call:
## lm(formula = Outcome ~ Score, data = data.19.20)
##
## Residuals:
##     Min      1Q  Median      3Q     Max
## -11.186  -2.230  -0.276   2.841   7.420
##
## Coefficients:
##             Estimate Std. Error t value Pr(>|t|)
## (Intercept)  45.7939     4.2543   10.76  < 2e-16 ***
## Score         0.4072     0.0475    8.57  1.8e-13 ***
## ---
## Signif. codes:  0 '***' 0.001 '**' 0.01 '*' 0.05 '.' 0.1 ' ' 1
##
## Residual standard error: 3.92 on 96 degrees of freedom
## Multiple R-squared:  0.433,  Adjusted R-squared:  0.427
## F-statistic: 73.4 on 1 and 96 DF,  p-value: 1.76e-13
```

FIG. 36

| Banner ID | | Biology | Chemistry | Non-Science | Science |
|---|---|---|---|---|---|
| | | 85.59 | 83.81 | 93.69 | 94.00 |
| | | 85.78 | 88.81 | 95.89 | 93.48 |
| | | 91.50 | 86.60 | 92.25 | 91.04 |
| | | 87.18 | 87.38 | 93.61 | 90.85 |
| | | 90.87 | 91.10 | 94.87 | 90.68 |
| | | 90.65 | 85.77 | 93.88 | 89.11 |
| | | 86.57 | 82.98 | 89.62 | 87.15 |
| | | 82.64 | 79.76 | 91.88 | 85.29 |
| | | 84.10 | 90.68 | 83.66 | 84.48 |
| | | 89.75 | 85.06 | 95.03 | 84.38 |
| | | 87.08 | 73.65 | 87.48 | 83.80 |
| | | 86.29 | 73.73 | 84.74 | 83.41 |
| Applicant Listing | | 85.10 | 86.77 | 87.83 | 82.94 |
| | | 78.38 | 76.69 | 77.69 | 82.20 |
| | | 75.65 | 67.62 | 85.66 | 82.00 |
| | | 85.30 | 83.72 | 83.34 | 81.65 |
| | | 82.86 | 81.79 | 92.84 | 81.38 |
| | | 76.97 | 76.09 | 82.42 | 81.27 |
| | | 82.20 | 83.13 | 83.33 | 81.13 |
| | | 89.51 | 56.48 | 92.53 | 80.76 |
| | | 85.27 | 79.20 | 91.74 | 80.43 |
| | | 88.18 | 83.56 | 91.43 | 80.04 |
| | | 75.76 | 80.11 | 78.96 | 79.99 |
| | | 77.37 | 79.89 | 80.92 | 79.52 |
| | | 83.17 | 75.99 | 92.80 | 79.51 |
| | | 82.06 | 68.84 | 81.00 | 79.35 |
| | | 77.03 | 78.41 | 83.30 | 78.81 |
| | | 82.03 | 80.68 | 83.09 | 78.81 |
| | | 89.47 | 81.65 | 90.55 | 78.76 |
| | | 81.88 | 77.05 | 87.36 | 78.57 |
| | | 81.69 | 80.24 | 89.89 | 77.91 |
| | | 78.41 | 75.42 | 84.98 | 77.42 |
| | | 74.04 | 75.31 | 79.31 | 77.18 |
| | | 73.27 | 66.66 | 86.84 | 76.94 |
| | | 81.29 | 76.85 | 77.72 | 76.43 |
| | | 79.65 | 83.52 | 84.63 | 75.98 |
| | | 74.37 | 67.86 | 76.88 | 74.76 |
| | | 71.48 | 70.13 | 75.41 | 74.92 |
| | | 77.94 | 76.71 | 67.82 | 72.94 |
| | | 75.31 | 75.18 | 75.74 | 72.04 |
| | | 67.04 | 71.67 | 74.53 | 70.62 |
| | | 72.33 | 69.11 | 79.39 | 70.19 |
| | | 68.68 | 67.26 | 79.91 | 70.10 |
| | | 71.76 | 61.84 | 75.91 | 69.20 |
| | | 68.84 | 64.80 | 74.72 | 69.16 |
| | | 70.99 | 75.22 | 72.20 | 67.87 |
| | | 73.95 | 77.07 | 75.48 | 65.67 |
| | | 68.38 | 64.82 | 74.83 | 65.35 |
| | | 71.67 | 67.97 | 74.50 | 64.13 |
| | | 65.12 | 69.00 | 60.88 | 56.81 |

FIG. 46

2.3. Predicting the 2021 Cohort

| ## | Banner ID | Biology | Chemistry | NonScience | Science | Score |
|---|---|---|---|---|---|---|
| ## 1 | 2.02e+10 | 71.5 | 71.5 | 80.0 | 79.2 | 80.1 |
| ## 2 | 2.02e+10 | 77.7 | 83.8 | 81.9 | 67.1 | 96.6 |
| ## 3 | 2.02e+10 | 75.1 | 69.7 | 78.2 | 77.6 | 81.4 |
| ## 4 | 2.02e+10 | 81.6 | 79.1 | 87.6 | 75.7 | 94.0 |
| ## 5 | 2.02e+10 | 76.8 | 79.4 | 87.9 | 82.5 | 88.9 |
| ## 6 | 2.02e+10 | 77.7 | 76.6 | 80.9 | 81.5 | 86.9 |
| ## 7 | 2.02e+10 | 88.0 | 83.7 | 91.5 | 87.7 | 97.8 |
| ## 8 | 2.02e+10 | 75.4 | 70.4 | 90.1 | 76.6 | 84.2 |
| ## 9 | 2.02e+10 | 75.2 | 78.5 | 80.2 | 79.4 | 87.1 |
| ## 10 | 2.02e+10 | 79.3 | 79.7 | 85.3 | 81.5 | 90.7 |
| ## 11 | 2.02e+10 | 86.4 | 82.6 | 90.0 | 87.2 | 96.0 |
| ## 12 | 2.02e+10 | 81.8 | 82.8 | 84.1 | 85.1 | 93.0 |
| ## 13 | 2.02e+10 | 86.7 | 78.5 | 88.7 | 84.5 | 94.1 |
| ## 14 | 2.02e+10 | 81.4 | 79.1 | 89.9 | 79.7 | 92.9 |
| ## 15 | 2.02e+10 | 66.6 | 70.5 | 77.1 | 76.9 | 76.5 |

FIG. 48c

| Score | Middle 50% |
|---|---|
| 80.09 | 78.40 |
| 96.62 | 85.13 |
| 81.39 | 78.93 |
| 93.96 | 84.05 |
| 88.91 | 81.99 |
| 86.87 | 81.17 |
| 97.81 | 85.62 |
| 84.18 | 80.07 |
| 87.14 | 81.28 |
| 90.67 | 82.71 |
| 96.04 | 84.90 |
| 93.00 | 83.66 |
| 94.09 | 84.10 |
| 92.88 | 83.61 |
| 76.51 | 76.95 |

FIG. 48d

| ## | Score | Lower 50% | Lower 10% | Lower 5% | Lower 1% |
|---|---|---|---|---|---|
| ## 1 | 80.1 | 78.4 | 73.3 | 71.8 | 69.0 |
| ## 2 | 96.6 | 85.1 | 80.0 | 78.6 | 75.8 |
| ## 3 | 81.4 | 78.9 | 73.8 | 72.4 | 69.6 |
| ## 4 | 94.0 | 84.0 | 79.0 | 77.5 | 74.7 |
| ## 5 | 88.9 | 82.0 | 76.9 | 75.5 | 72.7 |
| ## 6 | 86.9 | 81.2 | 76.1 | 74.6 | 71.8 |
| ## 7 | 97.8 | 85.6 | 80.5 | 79.0 | 76.2 |
| ## 8 | 84.2 | 80.1 | 75.0 | 73.5 | 70.7 |
| ## 9 | 87.1 | 81.3 | 76.2 | 74.7 | 72.0 |
| ## 10 | 90.7 | 82.7 | 77.6 | 76.2 | 73.4 |
| ## 11 | 96.0 | 84.9 | 79.8 | 78.3 | 75.5 |
| ## 12 | 93.0 | 83.7 | 78.6 | 77.1 | 74.3 |
| ## 13 | 94.1 | 84.1 | 79.0 | 77.5 | 74.8 |
| ## 14 | 92.9 | 83.6 | 78.5 | 77.1 | 74.3 |
| ## 15 | 76.5 | 77.0 | 71.8 | 70.3 | 67.5 |

FIG. 48e

| ## | P(<75%) |
|---|---|
| ## 1 | 0.20 |
| ## 2 | 0.01 |
| ## 3 | 0.16 |
| ## 4 | 0.01 |
| ## 5 | 0.04 |
| ## 6 | 0.06 |
| ## 7 | 0.00 |
| ## 8 | 0.10 |
| ## 9 | 0.06 |
| ## 10 | 0.03 |
| ## 11 | 0.01 |
| ## 12 | 0.02 |
| ## 13 | 0.01 |
| ## 14 | 0.02 |
| ## 15 | 0.31 |

FIG. 48f

| ## | | Score | Upper 10% | Upper 5% | Upper 1% |
|---|---|---|---|---|---|
| ## | 1 | 80.1 | 83.52 | 84.98 | 87.78 |
| ## | 2 | 96.6 | 90.24 | 91.70 | 94.49 |
| ## | 3 | 81.4 | 84.04 | 85.50 | 88.29 |
| ## | 4 | 94.0 | 89.14 | 90.61 | 93.39 |
| ## | 5 | 88.9 | 87.08 | 88.54 | 91.31 |
| ## | 6 | 86.9 | 86.25 | 87.71 | 90.49 |
| ## | 7 | 97.8 | 90.73 | 92.20 | 94.99 |
| ## | 8 | 84.2 | 85.16 | 86.62 | 89.40 |
| ## | 9 | 87.1 | 86.36 | 87.82 | 90.60 |
| ## | 10 | 90.7 | 87.80 | 89.26 | 92.03 |
| ## | 11 | 96.0 | 90.00 | 91.46 | 94.25 |
| ## | 12 | 93.0 | 88.75 | 90.21 | 92.99 |
| ## | 13 | 94.1 | 89.20 | 90.66 | 93.44 |
| ## | 14 | 92.9 | 88.70 | 90.16 | 92.94 |
| ## | 15 | 76.5 | 82.09 | 83.56 | 86.37 |

FIG. 48g

| ## | | Score | P(>90%) |
|---|---|---|---|
| ## | 1 | 80.1 | 0.00 |
| ## | 2 | 96.6 | 0.11 |
| ## | 3 | 81.4 | 0.00 |
| ## | 4 | 94.0 | 0.07 |
| ## | 5 | 88.9 | 0.02 |
| ## | 6 | 86.9 | 0.01 |
| ## | 7 | 97.8 | 0.14 |
| ## | 8 | 84.2 | 0.01 |
| ## | 9 | 87.1 | 0.01 |
| ## | 10 | 90.7 | 0.03 |
| ## | 11 | 96.0 | 0.10 |
| ## | 12 | 93.0 | 0.06 |
| ## | 13 | 94.1 | 0.07 |
| ## | 14 | 92.9 | 0.05 |
| ## | 15 | 76.5 | 0.00 |

FIG. 48h

APPARATUS FOR IMPROVING APPLICANT SELECTION BASED ON PERFORMANCE INDICES

RELATED APPLICATION

This application is a continuation application of, and claims priority to, U.S. patent application Ser. No. 16/116,177 filed Aug. 29, 2018, which claims the benefit of U.S. Provisional Patent Application Ser. No. 62/552,707, filed Aug. 31, 2017, entitled "Apparatus for Improving Applicant Selection Based on Performance Indices," the disclosures of which are incorporated herein in their entireties by reference.

FIELD OF THE INVENTION

The invention relates to systems, methods and computer program products, and more specifically to tools that can predict student performance in different skill areas so as to process student placement in academic programs.

BACKGROUND

In situations where a limited number of positions are available for a particular program, such as a position within a cohort of an academic program, evaluation of future success within the program can be important. For example, within an academic educational program such as a graduate medical program, the number of seats may be limited, and the number of applicants may be large. Administrators of such a program may wish to offer positions within the program only to those applicants likely to succeed.

The importance of proper selection may be compounded by the fact that a course of instruction in the academic program may span a number of years and, therefore, academic placement decisions may represent a multi-year commitment to the applicant. Further, the course of instruction may be such that, if an applicant leaves as a result of being unsuccessful, the applicant's position in that particular cohort may not be capable of being replaced. In this way, a failure of a prediction as to applicant success may lead to consequences in the form of dwindling cohort population, reduced resources, and/or decreased educational efficiency.

In the past, academic programs have used various parameters to compare applicants. For example, academic programs may use test scores, transcripts, and grades as parameters for evaluation. However, the use of such parameters is complicated by the underlying uniqueness of the data. Grades achieved by a given applicant are unique to a particular class at a particular learning institution. It may be difficult to compare those grades to another applicant who has taken a different, but similar, class at a different learning institution. Similarly, test scores provided for a given applicant may be for a first type of examination, while another applicant may provide test scores for a second type of examination. Compounding the complexity is the need to rate the applicants not just on overall quality of prior work, but on their ability to be successful within a particular course of study.

SUMMARY

According to some embodiments, an apparatus for determining an application status of an applicant for an educational program may include a processor, and a memory coupled to the processor and storing computer readable program code that when executed by the processor causes the processor to perform operations including receiving, over a computer network, cohort performance data comprising a plurality of first data entries for a plurality of participants that have respectively achieved outcomes for the educational program, calculating, in the memory, adjusted cohort performance data based on the cohort performance data and first data characteristics, wherein the first data characteristics comprise a plurality of predictive parameters, providing, in the memory, a predictor model based on the adjusted cohort performance data and the outcomes, sequentially changing each of the predictive parameters of the first data characteristics to create second data characteristics and creating an adjusted predictor model based on the second data characteristics and the outcomes, receiving, over the computer network, applicant performance data comprising a plurality of second data entries for the applicant, calculating, in the memory, adjusted applicant performance data based on the applicant performance data and the second data characteristics, calculating a probability of success for the applicant in the educational program based on the adjusted applicant performance data and the adjusted predictor model, and automatically altering, by the processor, an application status of the applicant responsive to the probability of success.

According to some embodiments, a method for determining an application status of an applicant for an educational program includes receiving cohort performance data comprising a plurality of first data entries for a plurality of participants that have respectively achieved outcomes for the educational program, calculating adjusted cohort performance data based on the cohort performance data and first data characteristics, wherein the first data characteristics comprise a plurality of predictive parameters, providing a predictor model based on the adjusted cohort performance data and the outcomes, sequentially changing each of the predictive parameters of the first data characteristics to create second data characteristics and creating an adjusted predictor model based on the second data characteristics and the outcomes, receiving applicant performance data comprising a plurality of second data entries for the applicant, calculating adjusted applicant performance data based on the applicant performance data and the second data characteristics, calculating a probability of success for the applicant in the educational program based on the adjusted applicant performance data and the adjusted predictor model, and automatically altering an application status of the applicant responsive to the probability of success.

According to some embodiments, a computer program product for operating an electronic device comprising a non-transitory computer readable storage medium having computer readable program code embodied in the medium that when executed by a processor causes the processor to perform the operations including receiving, over a computer network, cohort performance data comprising a plurality of first data entries for a plurality of participants that have respectively achieved outcomes for an educational program, calculating adjusted cohort performance data based on the cohort performance data and first data characteristics, wherein the first data characteristics comprise a plurality of predictive parameters, providing a predictor model based on the adjusted cohort performance data and the outcomes, sequentially changing each of the predictive parameters of the first data characteristics to create second data characteristics and creating an adjusted predictor model based on the second data characteristics and the outcomes, receiving, over the computer network, applicant performance data comprising a plurality of second data entries for the applicant, calculating adjusted applicant performance data based on the applicant performance data and the second data characteristics, calculating a probability of success for the applicant in the educational program based on the adjusted applicant performance data and the adjusted predictor model, and automatically altering an application status of the applicant responsive to the probability of success.

In some embodiments, the applicant performance data may include a plurality of categories, and calculating the adjusted applicant performance data based on the applicant performance data and the second data characteristics comprises collating the applicant performance data by categories of the plurality of categories.

In some embodiments, the plurality of categories comprise a biology category, a chemistry category, a science category that is different from biology and chemistry, and a non-science category.

In some embodiments, respective ones of the plurality of predictive parameters comprise a lower bound and an upper bound, and sequentially changing each of the predictive parameters of the first data characteristics to create the second data characteristics and creating the adjusted predictor model based on the second data characteristics and the outcomes includes sequentially selecting a plurality of values between the lower bound and the upper bound for respective ones of the plurality of predictive parameters, and creating the adjusted predictor model based on recalculating the predictor model for each of the plurality of values.

In some embodiments, the plurality of variable indices may include a rigor index associated with institutions of the second data entries of the cohort performance data, a relative value index that indicates a relative weight of ones of the second data entries of the cohort performance data as associated with others of the second data entries in the cohort performance data, an academic level index associated with institutions of the second data entries of the cohort performance data, and an age index associated with an age of the second data entries of the cohort performance data.

In some embodiments, sequentially changing each of the predictive parameters of the first data characteristic to create the second data characteristics and recalculating the predictor model comprises changing the predictive parameters in an order of rigor index, relative value index, academic level index, and age index.

In some embodiments, the operations may further include upon completion of the educational program, adding the applicant performance data and an applicant outcome for the applicant in the educational program to the cohort performance data.

In some embodiments, calculating the predictor model based on the adjusted cohort performance data and the outcomes comprising calculating a regression for the adjusted cohort performance data and the outcomes using a sliced inverse regression (SIR) model.

In some embodiments, each data entry of the plurality of second data entries comprises a score, and calculating the adjusted applicant performance data based on the applicant performance data and the second data characteristics comprises, for each data entry of the plurality of second data entries, converting the score to a percentage, calculating an institution-adjusted percentage based on the percentage and a rigor index of the plurality of predictive parameters, calculating an academic level-adjusted percentage based on the institution-adjusted percentage and an academic level index of the plurality of predictive parameters, calculating an age-adjusted percentage based on the academic level-adjusted percentage and an age index of the plurality of predictive parameters, and calculating performance adjusted weight based on the age-adjusted percentage and a relative value index of the plurality of predictive parameters In some embodiments, the applicant performance data comprises a plurality of categories, and calculating the adjusted applicant performance data based on the applicant performance data and the second data characteristics further includes grouping the plurality of data entries into a plurality of data entry groups, wherein respective ones of the plurality of data entry groups comprise data entries sharing a same category of the plurality of categories, and for each data entry group, calculating a category predictor based on a sum of the performance adjusted weights and the relative value indices of the data entries of the data entry group.

As will be appreciated by those of skill in the art in light of the above discussion, the present invention may be embodied as methods, systems and/or computer program products or combinations of same. In addition, it is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE FIGURES

The above and other objects and features will become apparent from the following description with reference to the following figures, wherein like reference numerals refer to like parts throughout the various figures unless otherwise specified.

FIG. 3 is a table of a sample subset of data from an example import of pre-matriculation performance data, according to various embodiments described herein.

FIG. 4 is a table of a sample subset of data from an example import of milestone data, according to various embodiments described herein.

FIG. 6 is a table that illustrates a sample conversion of a date column of the imported data, according to various embodiments described herein.

FIG. 7 is a table that illustrates an example alteration of a program-defined category of the imported data, according to various embodiments described herein.

FIG. 8 is a table that illustrates an identification of multiple entries of the imported data which have missing item code entries and/or program-defined category entries, according to various embodiments described herein.

FIG. 9 is a table that illustrates replacement of entries of the imported data identified as missing in the operation of FIG. 8.

FIG. 10 is a table that illustrates an identification of multiple entries from a data import which have missing relative value index entries, according to various embodiments described herein.

FIG. 11 is a table that illustrates replacement of entries of the imported data identified as missing in the operation of FIG. 10.

FIG. 12 is a table that illustrates replacement of example reported score entries, according to various embodiments as described herein.

FIG. 14 is a table of sample of institutions and respective rigor indices that may be associated with the applicants of a given academic program, according to various embodiments described herein.

FIG. 15 is a table that illustrates the addition of a rigor index to a selected sample of institutions of the performance data, according to various embodiments described herein.

FIG. 16 is a table that illustrates the addition of an Institution Adjusted Percentage column with values based on the converted score and the rigor index for the given institution, according to various embodiments described herein.

FIG. 17 is a table that illustrates the addition of an Academic Level Index column, according to various embodiments described herein.

FIG. 18 is a table that illustrates the addition of an Academic Level Adjusted Percentage column with values based on the academic level index, according to various embodiments described herein.

FIG. 24 is a table that illustrates the sorting of the performance data first by the program-defined category, according to various embodiments described herein.

FIGS. 26*a*-26*d* are tables that illustrate example profiles for program-defined categories, according to various embodiments as described herein.

FIG. 29 is a table that illustrates applicant data for prior participants who have completed the program for which a predictor is desired, according to various embodiments described herein.

FIG. 31 illustrates a function call in a computer program method that may generate the equally sized slices based on the data set, according to various embodiments described herein.

FIG. 32 illustrates a computer program output indicating the selection of the equally sized slices, according to various embodiments described herein.

FIG. 33 illustrates the generation of the eigenvalues for respective ones of the predictors for the performance categories, according to various embodiments described herein.

FIG. 34 illustrates the generation of an R2 value for a set of basis vectors, according to various embodiments described herein.

FIG. 35 illustrates the generation of p values for the basis vectors, according to various embodiments described herein.

FIG. 36 illustrates a completed linear regression of on outcome on the composite score, according to various embodiments described herein.

FIG. 46 is a table that illustrates a set of calculated values for each of the program-defined categories as calculated for a series of applicants, according to various embodiments described herein.

FIGS. 48*c*-48*h* are tables that illustrate the analysis of composite scores compared to the adjusted linear regression, according to various embodiments described herein.

DETAILED DESCRIPTION

Figure 1:
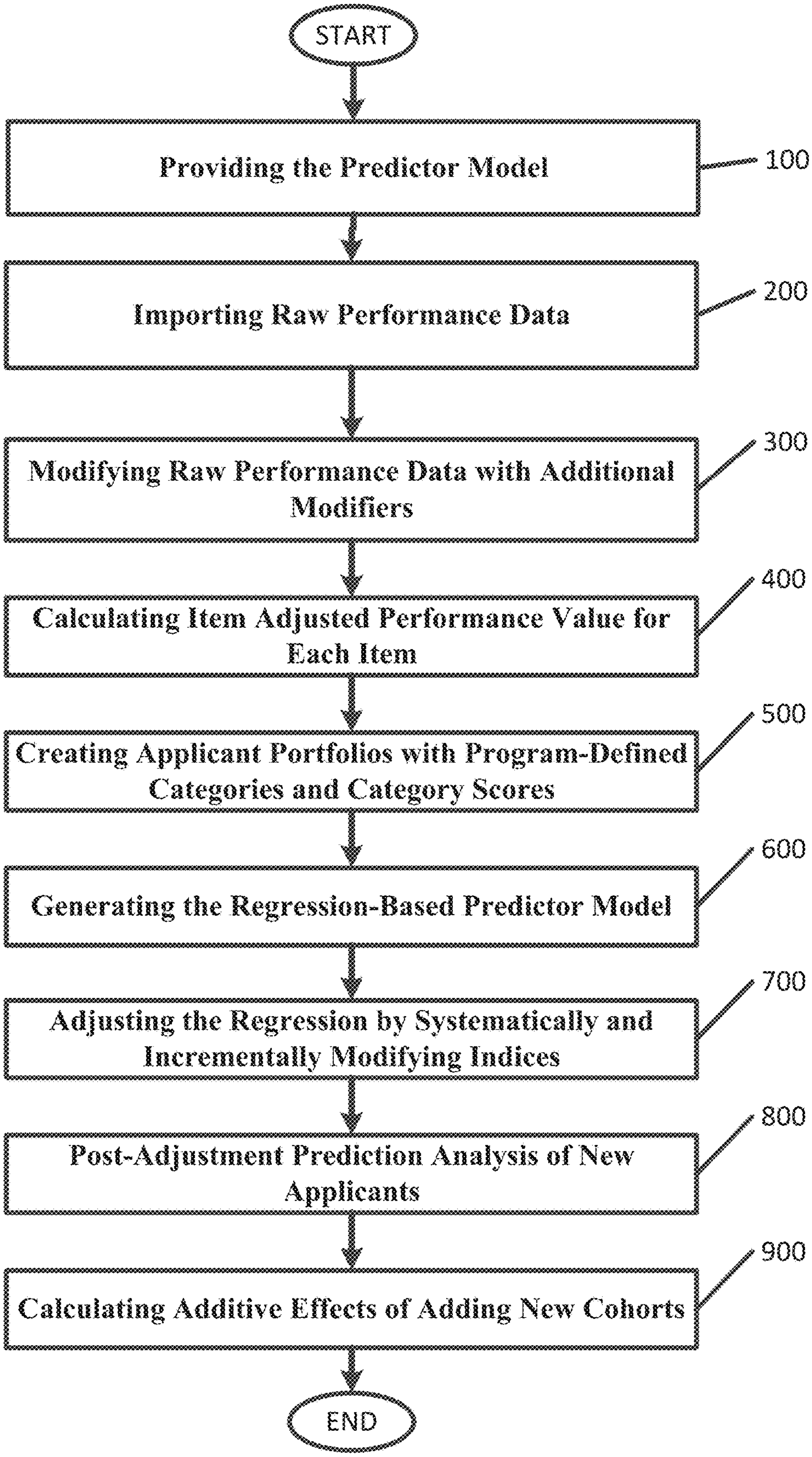
FIG. 1 is a flowchart of example operations that can improve applicant selection, according to various embodiments described herein.

The present invention will now be described more fully hereinafter with reference to the accompanying figures, in which preferred embodiments of the invention are shown. This invention may, however, be embodied in many different forms and should not be construed as limited to the embodiments set forth herein.

Like numbers refer to like elements throughout. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that, although the terms first, second, etc. may be used herein to describe various elements, components, regions, features, steps, layers and/or sections, these elements, components, features, steps, regions, layers and/or sections should not be limited by these terms. These terms are only used to distinguish one element, component, feature, step, region, layer or section from another region, layer or section. Thus, a first element, component, region, layer, feature, step or section discussed below could be termed a second element, component, region, layer, feature, step or section without departing from the teachings of the present invention. The sequence of operations (or steps) is not limited to the order presented in the claims or figures unless specifically indicated otherwise.

As will be appreciated by one skilled in the art, aspects of the present invention may be illustrated and described herein in any of a number of new and useful process, machine, manufacture, or composition of matter, or any new and useful improvement thereof. Accordingly, aspects of the present invention may be implemented entirely as hardware, entirely as software (including firmware, resident software, micro-code, etc.) or combining software and hardware implementations that may all generally be referred to herein as a "circuit," "module," "component," or "system." Furthermore, aspects of the present invention may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present invention are described herein with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Generally stated, embodiments of the present invention improves the selection of applicants through an automated system capable of predicting success of an applicant for an educational program using four identified prediction parameters that can be modified for a statistical correlation to actual outcomes for prior participants in the educational program. The techniques described herein may predict the likelihood of success for a given applicant using selection data for the purposes of achieving a particular position of a limited number of positions available for a particular educational cohort. The selection data may include performance data for the applicant from a particular educational institution of a plurality of educational institutions and/or achievement scores from one or more aptitude assessments. The predictor model may be modified over time to (1) improve the analysis and subsequent predictive power of the selection data, (2) calculate the relative (comparative) rigor of a plurality of different educational institutions, and (3) calculate the relative importance of milestone aptitude assessments.

The present invention describes a technique for providing for prediction in at least four areas of performance. The predictors may include (1) cognitive prediction that predicts how a student will likely perform on knowledge understanding and application, (2) non-cognitive prediction that predicts how hard a student will work to overcome challenges to achieve success, (3) skills prediction that evaluates how the student will perform physically-measurable procedures, and (4) communication prediction that evaluates how well a student can communicate with written or verbal skills. Details of the methods used for cognitive prediction will be described herein for the purposes of example, but it will be understood by those of skill in the art that the described methods may be equally applied to other predictors without deviating from the scope and spirit of the present invention.

The present invention provides multiple technical improvements over conventional admission procedures. For example, the systems, methods, and computer program products described herein provide a deterministic process that is repeatable, statistically valid, and not subject to subjective decisions. Predictions made with the predictor models described herein are objective and are capable of being statistically validated by the underlying data. In addition, the embodiments described herein provide an automatic way to process applicants that may greatly save on resources. The embodiments described herein may be performed automatically based on existing data, and may perform operations using thousands, and potentially millions, of calculations automatically without requiring human intervention. Such a large raw number of inputs and operations is thought to be unmanageable if performed by a person. The use of the embodiments herein thus provide for a more efficient system capable of greater accuracy, efficient processing, and repeatable and statistically valid results.

In addition, the systems, methods, and computer program products described herein provide techniques that combine the student results from grades with performance on aptitude tests for better accuracy. Also, the systems, methods, and computer program products described herein mathematically estimate the relative rigor of feeder institutions using machine learning from aggregated performance from all students from the same schools. Thus, the relative rigor may be automatically adjusted based on performance, and may adapt over time as the feeder institution changes. The systems, methods, and computer program products described herein also mathematically estimate the relative value of grades versus aptitude tests using aggregated performance of all applicants who have taken the aptitude tests. This performance-based approach may result in an automatic weighting between types of admission data that is based on real-world activities. The systems, methods, and computer program products described herein customize predictors such as those described herein to the individual program instead of all students applying to all programs. This customization can be helpful because every program is different, and one student may be more aligned with one program versus another.

The term "cohort" refers to a group of students who are being evaluated using the same identified components, elements or factors, e.g., for a similar set of competencies and/or microcompetencies. Some examples of cohorts may include students grouped by a class, a professor, an associated institution (e.g., college or graduate school), and/or an assigned educational resource for a class (e.g., a metacoded book), among others.

There are at least four specific modifiable indices (also referred to herein as prediction paramters) for each predictor based on the selection data. The first is a relative value index (or "relative value") which quantifies the relative weight on one item as associated with others in the same data set. The second is an institution rigor index which qualifies the relative academic difficulty of each institution that has evaluated an applicant. The third is an academic level index which quantifies the relative academic difficulty based on the terminal degree. The fourth is an age index which quantifies the expected relative degradation of expertise in an educational subject area based on the time difference between encountering the subject and the applicant's need to use the information in the new program.

All four indices for a specific predictor can be fixed or variable. In general, when an index value is fixed it may be because there is agreement concerning the data by all academic programs of similar level. When an index value is variable, it may be because there are items that have not been used with fixed-value items. Incremental modification may be used to change the numeric value of a variable index value. When the value of the index maximizes and/or improves a given statistical analysis, it can become a fixed variable for a subsequent analysis. When the data is initially loaded, each index value may be identified as fixed or variable.

All four indices may have defining upper and lower limits that define what is possible for the incremental modification. When the initial data is loaded, the value for variable indices may be estimated between the upper and lower limits.

There may be three defined assessment associations. The first may be program assessments with questions written by the faculty of the program. The second may be milestone assessments that are externally validated and are given to predict future performance. The third may be capstone assessments that are externally validated and are given to define success of a program.

FIG. 1 illustrates a method for improving applicant selection, according to various embodiments described herein. As illustrated in FIG. 1, a methods, systems and computer program products for improvements applicant selection based on performance indices may include a plurality of operations: providing the predictor model (block 100), importing raw performance data (block 200), modifying raw performance data with additional (e.g., three) modifiers (block 300), calculating an item adjusted performance value for each item (block 400), creating applicant portfolios with program-defined categories and category scores (block 500), generating a regression-based predictor model (block 600), adjusting the regression by systematically and incrementally modifying four indices (block 700), post-adjustment prediction analysis of new applicants (block 800), and calculating additive effects of adding new cohorts (block 900).

Providing the Predictor Model

Methods, systems, and computer program products described herein may include providing the predictor model (block 100). The predictor may use three components: (1) pre-matriculation performance data from related experiences before entering a program, (2) program performance data for students who have participated in the program, e.g., outcomes, and (3) program definitions of failure and success as is defined by particular outcomes. The pairing of pre-matriculation performance data with program outcomes is a useful factor of developing predictors. In education, the prediction may be more accurate if the matching is specific. For instance, for a cognitive predictor, exams of knowledge before entering the program may be paired with exams of knowledge within the program. Similarly, to assist in effectiveness of the prediction, a program should have a valid measure of skills before being able to pair the data with a skills predictor. The same may be true for non-cognitive and communication predictors.

Importing Raw Performance Data

Figure 2:
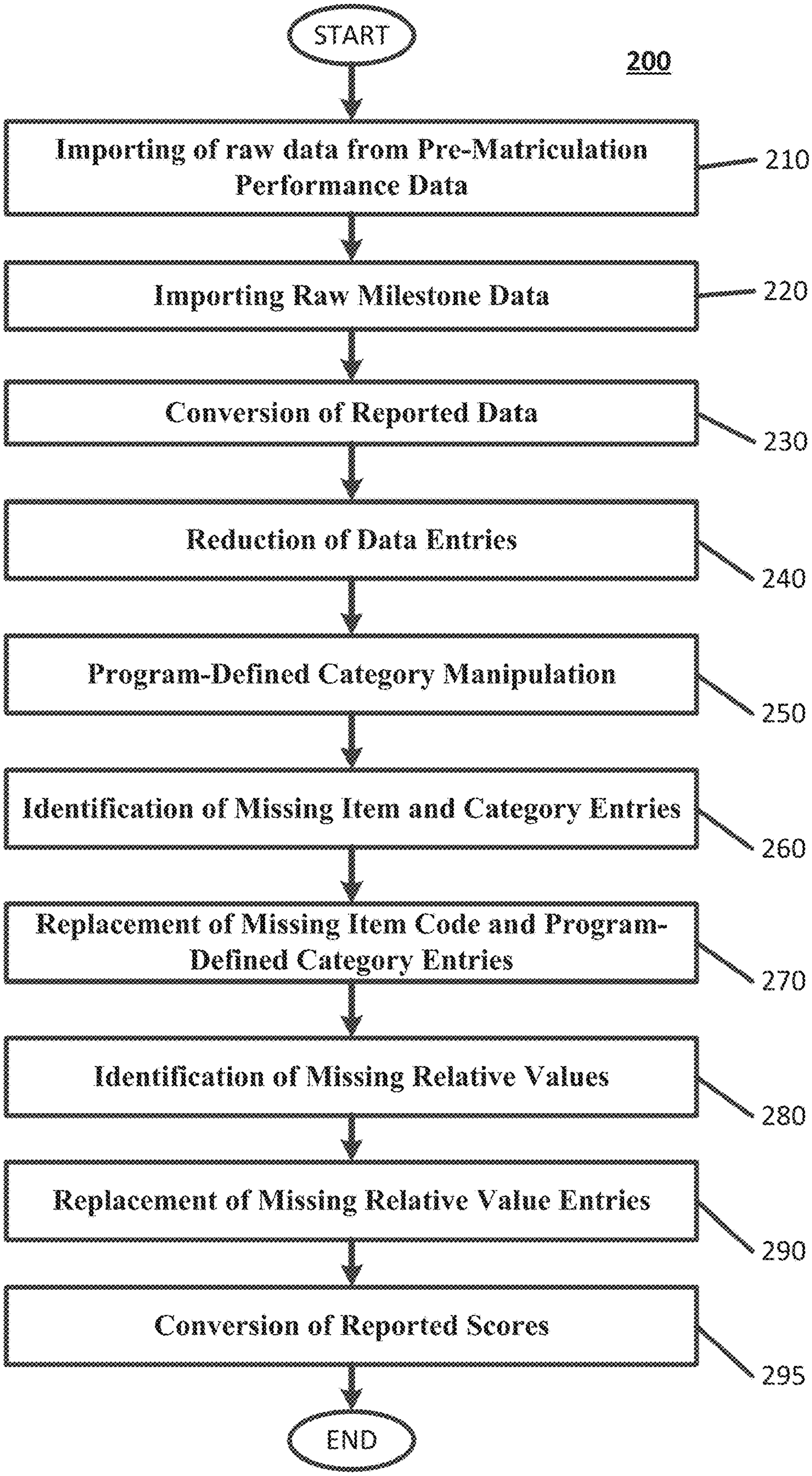
FIG. 2 is a flowchart that illustrates importing raw performance data, according to various embodiments described herein.

Methods, systems, and computer program products described herein may include importing raw performance data (block 200). FIG. 2 illustrates a method for importing raw performance data, according to various embodiments described herein. As illustrated in FIG. 2, importing the raw performance data may include additional sub-operations (blocks 210, 220, 230, 240, 250, 260, 270, 280, 290, and 295), as described further herein.

Importing of Raw Data from Pre-Matriculation Performance Data

The raw data associated with pre-matriculation performance data for one or more applicants may be imported (FIG. 2, block 210). Each line of data may be a specific item. FIG. 3 illustrates a sample subset of data from an example import of pre-matriculation performance data. As illustrated in FIG. 3, pre-matriculation data for a given applicant may be a pre-matriculation event (e.g., a class), an assessment of performance in the event (e.g., a grade), as well as other information about the event (e.g., name of class, credits received, etc.). An applicant number may be used to associate each line of data with a specific applicant (illustrated as blurred in the figures on the left side). An assessment association may show that the data comes from diverse educational programs of different institutions. The Institution column may designate the specific institution. In some embodiments, an institution may be associated with a rigor index. The Academic Level column may designate the level of degree/certificate that is associated with the item. In some embodiments, an academic level may be associated with a complexity index. The Reported Date column may be the date of the item. Note that different types of items may be associated with different date structures (e.g., semesters, months, dates). The Items Code column may be an abbreviation of the item title. The Item Description column may be a detailed title for the item. The Program-Defined Category column may be used by the Application Program to group items for the predictor model. In some embodiments, the Program-Defined Category may include categories for "Biology," "Chemistry," "Science," and "Non-Science," though other categories are possible. As used herein, the "Science" category is intended to cover those items which cover science-based topics other than biology and/or chemistry. Similarly, the "Non-Science" category is intended to cover those items that cover topics other than biology, chemistry, and science-based topics. The Relative Value column may indicate the weight (which may be based on time) that is associated to each item. Note that not all items may be reported with a relative value. The Reported Score column may be the grade given to the applicant for that item. Note that there may be a wide variation in reported scores. Therefore, the reported scores may be normalized.

Importing Raw Milestone Data

The raw data from Milestone Data may be imported (FIG. 2, block 220). Milestone data may be different from the pre-matriculation performance data in the way that it is reported and factored. FIG. 4 illustrates a sample subset of data from an example import of such milestone data. These are usually specific exams given to the applicant instead of courses given across terms. The milestone data may not come with item codes or relative values. Also, the reported scores may use a separate step for translating the score to a percentage. Thus, not all of the columns discussed with respect to FIG. 3 may be provided by the importation of the raw milestone data.

Conversion of Reported Data

Figure 5:
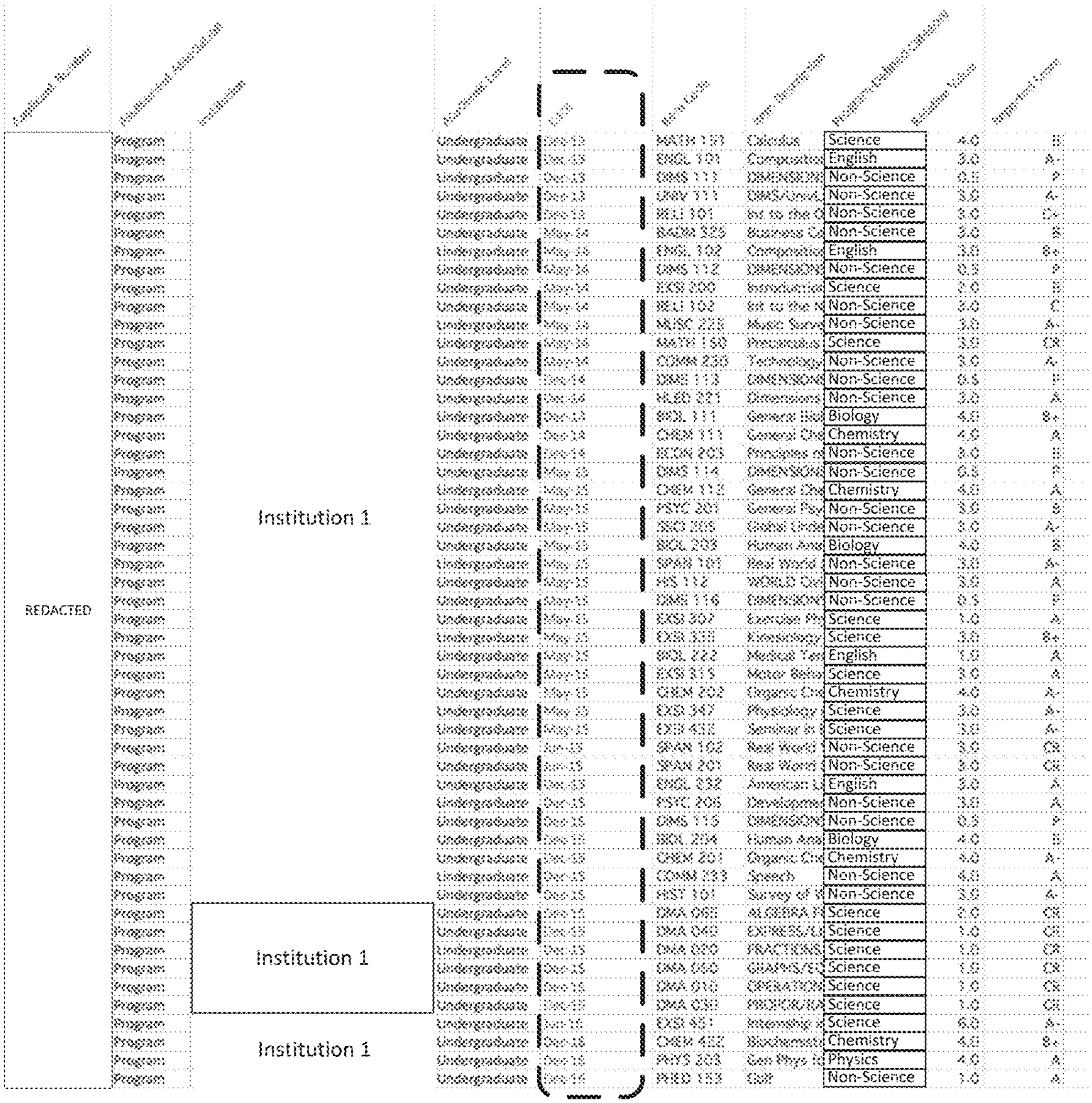
FIG. 5 is a table that illustrates a sample conversion of the date column of imported raw data, according to various embodiments described herein.

The reported date of the provided data (e.g., milestone and/or performance data) may be converted to a consistent month-year date format (FIG. 2, block 230). This may be done to make the sorting and reporting easier. FIG. 5 illustrates a sample conversion of the date column of imported raw data with the data column highlighted.

Reduction of Data Entries

Items without reported grades may be eliminated. A grade can be added or the entire item eliminated for prediction analysis (FIG. 2, block 240). FIG. 6 illustrates a sample conversion of a date column of the imported data, according to various embodiments described herein. As illustrated in FIG. 6, entries without a grade, such as those indicating only a passing grade or credit may be highlighted and, in some embodiments, removed.

Program-Defined Category Manipulation

The program-defined category data can be edited for consistency (FIG. 2, block 250). FIG. 7 illustrates an example alteration of a program-defined category of the imported data. In this example, the raw data import included two categories for which the application program made a determination to exclude from separate tracking. Responsive to such a determination, the highlighted categories may be changed. In this example, an "English" entry may be changed to "Non-Science" and a "Physics" entry may be changed to "Science" (se FIG. 8).

Identification of Missing Item and Category Entries

Missing item code and program-defined category entries may be identified for milestone Items (FIG. 2, block 260). FIG. 8 illustrates an identification of multiple entries of the imported data which have missing item code entries and/or program-defined category entries.

Replacement of Missing Item Code and Program-Defined Category Entries

Entries may be added for milestone items for which the item code and/or program-defined category are missing (FIG. 2, block 270). FIG. 9 illustrates replacement of entries of the imported data identified as missing (block 260). As illustrated in FIG. 9, these missing entries may be replaced with generic references. In some embodiments, the generic references may be automatically determined based on other data values associated with the entry (e.g., description).

Identification of Missing Relative Values

Missing relative value index entries may be identified for milestone items (FIG. 2, block 280). FIG. 10 illustrates an identification of multiple entries from a data import which have missing relative value index entries.

Replacement of Missing Relative Value Entries

Entries may be added for milestone items for which the relative value index entries are missing (FIG. 2, block 290). FIG. 11 illustrates replacement of entries of the imported data identified as missing (block 280). As illustrated in FIG. 11, these missing relative value index entries may be replaced with an initial relative value index. In some embodiments, the initial relative value index may be equivalent to an intermediate weight. In some embodiments, the initial relative value index may be equivalent to a low or high weight. Most pre-matriculation performance data may come with pre-determined relative value indices. The relative value index may be incrementally modified as part of the process of the various embodiments described herein.

Conversion of Reported Scores

Reported scores may be converted to percentages (FIG. 2, block 295). FIG. 12 illustrates replacement of example reported score entries, according to various embodiments as described herein. Different types of entries may have a different conversion mechanism. For example, for entries with a "Program" assessment association, the letter grades may be converted directly to percentages. For example, for entries with a "Milestone" assessment association, the reported score may be converted based on the exam rules. In some embodiments, the milestone event may have an associated conversion based on the reported result that may be used.

Referring back to FIG. 1, after importing the raw performance data (FIG. 1, block 200), operations may continue with modifying the raw performance data with additional modifiers (FIG. 1, block 300).

Modifying Raw Performance Data with Additional Modifiers

Figure 13:
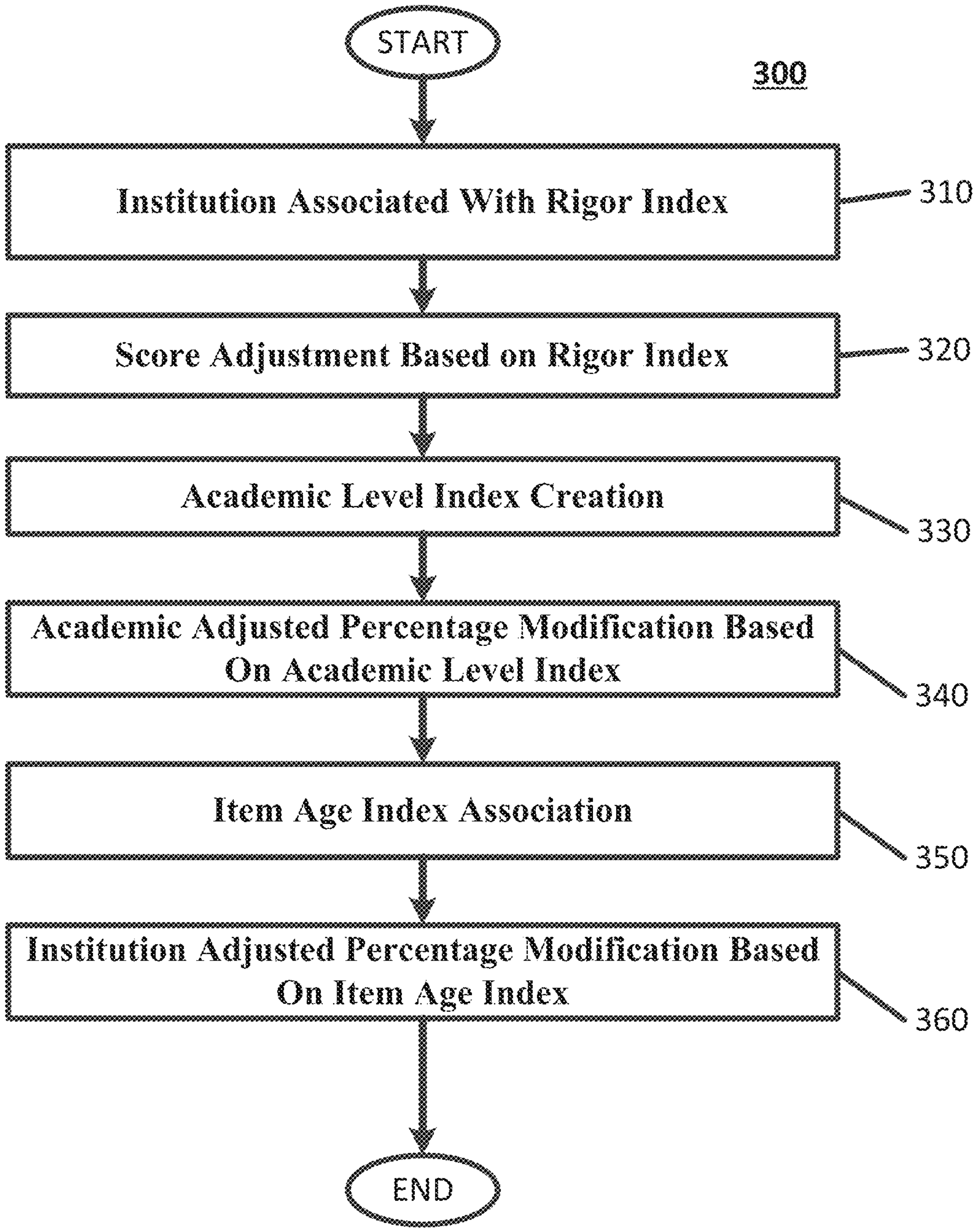
FIG. 13 is a flowchart of example operations for modifying the raw performance data, according to various embodiments described herein.

Methods, systems, and computer program products according to various embodiments described herein may include modifying raw performance data with additional modifiers (FIG. 1, block 300). FIG. 13 illustrates modifying the raw performance data, according to various embodiments described herein. As illustrated in FIG. 13, modifying raw performance data may include additional sub-operations (blocks 310, 320, 330, 340, 350, 360), as described further herein.

As previously described, the first of four indices that may be incrementally modified is the relative value index (FIG. 2, block 290). Further operations may add three additional indices that are unique to this process (block 300).

Institution Associated With Rigor Index

Each Institution of the performance data may be associated with an initial rigor index (FIG. 13, block 310). While a single applicant may have one to five institutions typically, there may be a much larger plurality of institutions represented among the many applicants to an academic program. FIG. 14 illustrates a sample of institutions that may be associated with the applicants of a given academic program. The rigor index may be set between a given lower and upper bound. For example, the rigor index may be set between 0.70 and 1.10. The rigor index is intended to represent the different levels of rigor at each institution. This index may be statistically modified in a later step. FIG. 15 illustrates the addition of a rigor index to a selected sample of institutions to the performance data.

Score Adjustment Based on Rigor Index

The rigor index may be used to adjust the converted score from the raw data (FIG. 13, block 320). The adjusted score may be a product of the converted score times the rigor index. If, as part of the processing, the rigor index is modified statistically, the adjusted score percentage (e.g., an institution adjusted percentage) may change as well. FIG. 16 illustrates the addition of an Institution Adjusted Percentage column with values based on the converted score and the rigor index for the given institution.

Academic Level Index Creation

Each academic level may be associated with an academic level index (FIG. 13, block 330). The academic level index may be set between and upper and a lower bound. For example, the academic level index may be set between 1.00 and 1.50. The academic level index may be intended to represent the different levels of rigor at each academic level (e.g., undergraduate vs. graduate). The academic level index may be statistically modified as part of the process of the various embodiments described herein. FIG. 17 illustrates the addition of an Academic Level Index column.

Academic Adjusted Percentage Modification Based on Academic Level Index

The academic level index may be used to adjust the institution adjusted percentage (FIG. 13, block 340). If, as part of the processing, the academic level index is modified statistically, the adjusted score percentage (e.g., an academic level adjusted percentage) may change as well. The academic level adjusted percentage may be a product of the institution adjusted percentage times the academic level index. FIG. 18 illustrates the addition of an Academic Level Adjusted Percentage column with values based on the academic level index.

Item Age Index Association

Figure 19:
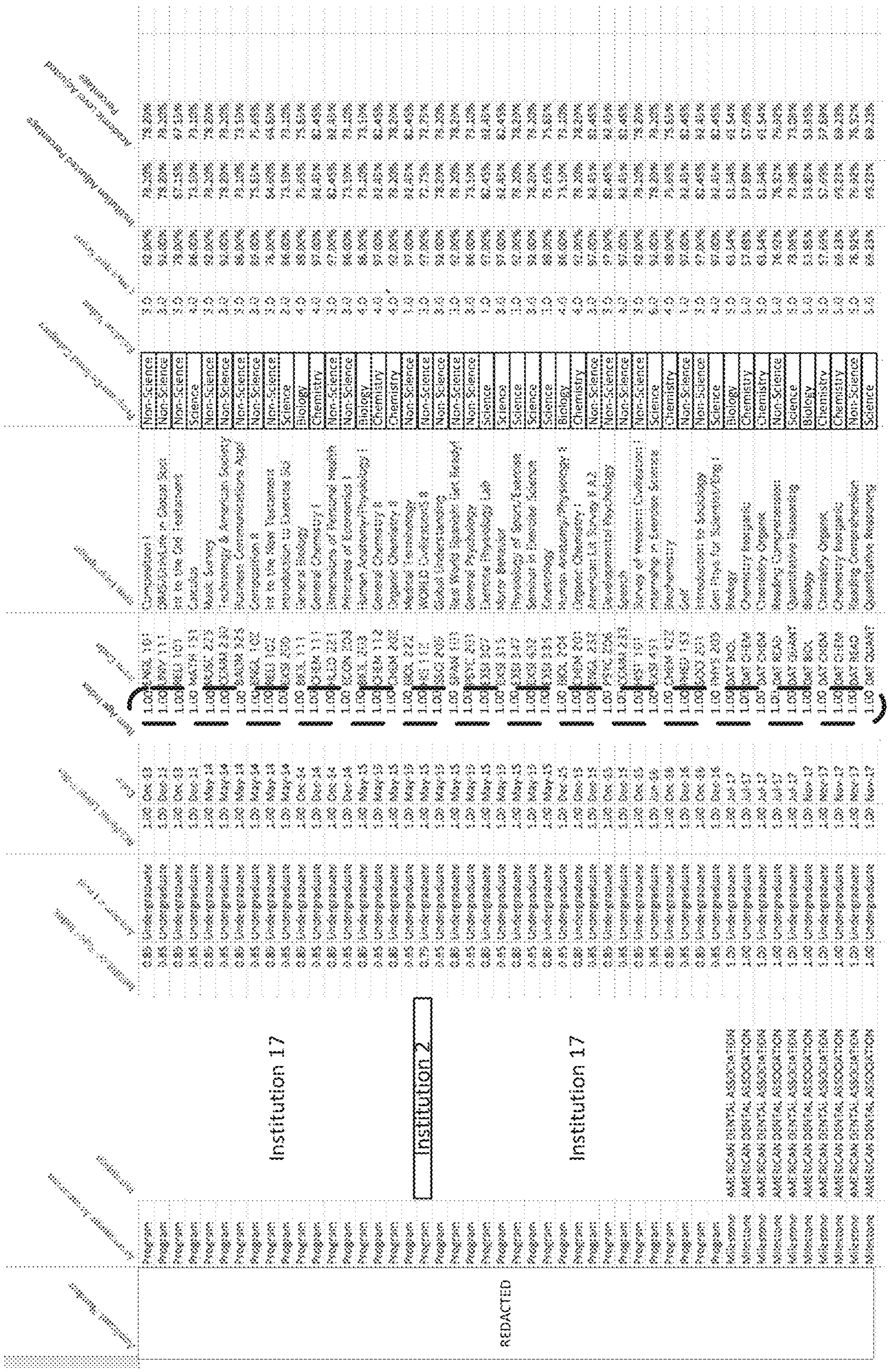
FIG. 19 is a table that illustrates the addition of an Item Age Index column with values based on the date of the entry, according to various embodiments described herein.

Each item's date may be associated with an item age index (FIG. 13, block 350). This item age index may be set between an upper bound and a lower bound. For example, the item age index may be set between 0.50 and 1.00, where a lower number indicates data that is older. The item age index may be intended to represent the degradation of the item based on the time between the generation of the item data and applying for the program. The item age index may help incorporate the notion that students forget content over time. FIG. 19 illustrates the addition of an Item Age Index column with values based on the date of the entry.

Institution Adjusted Percentage Modification Based on Item Age Index

Figure 20:
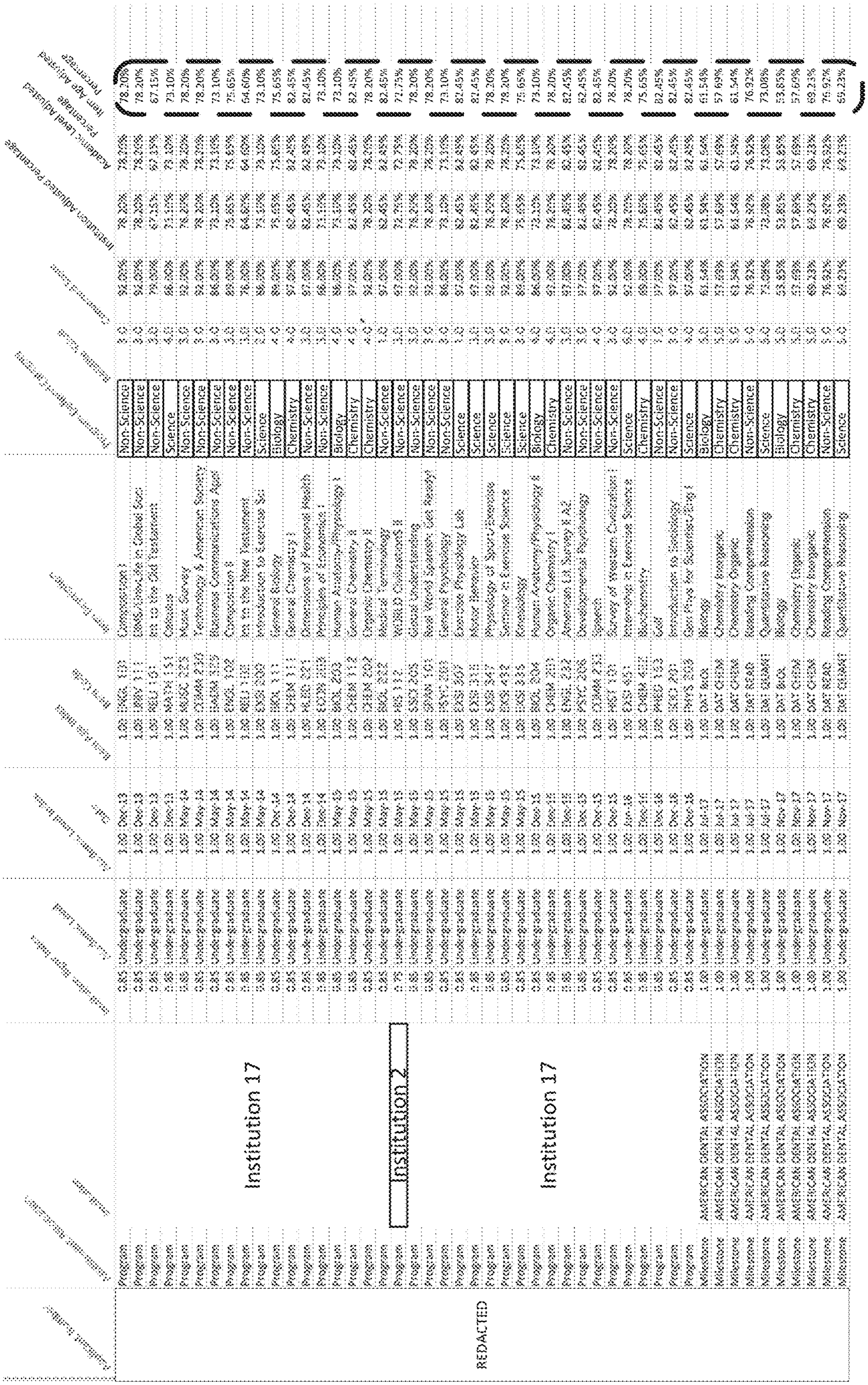
FIG. 20 is a table that illustrates the addition of an Item Age Adjusted Percentage column with values based on the item age index, according to various embodiments described herein.

The item age index may be used to adjust the academic level adjusted percentage (FIG. 13, block 360). If, as part of the processing, the item age index is modified statistically, the adjusted score percentage (e.g., an item age adjusted percentage) may change as well. The item age adjusted percentage may be a product of the academic level adjusted percentage times the item age index. FIG. 20 illustrates the addition of an Item Age Adjusted Percentage column with values based on the item age index.

Referring back to FIG. 1, after modifying the raw performance data (block 300), operations may continue with calculating item adjusted performance values for each item of the performance data (FIG. 1, block 400).

Calculating Item Adjusted Performance Value for Each Item

Figure 21:
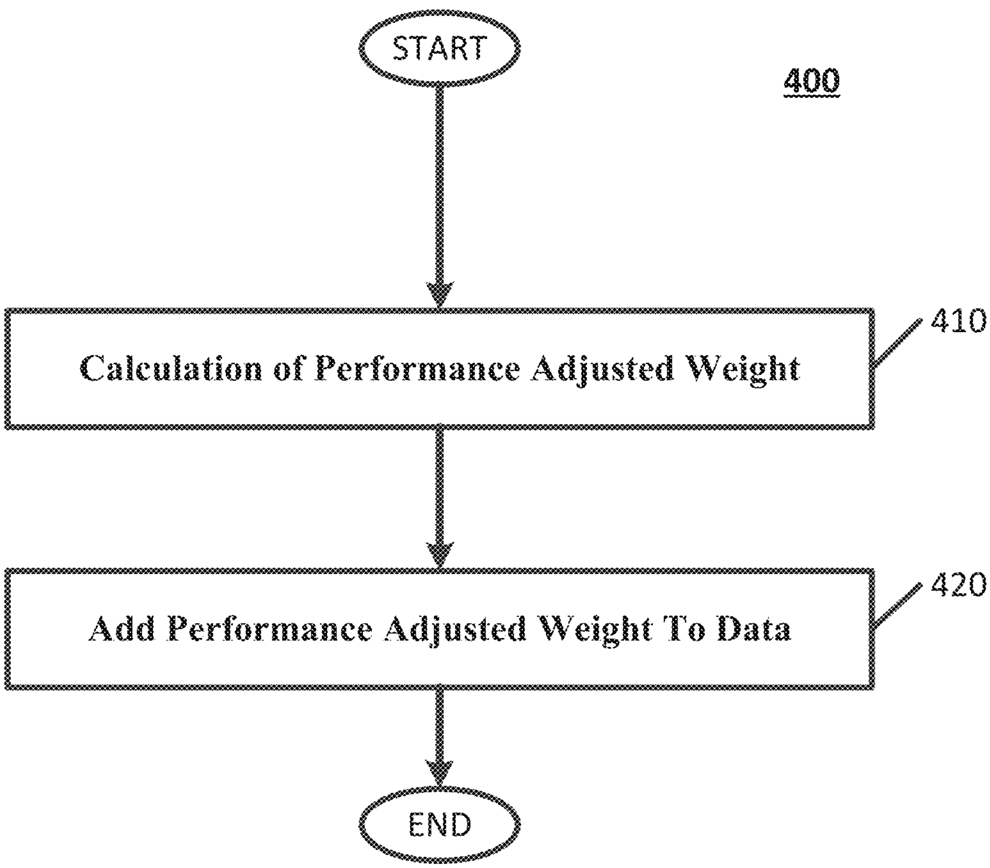
FIG. 21 is a flowchart that illustrates example operations for calculating an item adjusted performance value, according to various embodiments described herein.

Methods, systems, and computer program products according to various embodiments described herein may include calculating an item adjusted performance value for each data entry (block 400). FIG. 21 illustrates calculating an item adjusted performance value, according to various embodiments described herein (FIG. 1, block 400). As illustrated in FIG. 21, calculating the item adjusted performance value may include additional sub-operations (block 410, 420), as described further herein.

Calculation of Performance Adjusted Weight

Figure 22:
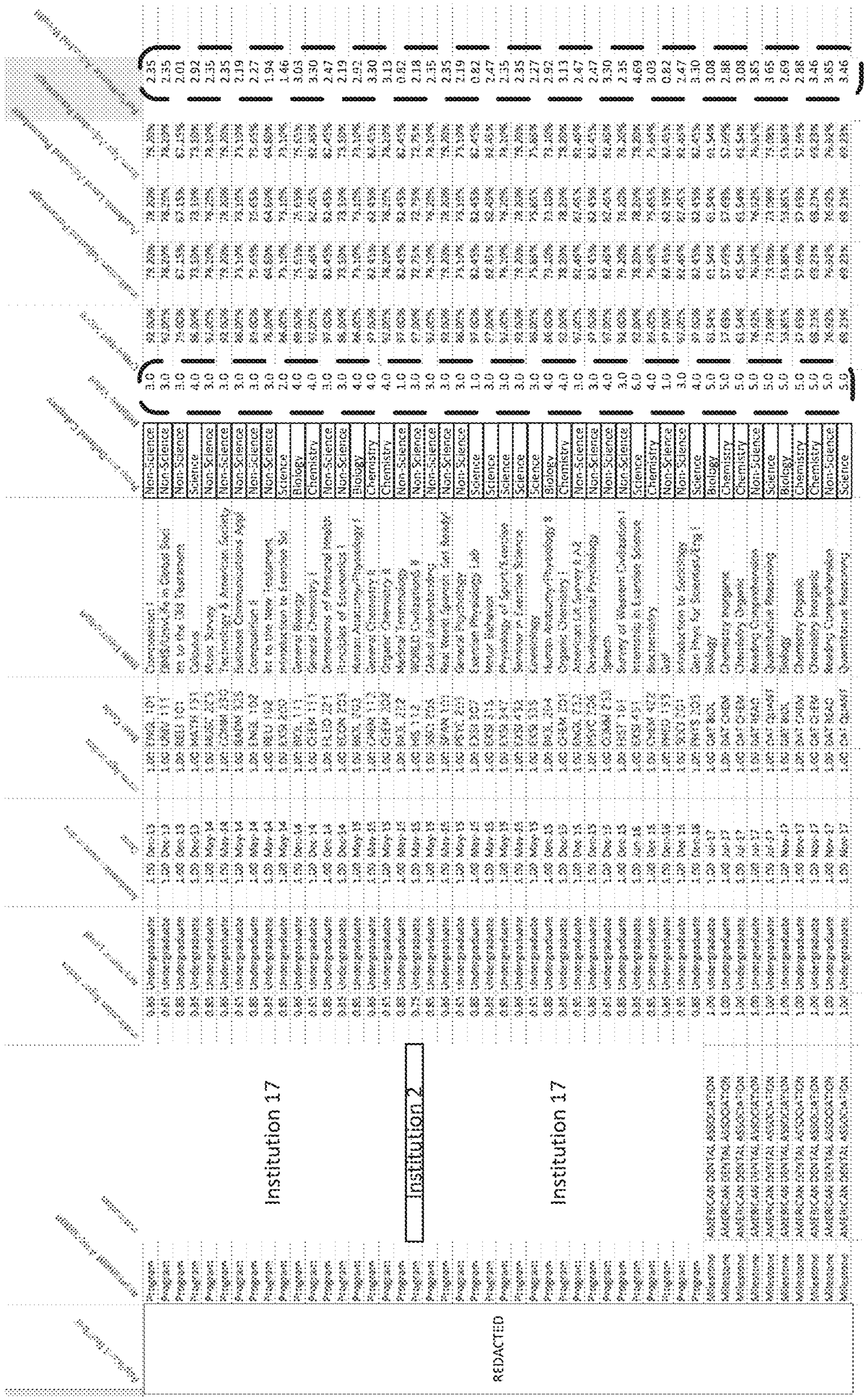
FIG. 22 is a table that illustrates the addition of a performance adjusted weight based on the relative value index and the item age adjusted percentage, according to various embodiments described herein.

The relative value index of each item may be multiplied by the item age adjusted percentage to yield the performance adjusted weight (FIG. 21, block 410). This may be the final grade for each data entry expressed as a weighted score. Once calculated, the performance adjusted weight may be added to the collected data (FIG. 21, block 420). FIG. 22 illustrates the addition of a Performance Adjusted Weight column with values based on the relative value index and the item age adjusted percentage.

Referring back to FIG. 1, after calculating item adjusted performance values for each item of the performance data (block 400), operations may continue with creating applicant portfolios with program-defined categories and category scores (FIG. 1, block 500).

Figure 23:
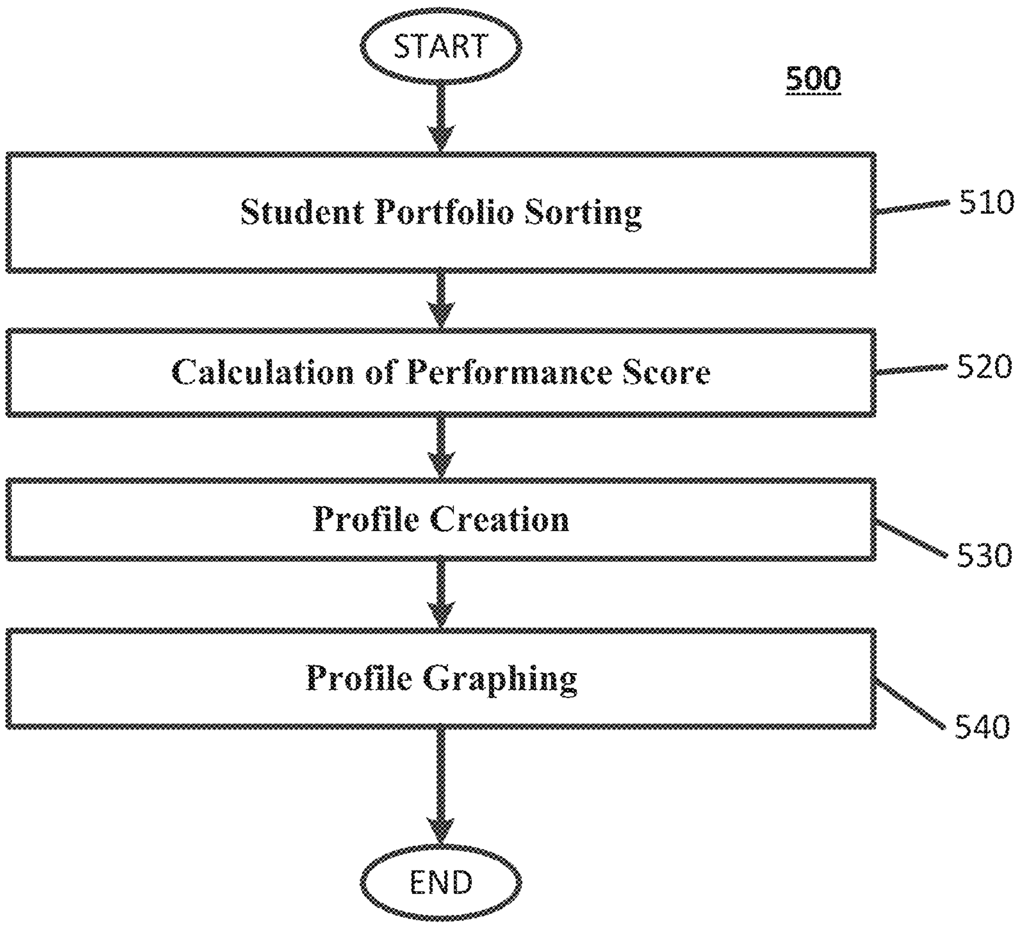
FIG. 23 is a flowchart that illustrates example operations for creating applicant portfolios, according to various embodiments described herein.

Creating Applicant Portfolios with Program-Defined Categories and Category Scores Methods, systems, and computer program products according to various embodiments described herein may include creating applicant portfolios with program-defined categories and category scores (block 500). FIG. 23 illustrates creating applicant portfolios, according to various embodiments described herein. As illustrated in FIG. 23, creating the applicant portfolios may include additional sub-operations (blocks 510, 520, 530, 540), as described further herein. Though the process described herein includes four program-defined categories (“Biology,” “Chemistry,” “Science,” and “Non-Science”), one of ordinary skill in the art will understand that the actual number of program-defined categories may vary from analysis to analysis without deviating from the various embodiments described herein.

Student Portfolio Sorting

A student portfolio may be sorted by the program-defined categories (FIG. 23, block 510). In some embodiments, the student portfolio may also be sorted by date. FIG. 24 illustrates the sorting of the data first by the program-defined category (e.g., “Biology,” “Chemistry,” Non-Science,” etc.) and then by date.

Calculation of Performance Score

Figure 25:
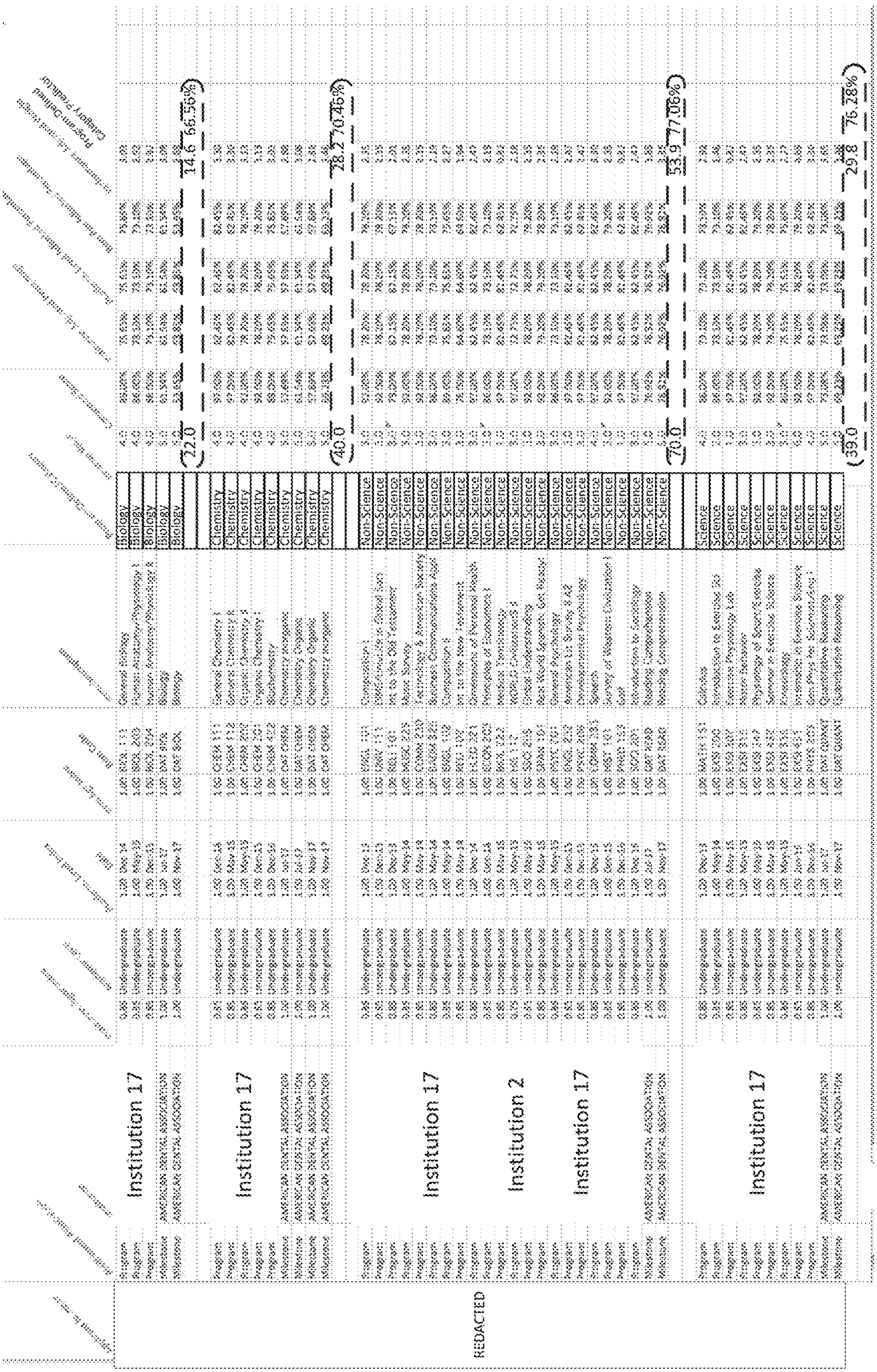
FIG. 25 is a table that illustrates the addition of a Program-Defined Category Predictor column for with values each of the program-defined categories, according to various embodiments described herein.

The performance score for each of the four program-defined categories may be calculated per applicant (FIG. 23, block 520). The relative value index for all items in a category may be totaled. The performance adjusted weight may be totaled for each category. The performance adjusted weight may be divided by the summed relative values for the category yielding a percentage performance score for each of the program-defined categories. Each of the four performance scores may be sent for predictor analysis. FIG. 25 illustrates the addition of a Program-Defined Category Predictor column for with values each of the program-defined categories (e.g., “Biology,” “Chemistry,” Non-Science,” etc.).

Profile Creation

Figure 26A:
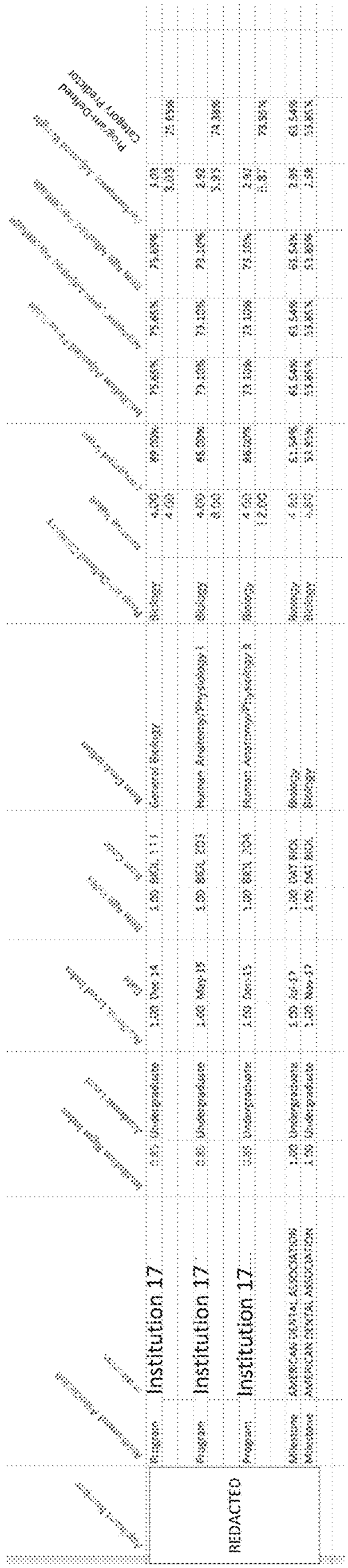
Figure 26D:
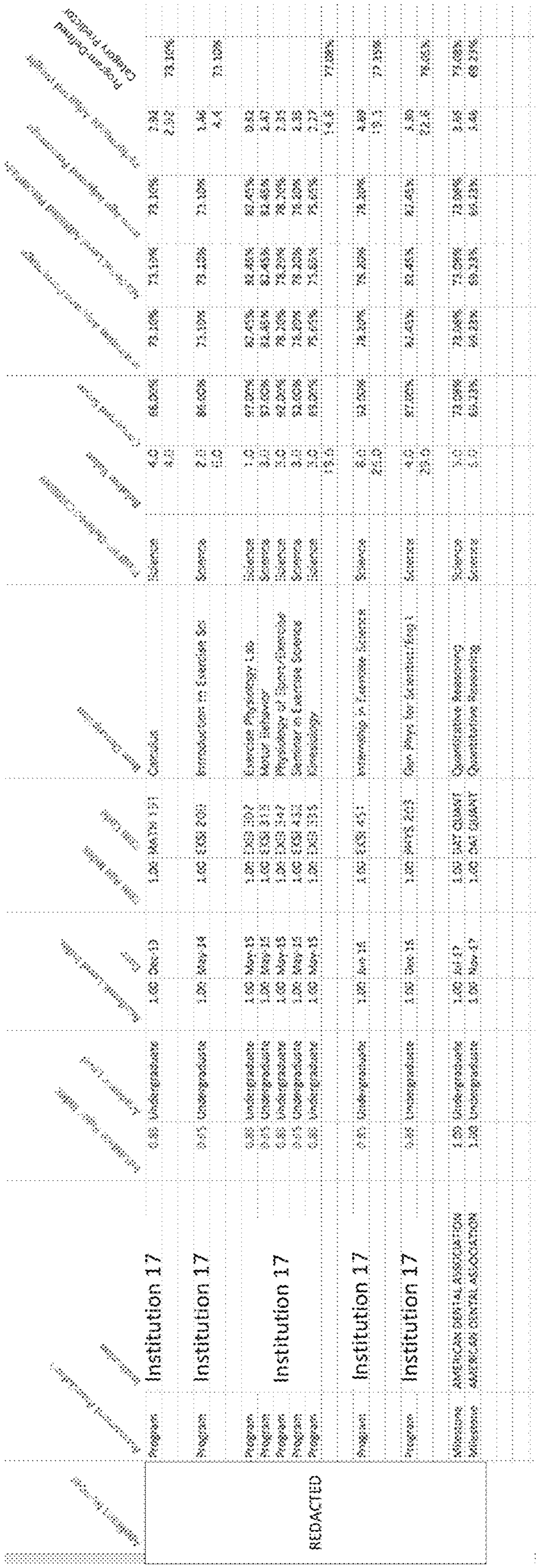

A profile for each of the program-defined categories may be created (FIG. 23, block 530). FIGS. 26*a*-26*d* illustrate example profiles for program-defined categories, according to various embodiments as described herein. For example, as illustrated in FIG. 26*a*, a profile for the program-defined category may be created which includes the “Biology” entries for a particular applicant. In the example illustration of FIG. 26*b*, a profile for the program-defined category may include be created which includes the “Chemistry” entries for a particular applicant. In the example illustration of FIG. 26*c*, a profile for the program-defined category may include be created which includes the “Non-Science” entries for a particular applicant. In the example illustration of FIG. 26*d*, a profile for the program-defined category may include be created which includes the “Science” entries for a particular applicant.

Profile Graphing

Figure 27A:
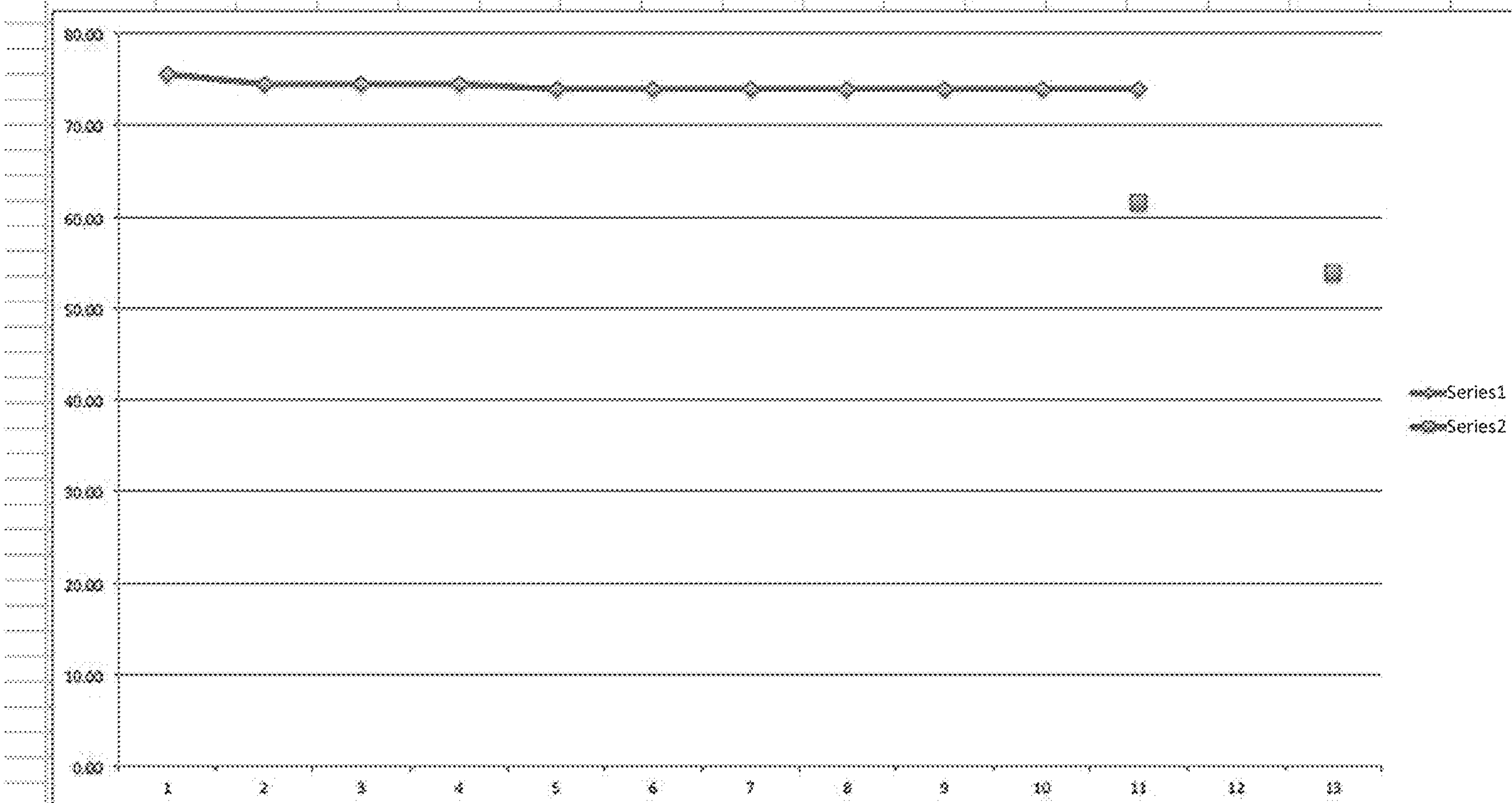
FIGS. 27*a*-27*d* are example graphs of the profiles for the program-defined categories, according to various embodiments as described herein.
Figure 27B:
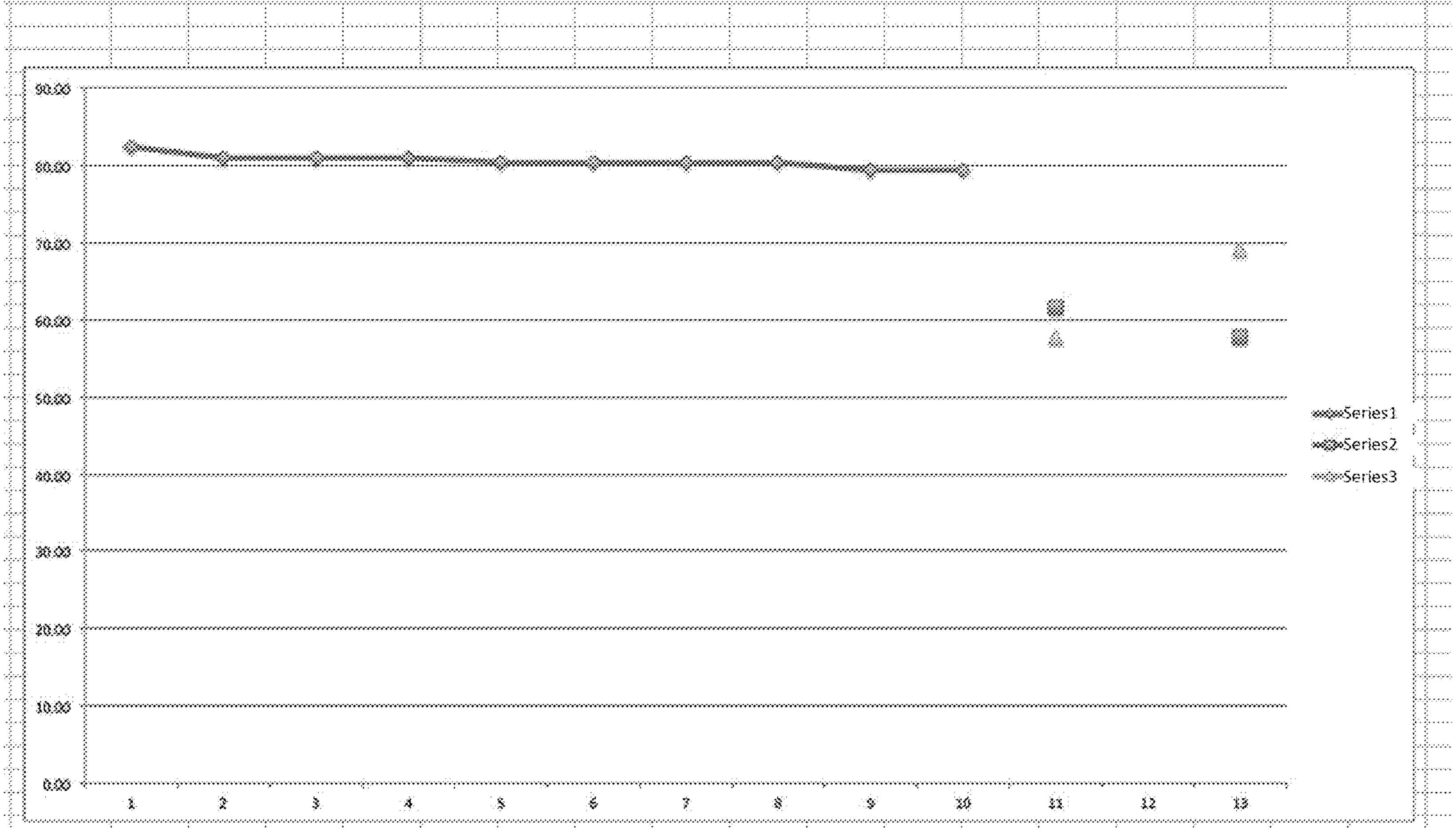
Figure 27C:
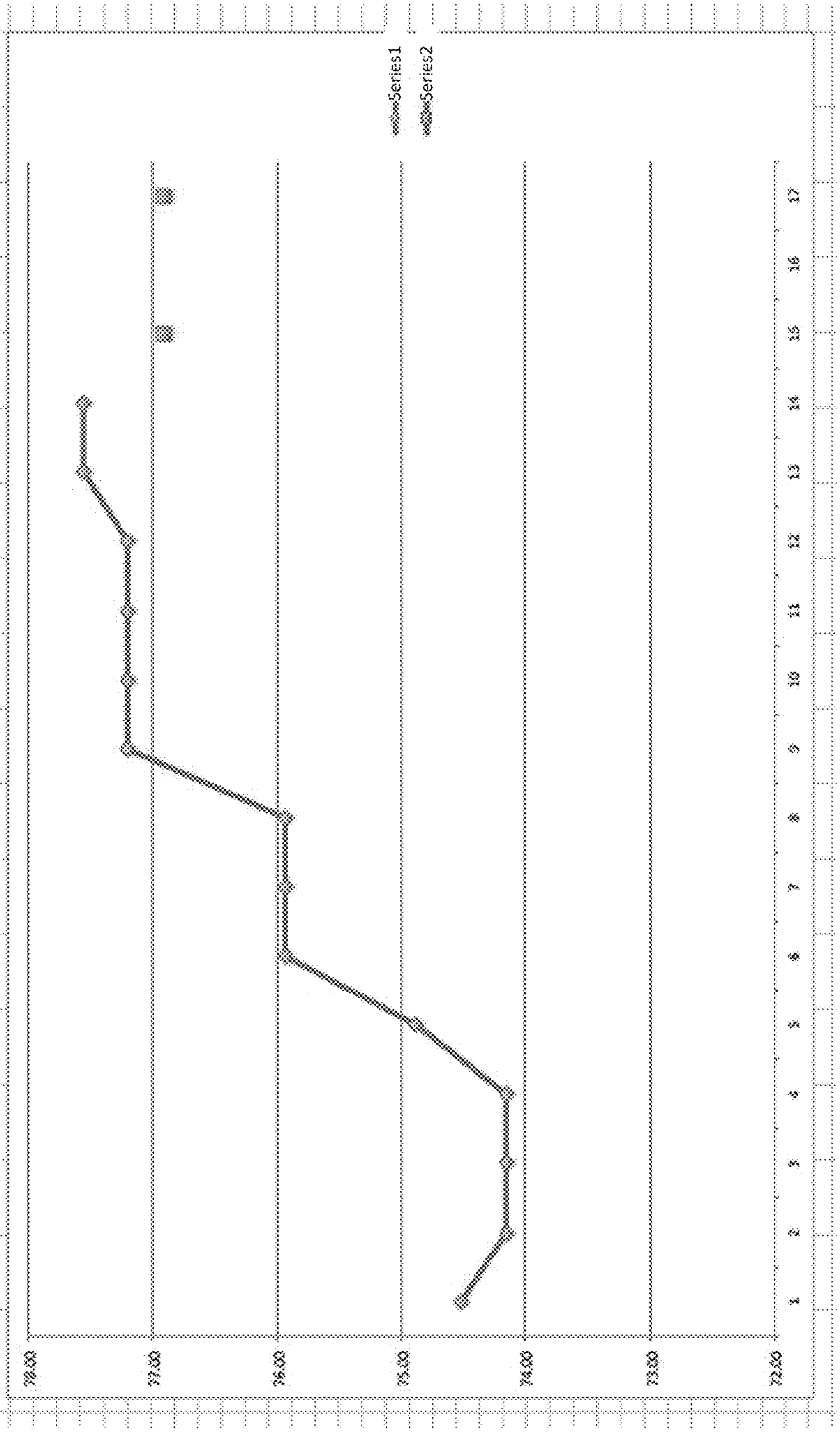
Figure 27D:
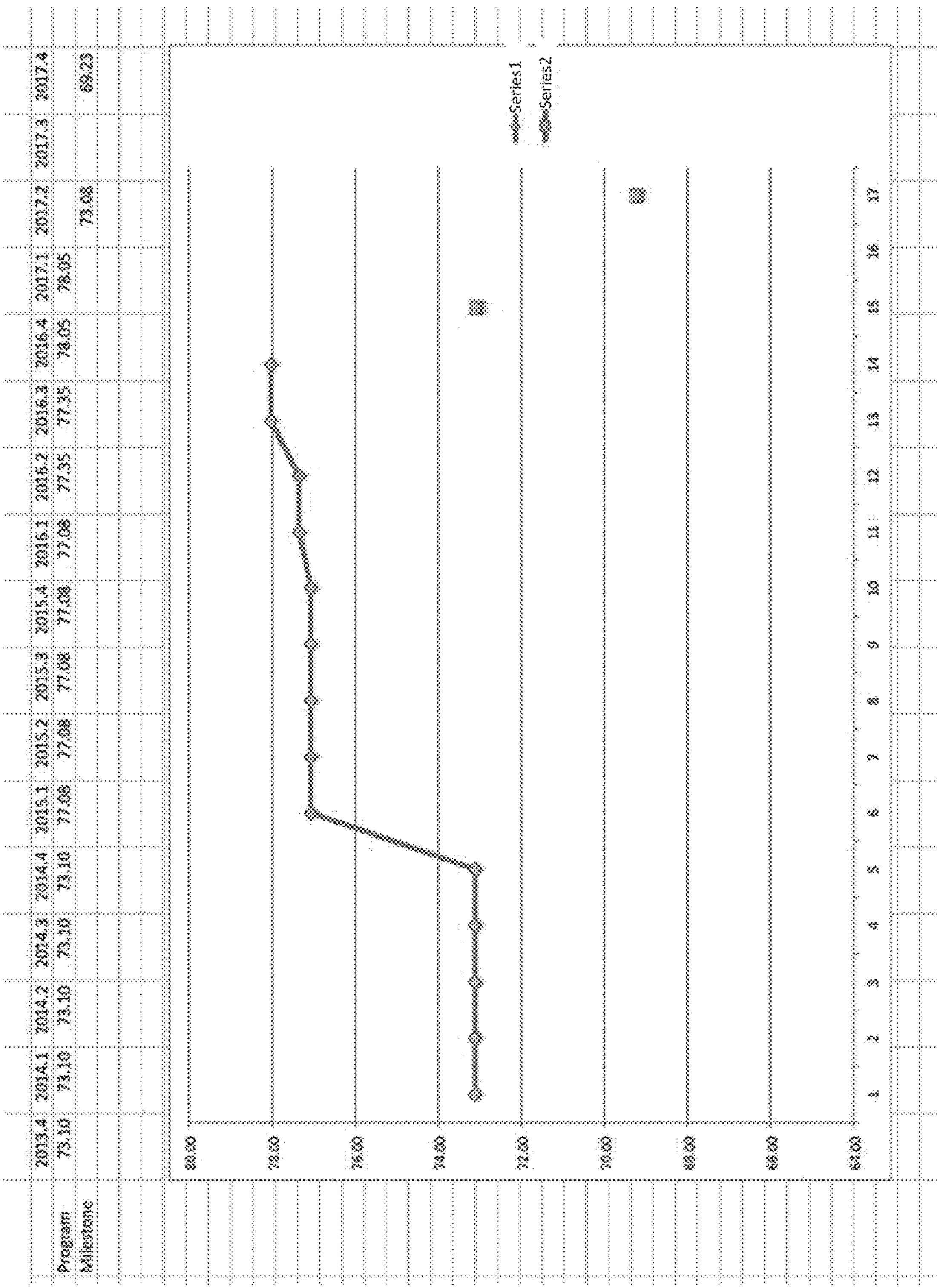

The profile for each of the program-defined categories may be graphed over time (FIG. 23, block 540). FIGS. 27*a*-27*d* illustrate example graphs of the profiles for the program-defined categories, according to various embodiments as described herein. For example, as illustrated in FIG. 27*a*, dated entries for the profile for the “Biology” program-defined category may be graphed over time for a particular applicant. In the example illustration of FIG. 27*b*, the dated entries for the profile for the “Chemistry” program-defined category may be graphed over time for a particular applicant. In the example illustration of FIG. 27*c*, the dated entries for the profile for the “Non-Science” program-defined category may be graphed over time for a particular applicant. In the example illustration of FIG. 27*d*, the dated entries for the profile for the “Science” program-defined category may be graphed over time for a particular applicant. In the graphs of FIGS. 27*a*-27*d*, milestone entries may be graphed separately (e.g., as a separately plotted line) from program entries.

Referring back to FIG. 1, after creating the applicant portfolios (block 500), operations may continue with preparing data sets for predictor analysis (block 600).

Generating a Regression-Based Predictor Model

Figure 28:
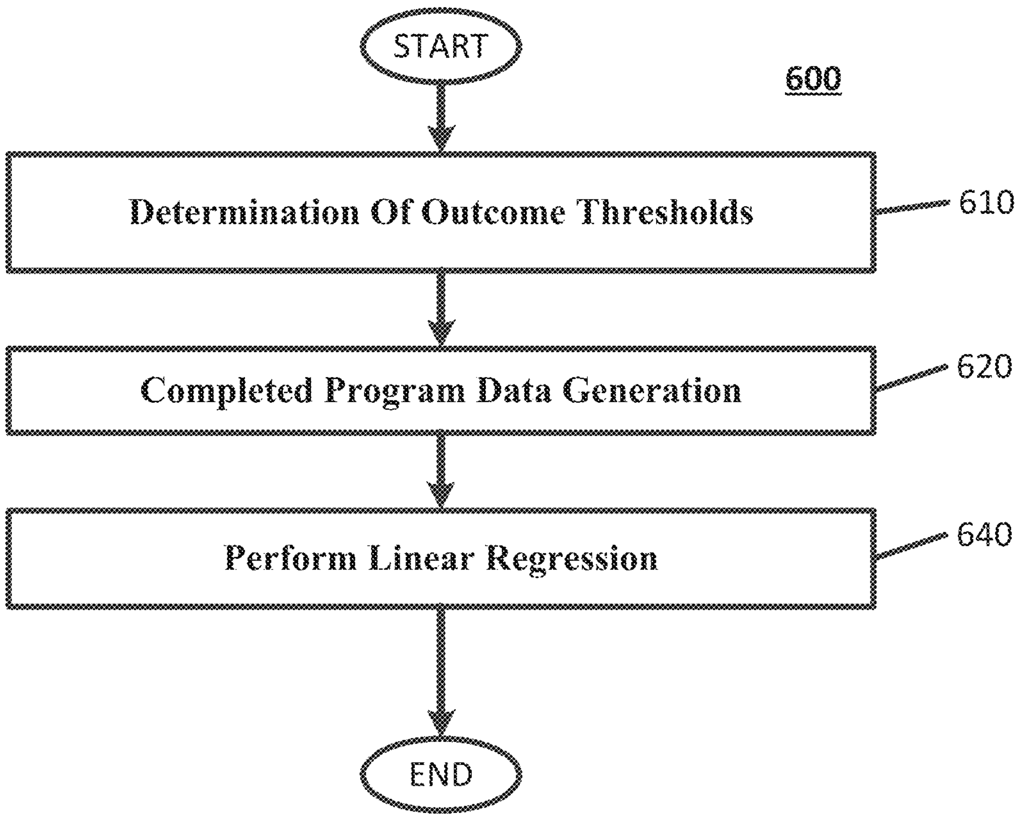
FIG. 28 is a flowchart that illustrates example operations for preparing the data sets for predictor analysis, according to various embodiments described herein.

Methods, systems, and computer program products according to various embodiments described herein may include generating a regression-based predictor model (block 600). FIG. 28 illustrates preparing the regression model, according to various embodiments described herein. As illustrated in FIG. 28, importing the raw performance data may include additional sub-operations (blocks 610, 620, 640), as described further herein.

Determination of Outcome Thresholds

The good/bad threshold for outcomes may be pre-determined (FIG. 28, block 610). For the predictor analysis, the definition of risk of failure and the opportunity for excellence may be defined. For example, students who scored within the program of less than 75% may be in danger of failing capstone exams before graduation. Also, students who scored above 90% may be identified for further education and may be deemed as excellent or honors students.

Completed Program Data Generation

The applicant data from students who have already completed the program may be generated using a similar method as was described for the applicants (FIG. 28, block 620). These generated profiles may then be associated with a cumulative score from all courses in the program. This data may be used to create the regression analysis for prediction of performance by the applicants. FIG. 29 illustrates applicant data for prior participants who have completed the program for which a predictor is desired. As illustrated in FIG. 29, for prior participants, an overall score may be calculated for a given prior student for each of the performance categories (e.g., "Biology," "Chemistry," Non-Science," and "Science.) In FIG. 29, the student identification numbers are not listed, but are intended to be included as part of the "Student Listing" portion of the figure.

The data for students who have already completed the program may be based on the data for the student from before they entered the program. That is to say that the applicant data from students who have already completed the program may include performance data which the students would have provided as part of their application to the program. Similarly, the age of the performance items may be adjusted to reflect the age of the performance data at the time the student applied for the program. Thus, in some embodiments, the students that have completed the program may be treated as applicants for the purposes of improving the data model.

Perform Linear Regression

Figure 30:
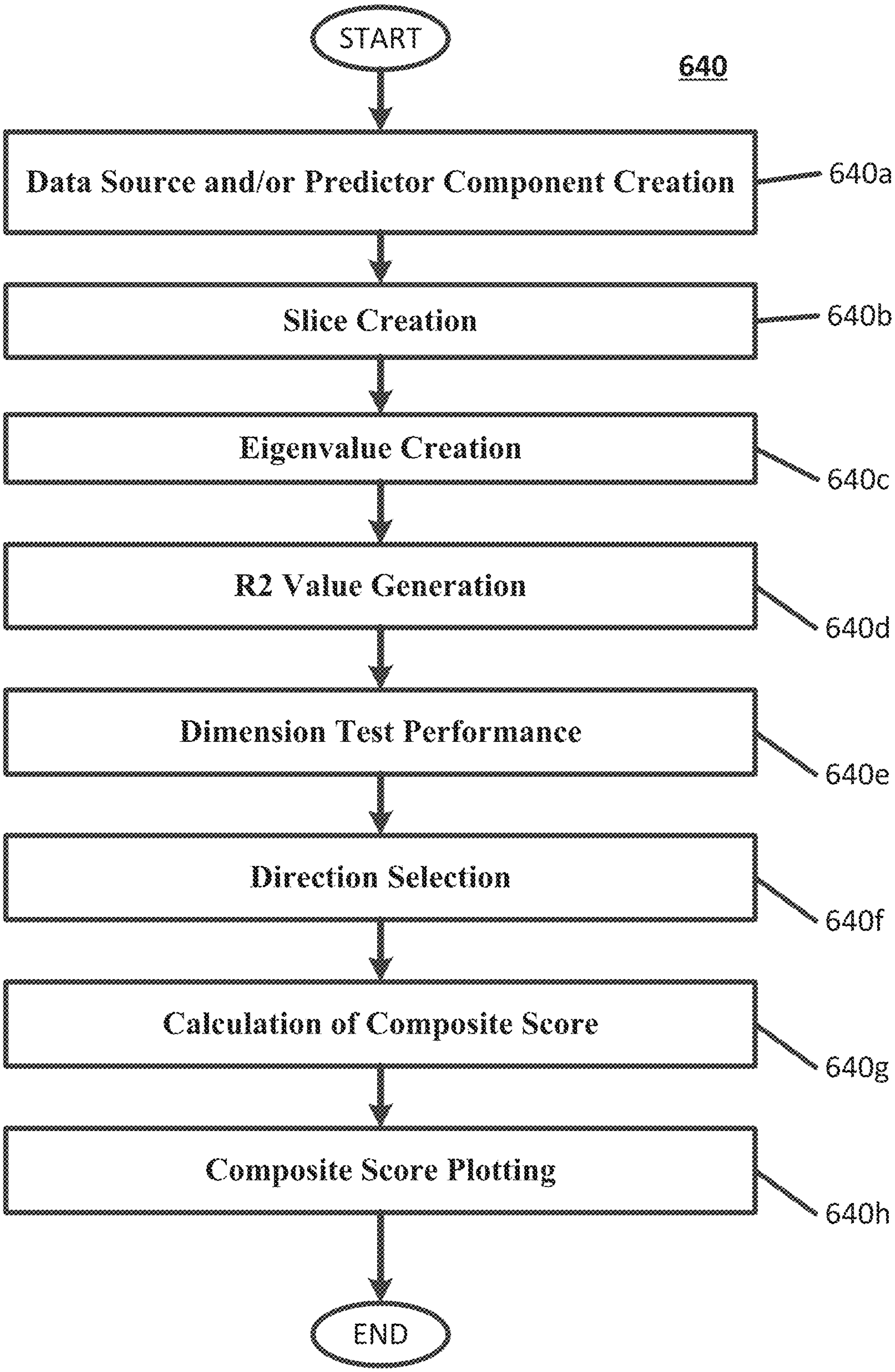
FIG. 30 is a flowchart that illustrates example operations for performing a linear regression, and calculating a composite score based on the linear regression, according to embodiments as described herein.

A linear regression may be performed according to a linear regression model (FIG. 28, block 640). FIG. 30 illustrates, for example, performing a linear regression, and calculating a composite score based on the linear regression, according to embodiments as described herein. As illustrated in FIG. 30, performing the linear regression may include several subcomponents (blocks 640*a*, 640*b*, 640*c*, 640*d*, 640*e*, 640*f*, 640*g*, and 640*h*). FIG. 30 illustrates one regression model, but it will be understood that other regression models are possible without deviating from the embodiments described herein. Moreover, though linear regression is described herein, it will be understood that other statistical models, such as smoothing, may be used without deviating from the scope of the inventive concepts.

Data Source and/or Predictor Component Creation

The data source and/or predictor components may be formed with data that are compared to an outcomes data set (FIG. 30, block 640*a*), such as, for example, the completed program data.

Slice Creation

Using sliced inverse regression (SIR), a number of equally sized slices may be chosen (FIG. 30, block 640*b*). In some embodiments, the number of slices chosen may be eight. The data are then divided into equal sized slices based on their outcome values in sequence. FIG. 31 illustrates a function call in a computer program method that may generate the equally sized slices based on the data set. FIG. 32 illustrates a computer program output indicating the selection of the equally sized slices.

Eigenvalue Creation

A number of basis vectors from the previous operations may yield the creation of additional non-zero eigenvalues (FIG. 30, block 640*c*). For example, four basis vectors may yield the creation of four non-zero eigenvalues. FIG. 33 illustrates the generation of the eigenvalues for respective ones of the predictors for the performance categories.

R2 Value Generation

An R2 (R-squared) value may generated on the generated non-zero eigenvalues (FIG. 30, block 640*d*). For example, four basis vectors with non-zero eigenvalues may be generated. Four eigenvalues (one for each performance category predictor) may be created to qualify the relative importance of each basis vector (direction). In some embodiments, the direction may be chosen when a p-value for the underlying data is less than 0.05. Note that this may be a decision point between considering linear versus non-linear models. The R2 value may calculated for each direction to measure fit the provided data. The R2 value is a statistical measure of how close the data are to a given regression line. For example, the first direction may indicate about 99.3% of total available R2. In some embodiments, the other directions may not be used for the model. For example, in some embodiments, only the first direction may be used for the subsequent analysis. FIG. 34 illustrates the generation of the R2 value for the basis vectors.

Dimension Test Performance

Large-sample marginal dimension tests may be performed on the basis vectors, and may generate associated p-values (FIG. 30, block 640*e*). The large-sample marginal dimension tests may be used to test if an added dimension is statistically significant. For example, the tests may show that the first dimension is statistically significant but the 2nd, 3rd, and 4th dimensions may not be statistically significant given the first one. This data may confirm the use of the first direction only. FIG. 35 illustrates the generation of p values for the basis vectors.

Direction Selection

A direction is chosen based on its generated R2 value (FIG. 30, block 6400. For example, direction Dir 1 may be chosen because of its R2 and verified for use by the generated p-value.

Calculation of Composite Score

A "composite score" may be generated based on the selected direction (FIG. 30, block 640*g*). For example, when direction Dir 1 is selected, relative weights may be generated for the four data components (e.g., the predictor values) to calculate the composite score. FIG. 36 illustrates a completed linear regression of the outcome on the composite score which is calculated by using the first direction coefficients above. It has statistically significant intercept and slope. The model may explain about 43.3% of the variance in the outcome. The R2 value may be optimized for each subset of student for each machine learning run. For example, all students who took any course at a first institution may be placed into the cohort for optimizing the R2 for those students. The process may be repeated for a second institution, a third institution, etc. As each subgroup is optimized, the R2 for all combined groups may increase. The machine learning operation may repeat multiple times until every subgroup is optimized and the total is optimized.

Composite Score Plotting

Figure 37:
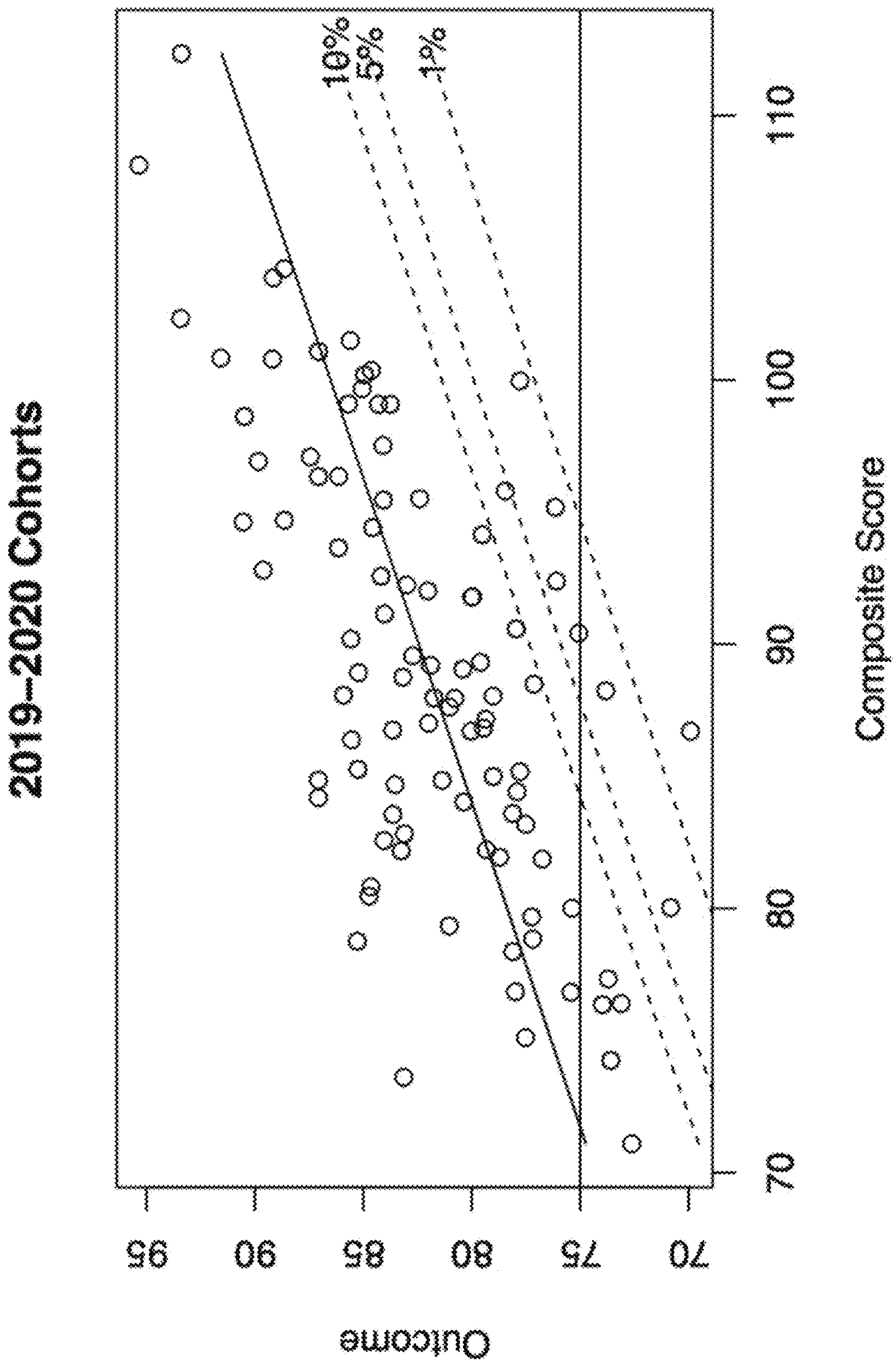
FIG. 37 is a graph that illustrates a plot that compares outcomes versus composite score based on the linear regression model, according to various embodiments described herein.

Composite scores for the particular cohorts may be plotted, generating a regression line with prediction boundaries (FIG. 30, block 640*h*). FIG. 37 illustrates a plot that compares outcomes versus composite score based on the linear regression model. For example, as illustrated in FIG. 37, a plot may be generated of the regression line that compares the outcomes versus the composite score generated from the SIR for the 2019 and 2020 cohorts. The plot shows the lower 10%, 5%, and 1% prediction boundaries. In some embodiments, composite scores may be generated for the later applicants using the Dir 1 data. Using low threshold for the outcomes data (e.g., 75%), a risk score may be generated predicting the probability that an applicant will score below 75%.

Though a SIR model of regression is described herein, other models are capable of being used to provide a linear regression between a set of predictor values and outcomes. For example, least-squares models, Poisson regression, logistic regression, probit regression, multinomial, logistic regression, multinomial probit regression, hierarchical linear regression, maximum likelihood estimation, ridge regression, least absolute deviation, and Bayesian linear regression, to name just a few examples. Other types of machine learning algorithms that may be utilized include association rules, auto classifier, auto numeric, Bayesian network, C5.0, Classification and Regression (C&R) Tree, Chi-square adjusted interaction detection (CHAID), generalized linear engine (GLE), linear regression, linear-average squared, linear support vector machines (LSVM), neural network, random trees, K-means, K-nearest neighbor (KNN), Cox, Principle Component Analysis (PCA)/Factor, anomaly detection, feature selection, tree, sequence, support vector machines (SVM), Isotonic, time series, Kohonen, decision list, on-class SVM, apriori, and linear discriminant analysis. As such, the SIR model described herein is merely one embodiment for providing such a linear regression, and other models may be used without deviation from the scope of the embodiments described herein.

Referring back to FIG. 1, after preparing the data sets for predictor analysis (block 600), operations may continue with adjusting the regression model by incrementally modifying indices (block 700).

Adjust the Regression by Systematically and Incrementally Modifying Indices

Figure 38:
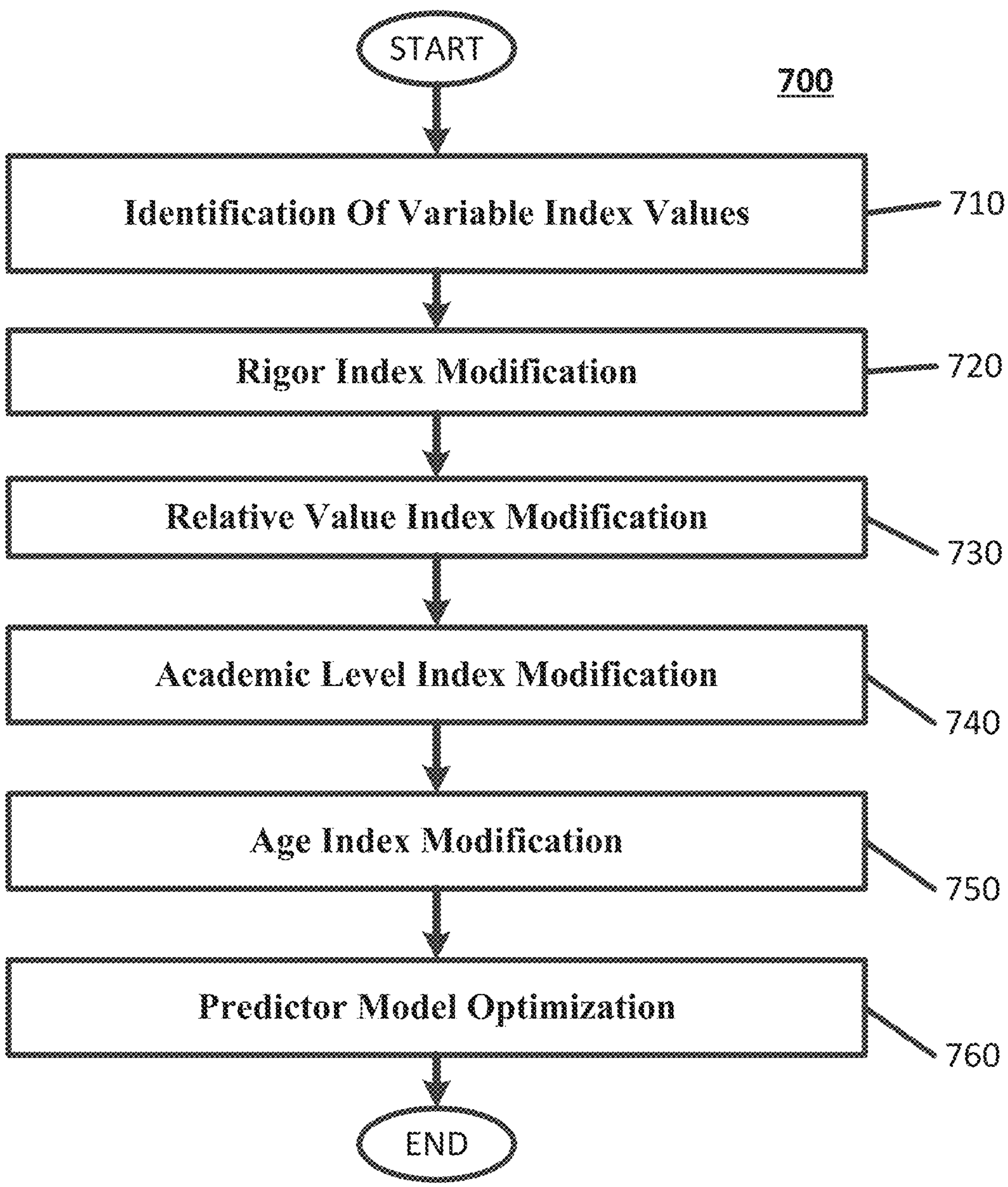
FIG. 38 is a flowchart that illustrates example operations for adjusting the regression by modifying the indices, according to various embodiments as described herein.

Methods, systems, and computer program products according to various embodiments described herein may include adjusting the regression by systematically and incrementally modifying indices (block 700). FIG. 38 illustrates adjusting the regression by modifying the indices, according to embodiments as described herein. As illustrated in FIG. 38, modifying the indices may include additional sub-operations (blocks 710, 720, 730, 740, 750, and 760), as described further herein. Though the process described herein includes four indices, one of ordinary skill in the art will understand that the actual number of indices may vary from analysis to analysis without deviating from the present inventive concepts.

Identification of Variable Index Values

Figure 39:
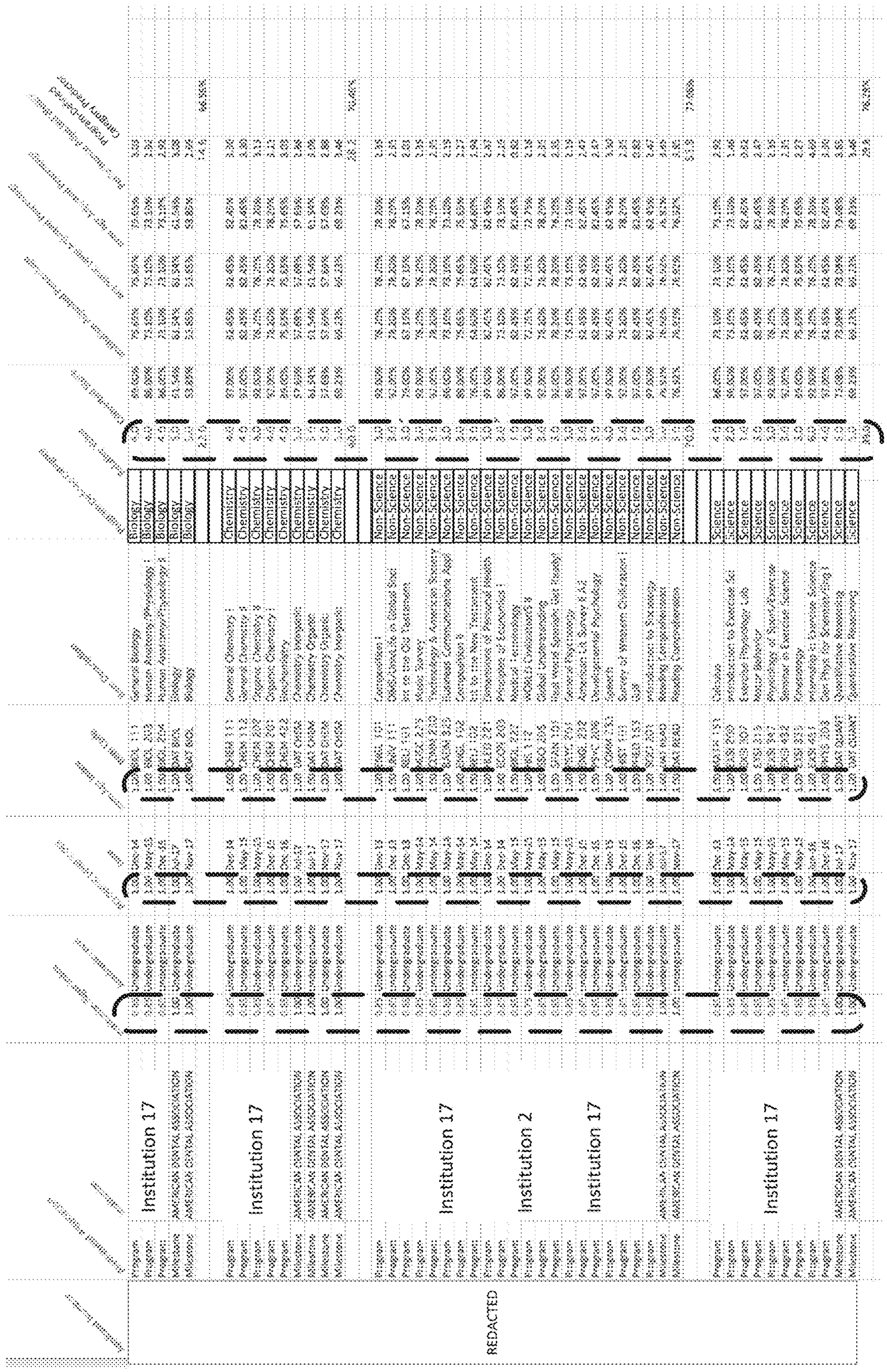
FIGS. 39-44 are tables that illustrate operations to adjust the prediction model based on modifying various index values, according to various embodiments described herein.

Once the initial linear regression is developed with the four predictors (FIGS. 1, 30, block 600) based on applicant data for students that have completed the program, index values that are variable may be differentiated from those that are fixed (FIG. 38, block 710). For example, as illustrated in FIG. 39, the rigor index, the academic level index, the age index, and relative value index values may be variable.

Rigor Index Modification

Figure 40:
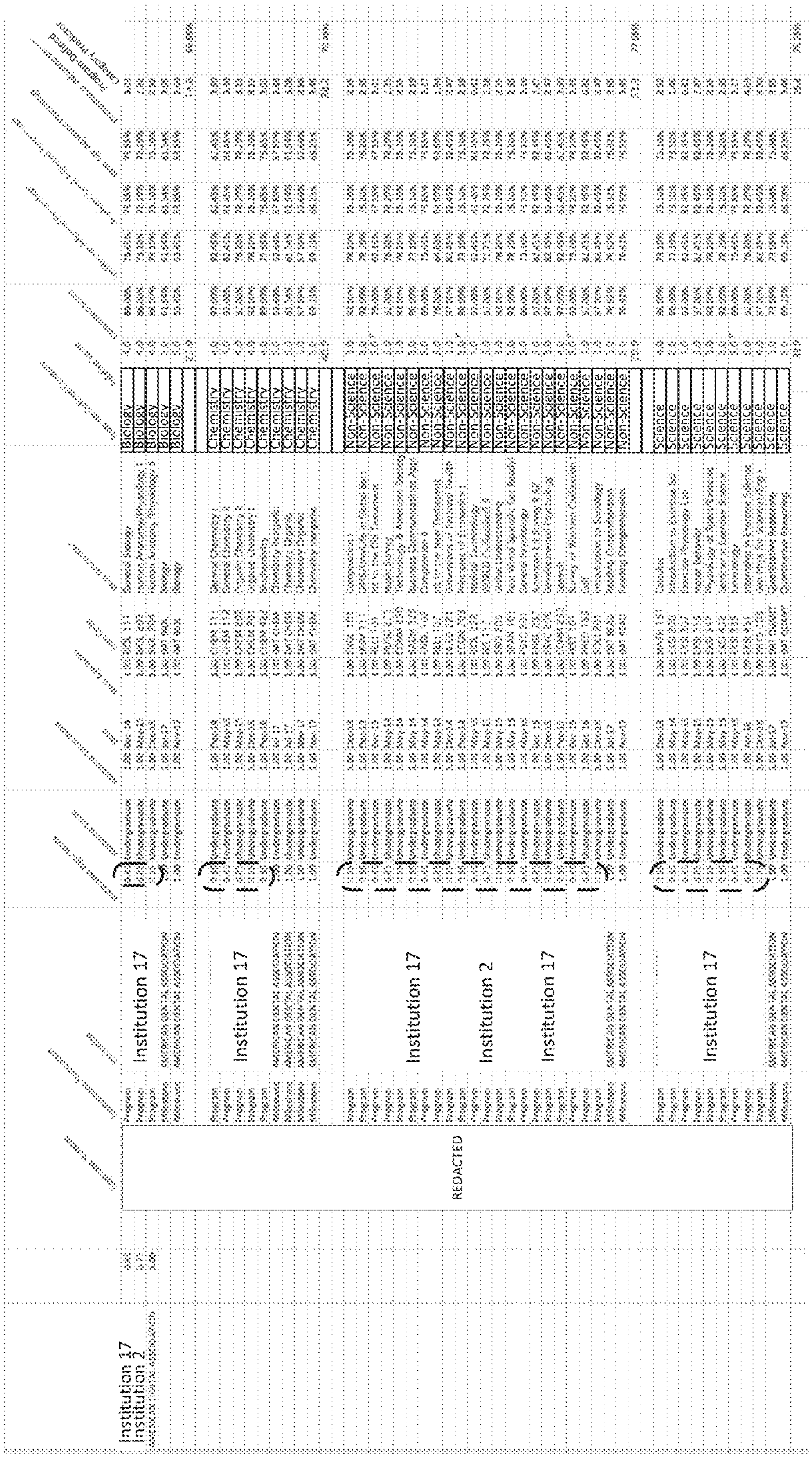
Figure 41A:
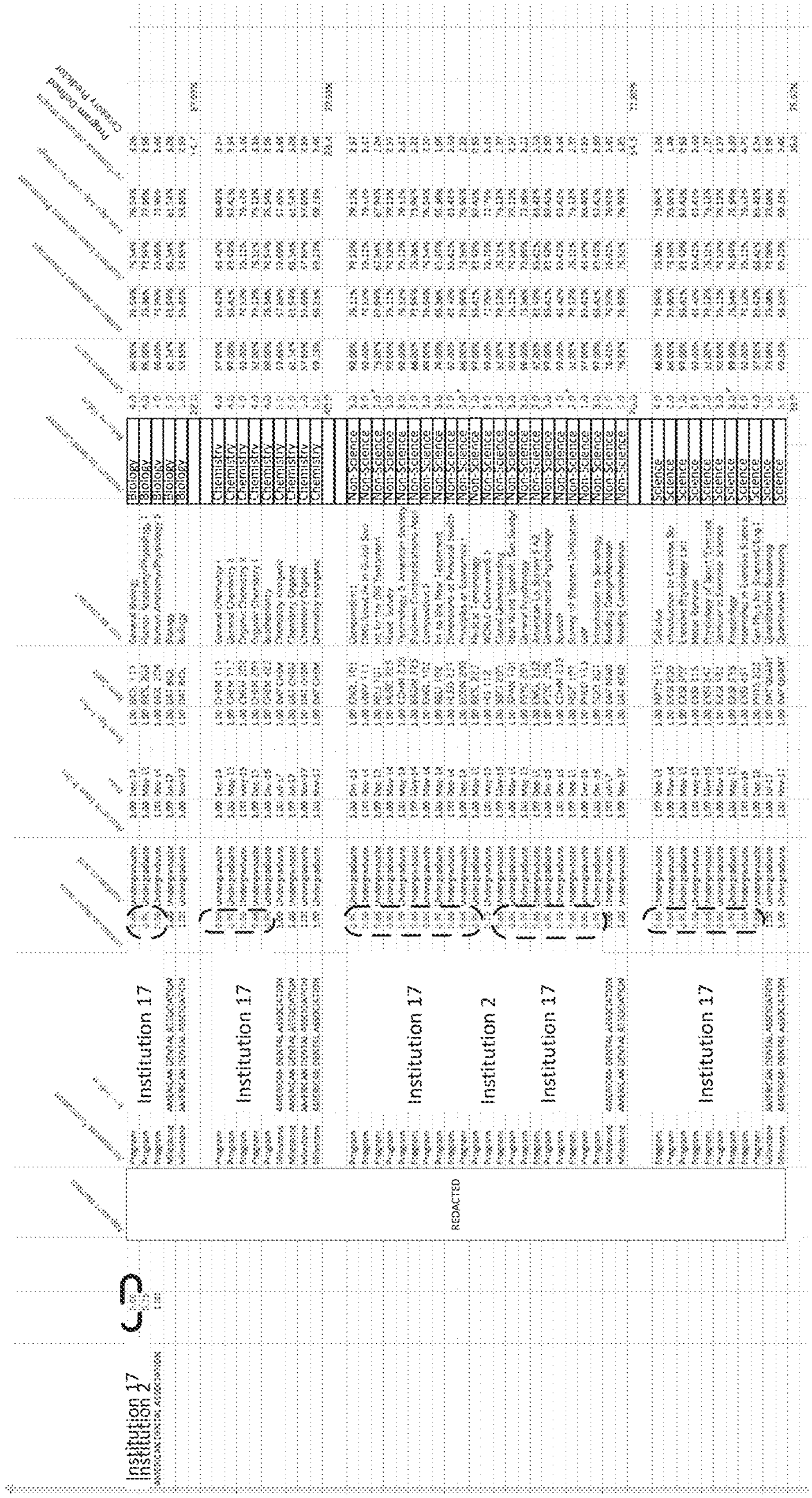
Figure 41B:
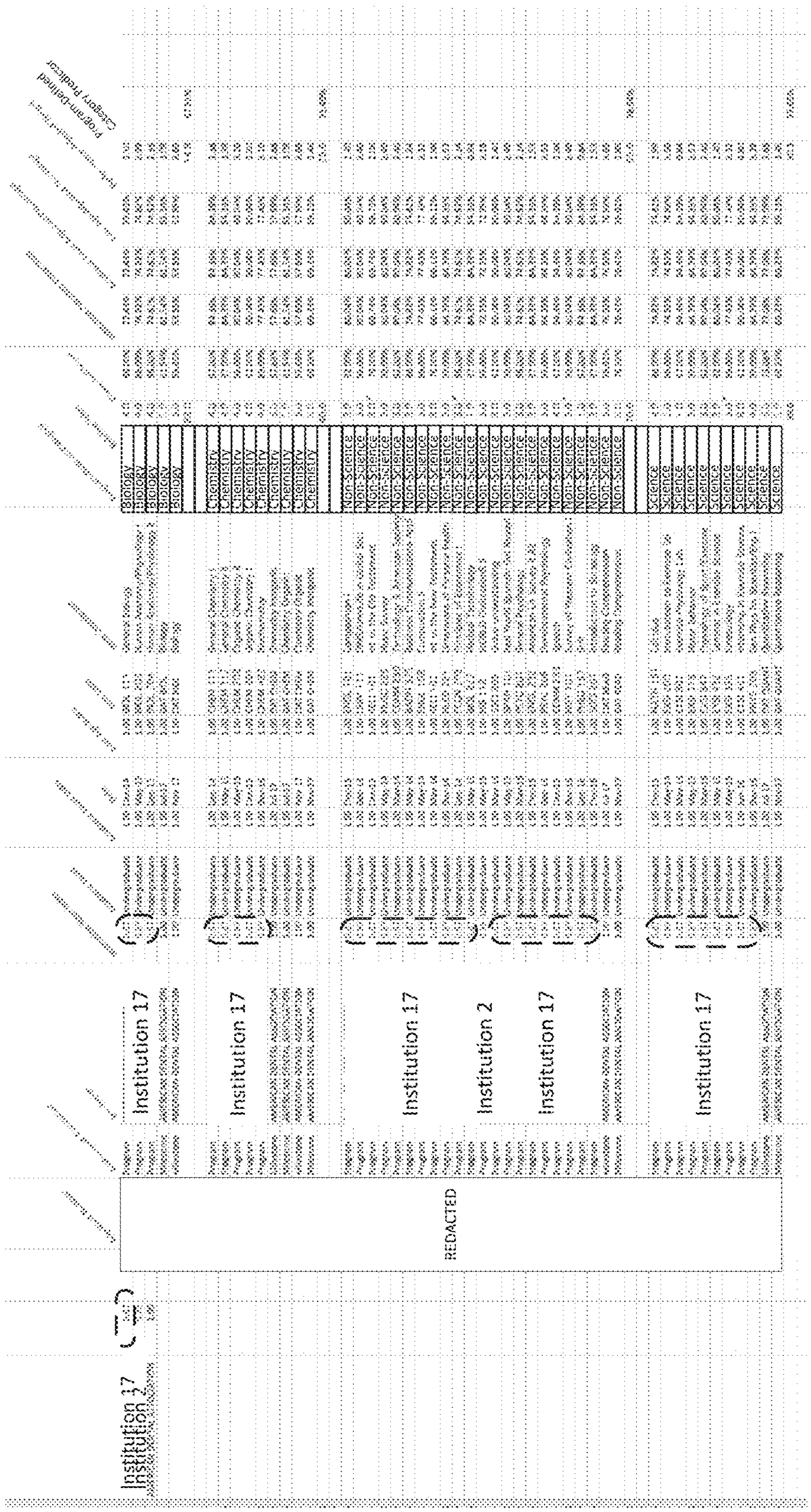
Figure 41C:
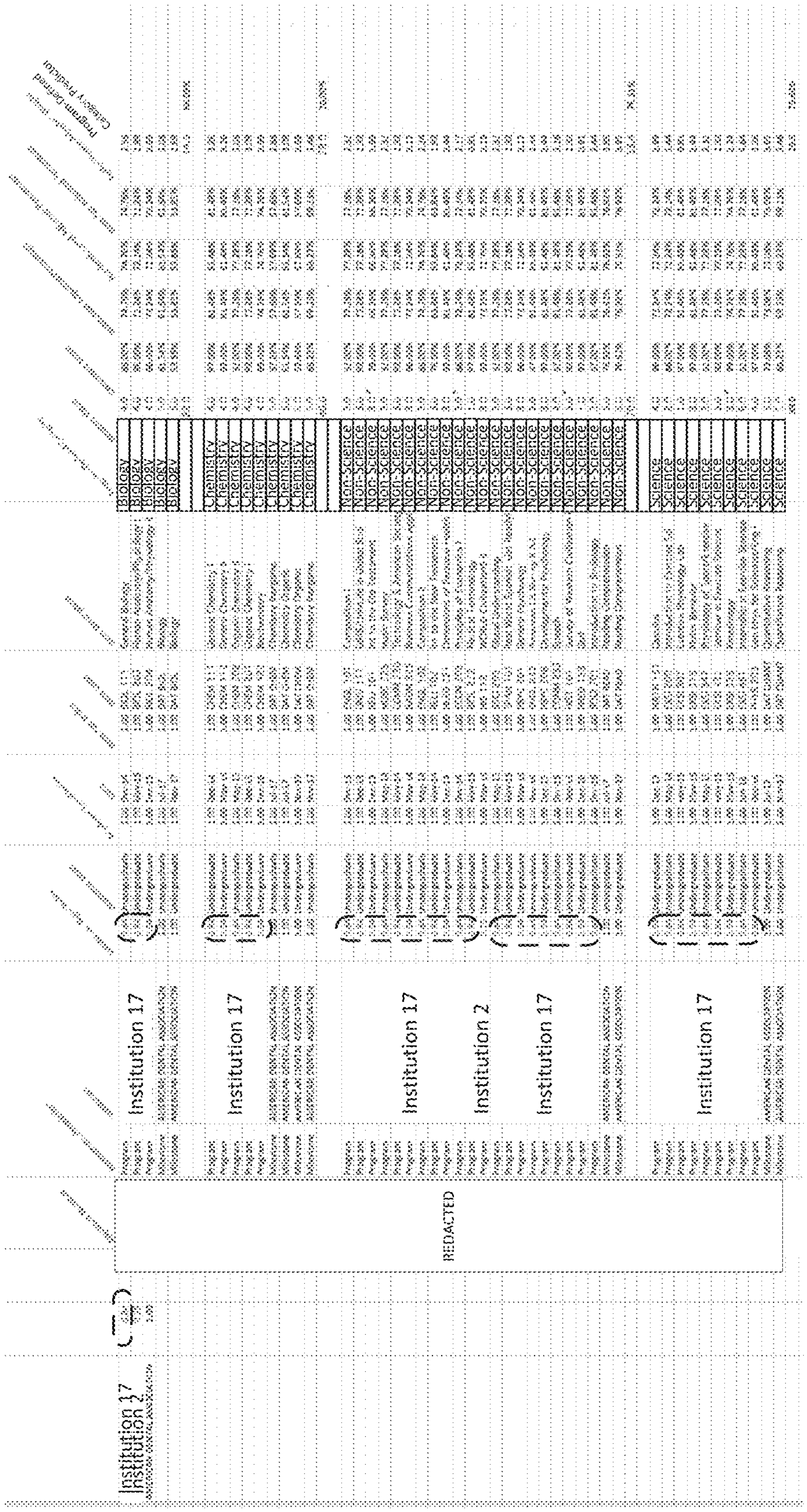

The rigor index for the various institutions associated with the performance data of students who have completed the program may be modified. (FIG. 38, block 720). As noted herein, each institution may be associated with a rigor index. Though the previously-presented figures may document a single applicant and/or student, one of ordinary skill in the art will recognize that there can be hundreds of applicants with mixed institutions. The same institution may provide education to many applicants. Thus, the rigor index may be changed for every student in the cohort associated with a particular institution. The analytics engine may incrementally change the rigor index of each institution for every number in the range between the pre-set upper and lower limits, and may set the rigor index to a determined value for which the R2 value is maximized. Maximizing the R2 value may include repeating the calculations of the linear regression model (e.g., block 640 of FIG. 28) for the various values of the rigor index between the pre-set upper and lower limits. If there is no change to the calculated R2 value when the rigor index is changed, then the pre-set number may be used. FIG. 40 illustrates an identification of a rigor index associated with a particular institution. FIGS. 41*a*-41*c* illustrate the modification of the rigor index for a particular institution according to methods of the present invention.

FIG. 41*a* illustrates the modification of the rigor index for an example institution (e.g., Institution 17) from 0.85 to 0.86, changing the resultant scores for each of the four performance categories.

FIG. 41*b* illustrates a resulting data set when the rigor index is changed from 0.86 to 0.87, which may change the resultant scores for each of the four performance categories.

FIG. 41*c* illustrates a resulting data set when the rigor index is changed from 0.85 to 0.84, which may change the resultant scores for each of the four performance categories. The analytics engine may freeze the rigor index when those students who completed the program that attended that institution get closest to the regression line calculated in block 600.

Relative Value Index Modification

Figure 42:
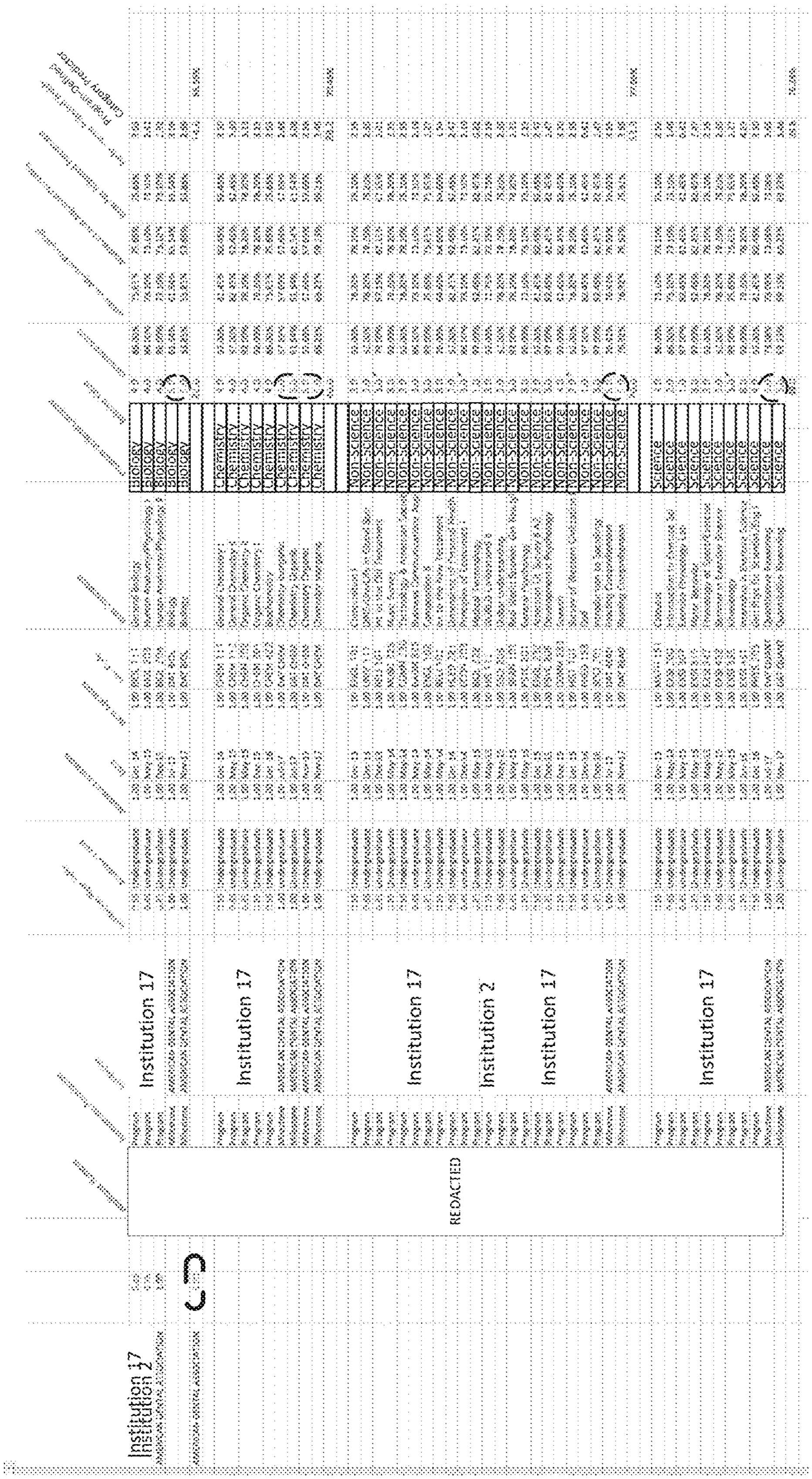
Figure 43A:
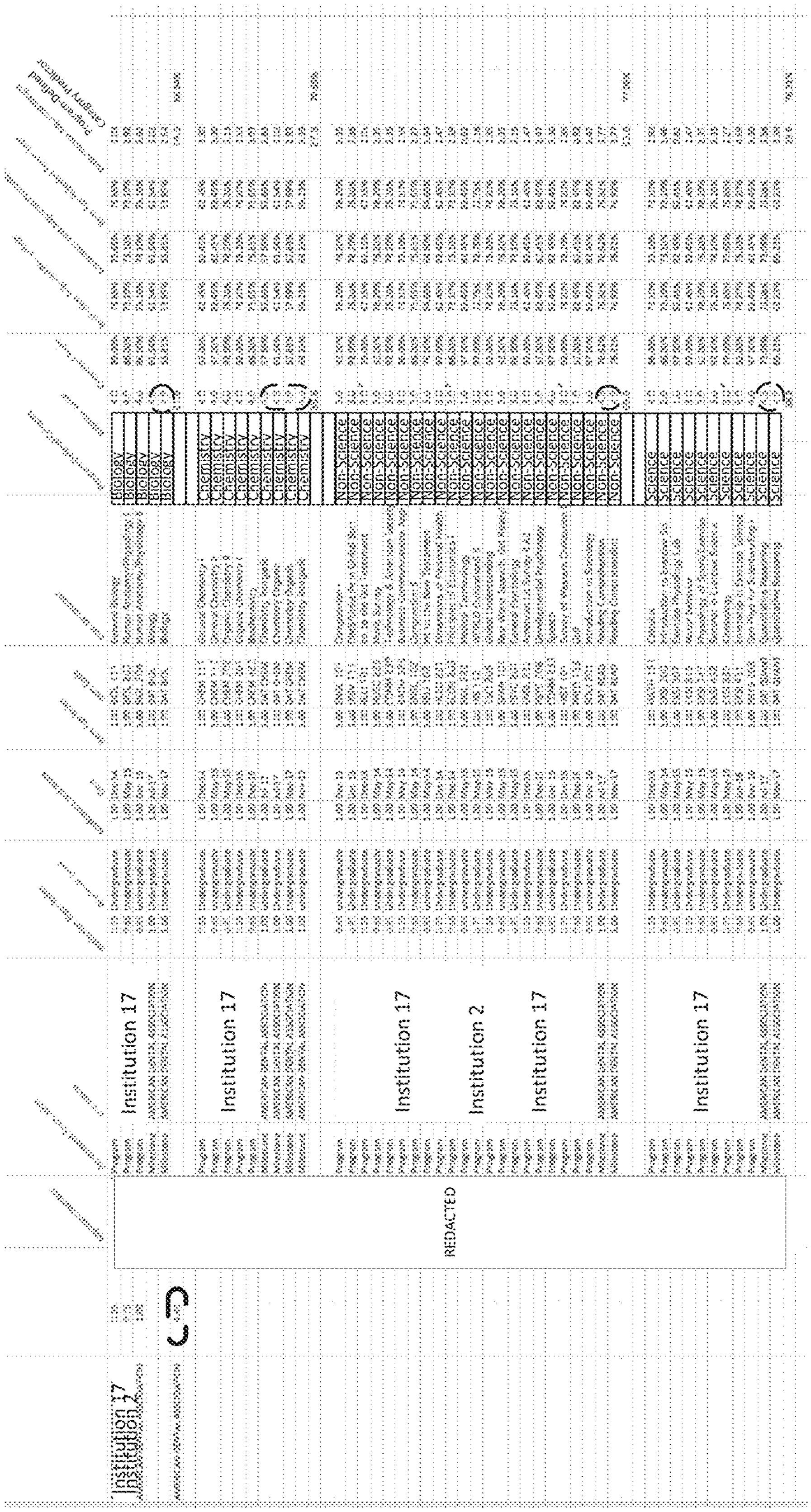
Figure 43B:
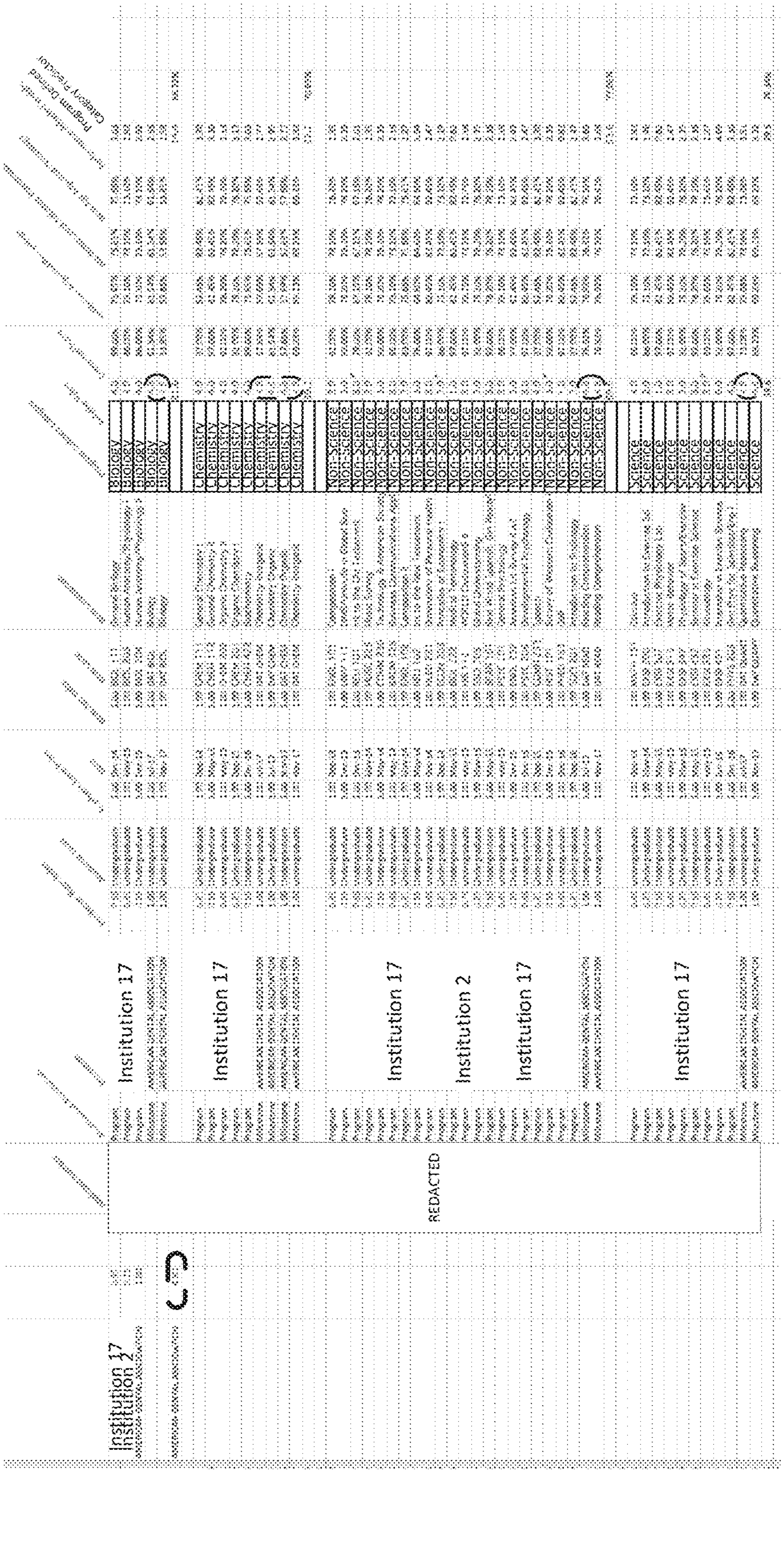

After the rigor index is set for all institutions (block 720), the relative value indices for the items that have a variable setting may be incrementally modified to numbers between the upper and lower limits until the R2 value is maximized (FIG. 38, block 730). In some embodiments, few items may have variable relative value indices (e.g., milestone assessments). Other elements (e.g., program assessments) may have fixed relative value indices. FIG. 42 illustrates an identification of an assessment with a variable relative value index. FIGS. 43*a*-43*c* illustrate the modification of the variable relative value index for a particular institution according to various embodiments described herein. In modifying the relative value index, the institution rigor index may remain at the level determined in block 720.

FIG. 43*a* illustrates the modification of a relative value index from 5.00 to 4.90, which may result in recalculating the scores for all predictor values for each student who completed the program that participated in that item.

FIG. 43*b* illustrates the modification of the relative value index from 4.90 to 4.80, which may be result in recalculating the scores for all predictor values for each student who completed the program that participated in that item. This process may be followed until every relative value index between the pre-set upper and lower limits are tested and the R2 is calculated. The particular relative value index may be frozen when the R2 is maximized.

Academic Level Index Modification

Figure 44:
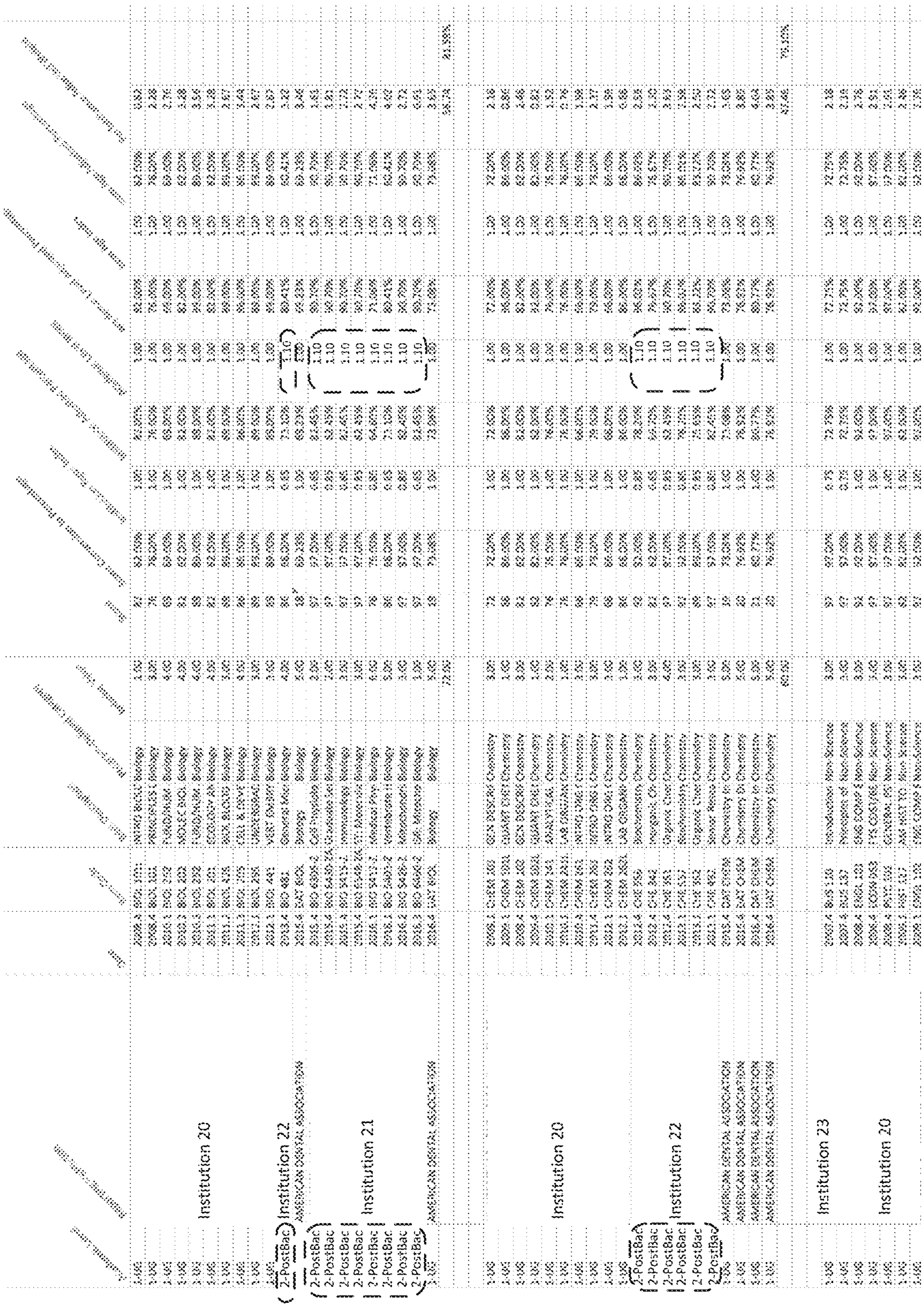

After the relative value for all items with variable values is set (block 730), the academic level index may be incrementally set (FIG. 38, block 740). The base academic level may be one lower than the program being applied to (e.g., undergraduate to postgraduate). However, there may be some applicants who have parallel experiences to the applicant program (e.g., same level). This is why the academic level index may be useful. In some embodiments, if an applicant has performed at the same level as the program that is helpful to predicting success. FIG. 44 indicates the modification of an academic level index for a particular student from those who have completed the program. The incremental adjustment of the academic level index may be repeated to maximize R2 in a manner similar to that discussed herein with respect to the rigor index and/or relative value index. In modifying the academic level index, the institution rigor index and relative value may remain at the levels determined in blocks 720 and 730.

Age Index Modification

After the academic level index for all items with variable values is set (block 740), the item age index may be incrementally set (FIG. 38, block 750). The age index may be a degradation index that reflects the possibility that, if applicants have taken assessments more distant in time than a number of years that is optimal, their long term retention may suffer and affect their performance when needing to use that skill or knowledge in the program. The incremental adjustment of the age index may be repeated to maximize R2 in a manner similar to that discussed herein with respect to the rigor index, relative value index and/or academic level index. In modifying the age index, the institution rigor index, relative value index, and academic level index may remain at the levels determined in blocks 720, 730, and 740.

Predictor Model Adjustment

After the four variable indices which represent predictive parameters of the model have been set (blocks 720, 730, 740, 750), the regression model (FIG. 1, block 600) may be re-run based on the students that have completed the program to yield an adjusted model before new applicants are run through the predictor model for analysis (FIG. 38, block 760).

Referring back to FIG. 1, after adjusting the predictor model (block 700), operations may continue with prediction analysis of new applicants (block 800).

Post-Adjustment Prediction Analysis of New Applicants

Figure 45:
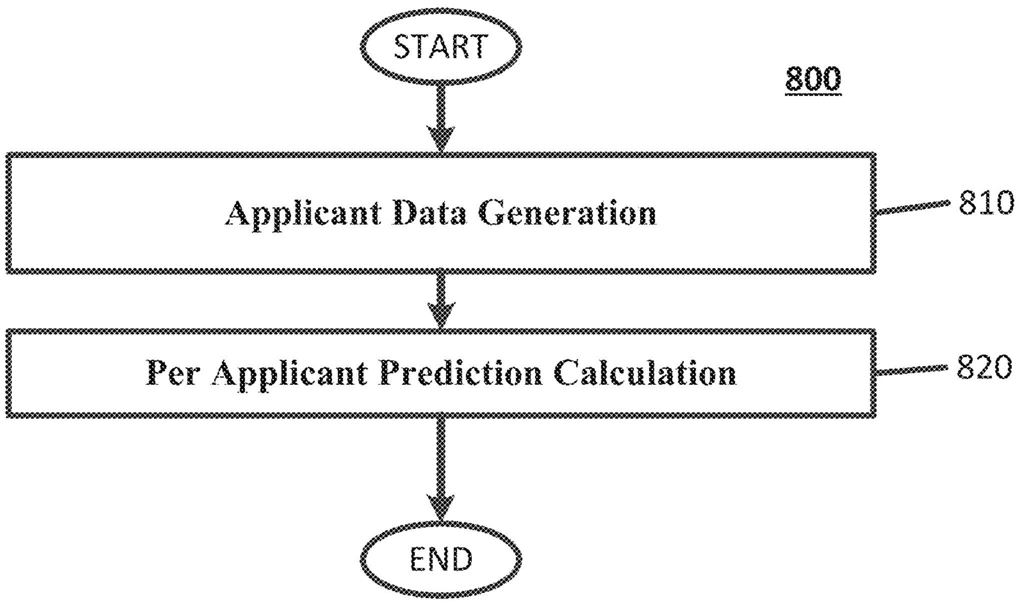
FIG. 45 is a flowchart that illustrates example operations for performing applicant predictions, according to embodiments as described herein.

Methods, systems, and computer program products according to various embodiments described herein may include using the adjusted model that was generated to provide predictions for new applicants (block 800). FIG. 45 illustrates performing applicant predictions, according to embodiments as described herein. As illustrated in FIG. 45, performing applicant predictions may include additional sub-operations (blocks 810, 820), as described further herein. Though the process described herein includes four program-defined categories, one of ordinary skill in the art will understand that the actual number of program-defined categories may vary from analysis to analysis without deviating from the various embodiments described herein.

Applicant Data Generation

Data for each the four program-defined categories for all applicants may be sent for predictor analysis (FIG. 45, block 810). The scores for the program-defined categories may be those generated, for example, as described previously herein (FIG. 1, block 500). FIG. 46 illustrates a set of calculated values for each of the program-defined categories as calculated for a series of applicants. The indices used to generate the data may be those calculated for the adjusted predictor model (e.g., those calculated in blocks 720, 730, 740, and 750).

Per Applicant Prediction Calculation

A prediction for a given applicant may be calculated using the model, including the incrementally-modified values, generated as described herein (FIG. 45, block 810). Performing the prediction may include several subcomponents (blocks 820*a*, 820*b*, 820*c*, 820*d*, 820*e*, 820*f*, 820*g*, 820*h*, and 820*i*), as illustrated in FIG. 47.

Figure 47:
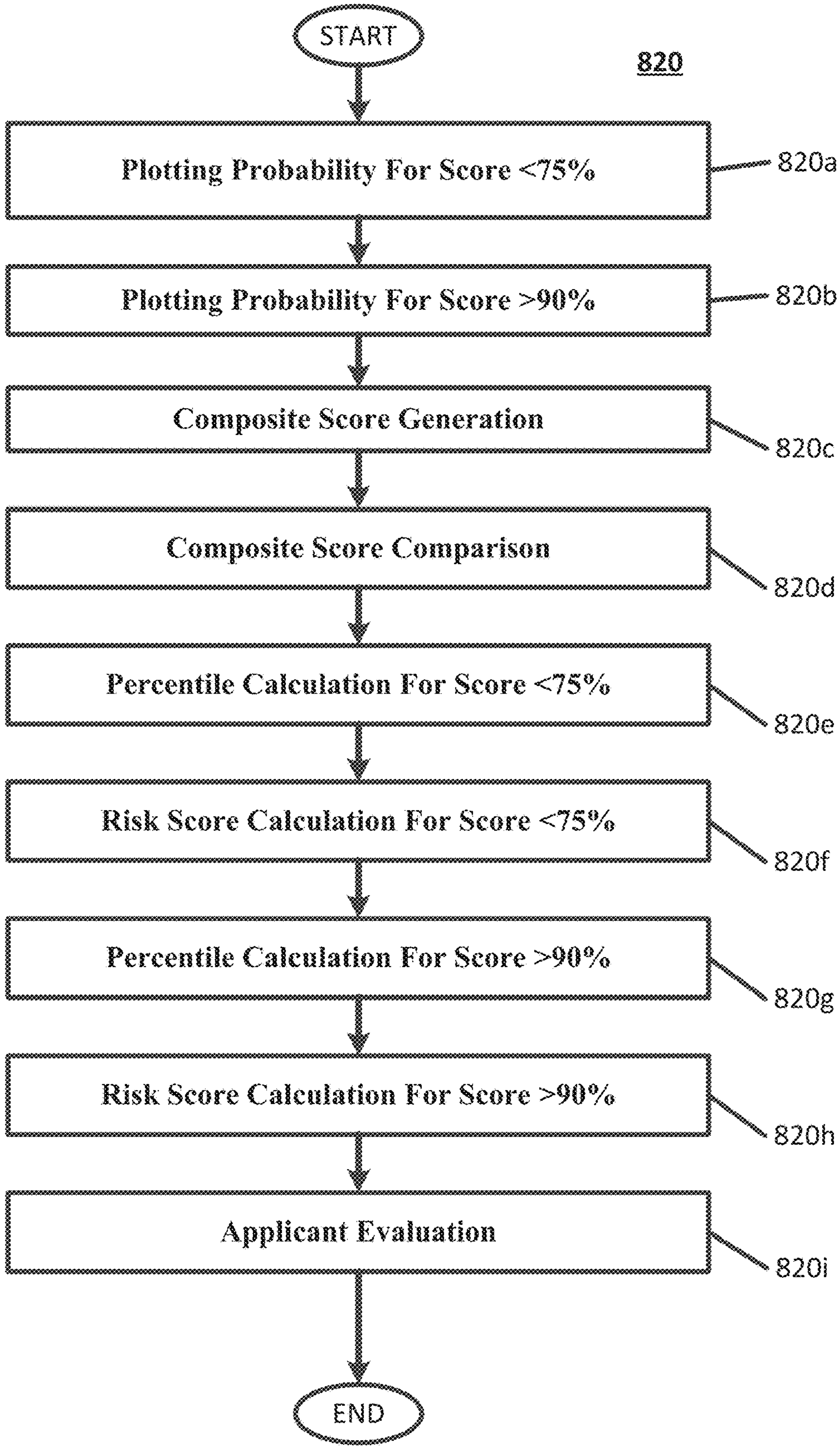
FIG. 47 is a flowchart that illustrates example operations for generating the prediction model for an applicant, according to embodiments as described herein.
Figure 48A:
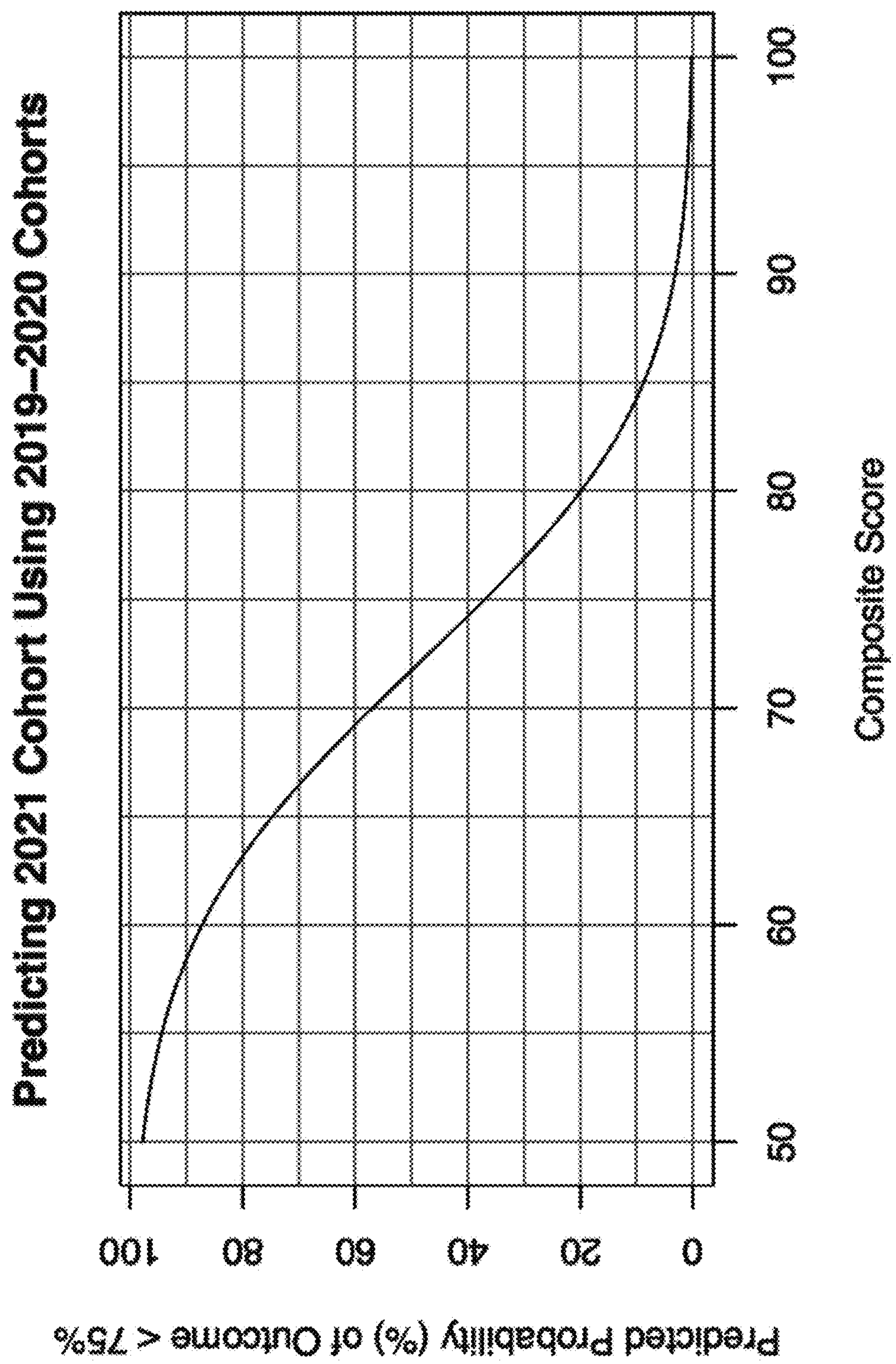
FIGS. 48*a*-48*b* are graphs that illustrate the analysis of composite scores versus a predicted probably of outcome based on the adjusted linear regression model, according to various embodiments described herein.

The predicted probability of scoring less than 75% on program exams may be plotted against the Composite score as calculated from the regression model, for example, a SIR model (FIG. 47, block 820*a*). FIG. 48*a* illustrates that, as the composite score decreases, the chance of failure is increasing.

Figure 48B:
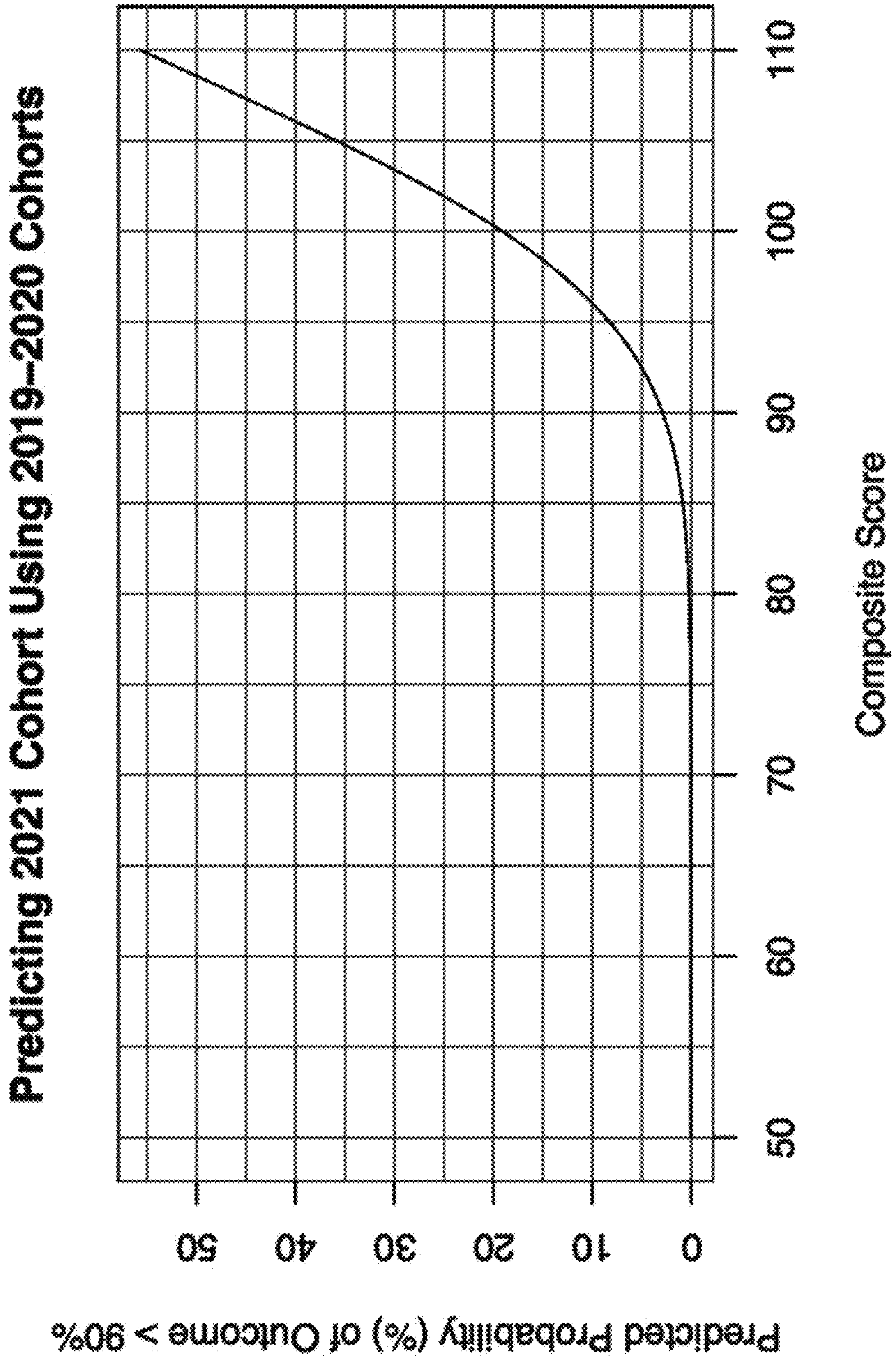

The predicted probability of scoring greater than 90% on program exams may be plotted against the composite score as calculated from the regression model, for example, a SIR model (FIG. 47, block 820*b*). The regression model may be the same or similar regression model that was previously calculated as described herein, such as a SIR model. FIG. 48*b* illustrates that, as the composite score decreases, the chance of failure is increasing.

For each student, a composite score may be generated from the four program-defined categories from the weighted results previously calculated (FIG. 47, block 820*c*). FIG. 48*c* illustrates the generation of the composite score, per applicant, based on the weighted results from the analysis of the completed participant data.

The generated composite score may be compared to the predicted program outcome for the middle 50% student (FIG. 47, block 820*d*). The "middle 50%" student may be the students whose composite scores are approximately in the middle of the range of composite scores for the cohort. FIG. 48*d* illustrates a selection of the group of applicants in the middle of the cohort. The first column is the composite score for the applicant, while the second column is the predicted score on a program exam based on the generated predictor model described herein.

Percentiles for scoring below 75% may be calculated (FIG. 47, block 820*e*). FIG. 48*e* illustrates a data set for the calculated percentiles. The lower 50% means that for all students with that composite score, the model predicts that 50% of them will have an outcome score below the number in the table. The illustrated values for the lower 10%, lower 5% and lower 1% may be similar. The number in the first column of the table (a student number) in FIG. 48*e* refers to the corresponding row in the table of FIG. 48*d*.

The risk score may be calculated for scoring below 75% on program exams (P) (FIG. 47, block 820*f*). FIG. 48*f* illustrates an example of the calculated risk scores.

Percentiles for scoring above 90% may be calculated (FIG. 47, block 820*g*). FIG. 48*g* illustrates a data set for the calculated percentiles. The upper 50% means that for all students with that composite score, the model predicts that 50% of them will have an outcome score below the number in the table. The illustrated values for the upper 10%, upper 5% and upper 1% may be similar.

The risk score may calculated for scoring above 90% on program exams (P) for a given composite score (FIG. 47, block 820*h*). FIG. 48*h* illustrates an example of the calculated risk scores.

The previously described percentile scores may be taken together, and the applicant can be evaluated for the risk of failing and the chance of excelling for the given program (FIG. 47, block 820*i*).

Referring to FIGS. 48*d*, 48*f*, and 48*h*, as an example for an illustrated applicant 15, the data suggests that there is a 31% chance of failing and a 0.0% chance of excelling (as defined by performing above 90% on didactic exams). The data suggests that the most likely score will be a 76.95 (e.g., the last row of FIG. 48*d*). As another example, for applicant 8, the data suggests a 10% chance of failing, and a 1% chance of excelling. The data further suggests that the most likely score will be a 80.07.

Referring back to FIG. 1, after performing the prediction analysis of new applicants (block 800), operations may continue with calculating the additive effects of adding new cohorts (block 900). In some embodiments, a given applicant may be automatically accepted based on the prediction analysis. Automatic acceptance may include altering the application status of the applicant to indicate that the applicant has been accepted into the academic program.

Calculating Additive Effects of Adding New Cohorts

When the current set of applicants are screened and a subset is accepted, their performance may be added to the previous cohorts who were used to predict their cohort to make the next predictions better for subsequent cohorts (FIG. 1, block 900). The process, as described herein, may be repeated for a subsequent cohort.

Figure 49:
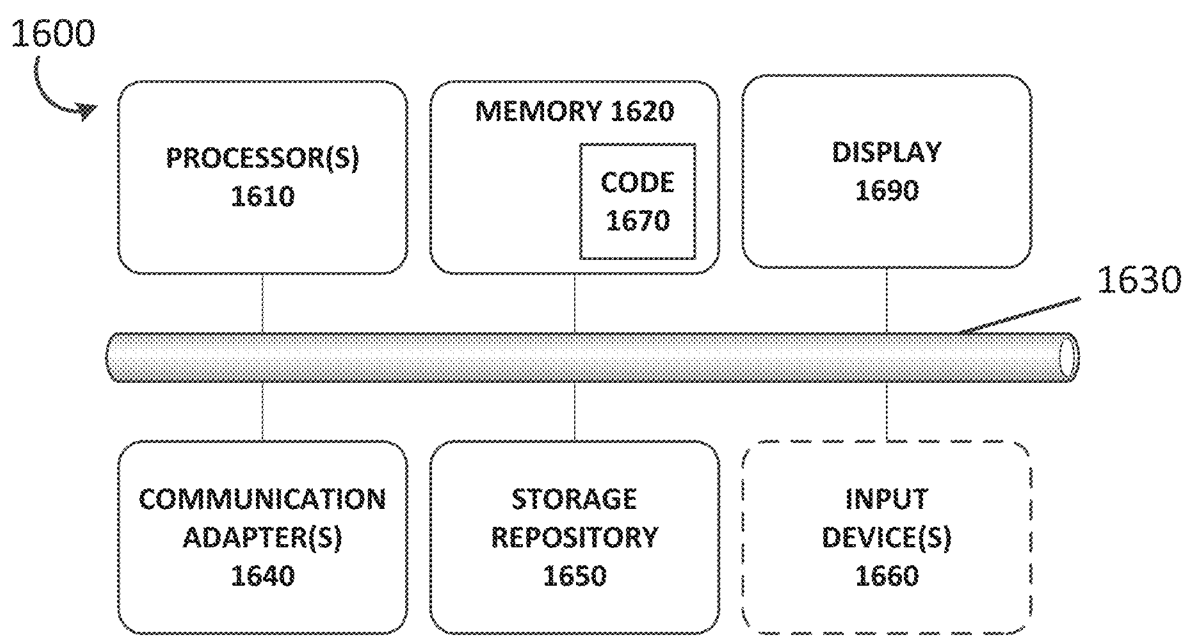
FIG. 49 is a block diagram of an assessment system, according to various embodiments described herein.

FIG. 49 is a block diagram of an assessment system 1600 according to some embodiments of the present invention. The assessment system 1600 may use hardware, software implemented with hardware, firmware, tangible computer-readable storage media having instructions stored thereon and/or a combination thereof, and may be implemented in one or more computer systems or other processing systems. The assessment system 1600 may also utilize a virtual instance of a computer. As such, the devices and methods described herein may be embodied in any combination of hardware and software.

As shown in FIG. 49, the assessment system 1600 may include one or more processors 1610 and memory 1620 coupled to an interconnect 1630. The interconnect 1630 may be an abstraction that represents any one or more separate physical buses, point to point connections, or both connected by appropriate bridges, adapters, or controllers. The interconnect 1630, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

The processor(s) 1610 may be, or may include, one or more programmable general purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or a combination of such or similar devices, which may be collocated or distributed across one or more data networks. The processor 1610 may be configured to execute computer program instructions from the memory 1620 to perform some or all of the operations and methods for one or more of the embodiments disclosed herein.

The assessment system 1600 may also include one or more communication adapters 1640 that may communicate with other communication devices and/or one or more networks, including any conventional, public and/or private, real and/or virtual, wired and/or wireless network, including the Internet. The communication adapters 1640 may include a communication interface and may be used to transfer information in the form of signals between the assessment system 1600 and another computer system or a network (e.g., the Internet). The communication adapters 1640 may include a modem, a network interface (such as an Ethernet card), a wireless interface, a radio interface, a communications port, a PCMCIA slot and card, or the like. These components may be conventional components, such as those used in many conventional computing devices, and their functionality, with respect to conventional operations, is generally known to those skilled in the art.

The assessment system 1600 may further include memory 1620 which may contain program code 1670 configured to execute operations associated with the methods described herein. The memory 1620 may include removable and/or fixed non-volatile memory devices (such as but not limited to a hard disk drive, flash memory, and/or like devices that may store computer program instructions and data on computer-readable media), volatile memory devices (such as but not limited to random access memory), as well as virtual storage (such as but not limited to a RAM disk). The memory 1620 may also include systems and/or devices used for storage of the assessment system 1600.

The assessment system 1600 may also include on or more input device(s) 1660 such as, but not limited to, a mouse, keyboard, camera, and/or a microphone. The input device(s) 1660 may be accessible to the one or more processors 1610 via the system interconnect 1630 and may be operated by the program code 1670 resident in the memory 1620

The assessment system 1600 may also include a display 1690 capable of generating a display image, graphical user interface, and/or visual alert. The display 1690 may provide graphical user interfaces for receiving input, displaying intermediate operations/data, and/or exporting output of the methods described herein.

The assessment system 1600 may also include a storage repository 1650. The storage repository may be accessible to the processor 1610 via the system interconnect 1630 and may additionally store information associated with the assessment system 1600. For example, in some embodiments, the storage repository 1650 may contain accumulated applicant data, historical outcomes, and/or predictor model data as described herein.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A computer program product for assessing a probability of success for applicants to an educational program comprising a non-transitory computer readable storage medium having computer readable program code embodied in the medium that when executed by a processor causes the processor to perform the operations comprising:

obtaining cohort performance data and outcomes for an education program for a plurality of participants of the educational program;

generating a predictor model based on the cohort performance data and the outcomes, the predictor model comprising one or more predictive parameters, each having an upper bound and a lower bound;

changing each of the one or more predictive parameters between the upper bound and the lower bound of the respective predictive parameter to create one or more adjusted predictive parameters and applying the one or more adjusted predictive parameters to the cohort performance data to create an adjusted predictor model based on the outcomes;

obtaining applicant performance data for the applicant;

generating adjusted applicant performance data based on the applicant performance data and the one or more adjusted predictive parameters;

generating a probability of success for the applicant in the educational program based on the adjusted applicant performance data and the adjusted predictor model; and displaying one or more of the adjusted applicant performance data, the adjusted predictor model, the one or more adjusted predictive parameters, and/or the probability of success for the applicant on a graphical interface communicatively coupled to the processor.

2. The computer program product of claim 1, wherein changing each of the one or more predictive parameters between the upper bound and the lower bound of the respective predictive parameter to create the one or more adjusted predictive parameters and applying the one or more adjusted predictive parameters to the cohort performance data to create the adjusted predictor model based on the outcomes comprises:

selecting a plurality of values between the lower bound and the upper bound for each of the one or more predictive parameters, recalculating the predictor model for each of the plurality of values to create predicted outcomes; and creating the adjusted predictor model and the one or more adjusted predictive parameters based on a comparison of the predicted outcomes to the outcomes.

3. The computer program product of claim 1, wherein the one or more predictive parameters comprises a rigor index associated with institutions of the cohort performance data, and wherein at least some of the institutions of the cohort performance data have a different value for the rigor index with higher values corresponding to institutions having higher degrees of educational rigor.

4. The computer program product of claim 3, wherein the one or more predictive parameters further comprise:

a relative value index that indicates a relative weight of a first data entry of the cohort performance data as associated with a second data entry in the cohort performance data;

an academic level index associated with institutions of the cohort performance data; and/or an age index associated with an age of the cohort performance data.

5. The computer program product of claim 1, wherein the operations further comprise:

upon completion of the educational program, adding the applicant performance data and corresponding applicant outcome for the applicant in the educational program to the cohort performance data.

6. The computer program product of claim 1, wherein the applicant performance data comprises a plurality of data entries, each data entry comprising a score, and wherein generating adjusted applicant performance data based on the applicant performance data and the one or more adjusted predictive parameters comprises, for each data entry of the applicant performance data:

converting the score to a percentage; and calculating an institution-adjusted percentage based on the percentage and a rigor index of the one or more adjusted predictive parameters.

7. The computer program product of claim 6, wherein generating adjusted applicant performance data based on the applicant performance data and the one or more adjusted predictive parameters further comprises, for each data entry of the applicant performance data:

calculating an academic level-adjusted percentage based on the institution-adjusted percentage and an academic level index of the one or more adjusted predictive parameters;

calculating an age-adjusted percentage based on the academic level-adjusted percentage and an age index of the one or more adjusted predictive parameters; and calculating a performance adjusted weight based on the age-adjusted percentage and a relative value index of the one or more adjusted predictive parameters.

8. The computer program product of claim 7, wherein the applicant performance data comprises a plurality of data entries, each having one of a plurality of defined categories, and generating adjusted applicant performance data based on the applicant performance data and the one or more adjusted predictive parameters comprises:

grouping the plurality of data entries into a plurality of data entry groups, wherein respective ones of the plurality of data entry groups comprise data entries sharing a common category of the plurality of defined categories; and for each data entry group, calculating a category predictor based on a sum of the performance adjusted weights and the relative value indices of the data entries of the corresponding data entry group.

9. A system for assessing an applicant for an educational program comprising:

a processor; and a memory coupled to the processor and storing computer readable program code that when executed by the processor causes the processor to perform operations comprising:

obtaining cohort performance data and outcomes for the education program for a plurality of participants of the educational program;

generating, by the processor, a predictor model based on the cohort performance data and the outcomes, the predictor model comprising one or more predictive parameters, each having an upper bound and a lower bound;

changing each of the one or more predictive parameters between the upper bound and the lower bound of the respective predictive parameter to create one or more adjusted predictive parameters and applying the one or more adjusted predictive parameters to the cohort performance data to create an adjusted predictor model based on the outcomes;

obtaining applicant performance data for the applicant;

generating adjusted applicant performance data based on the applicant performance data and the one or more adjusted predictive parameters;

generating a probability of success for the applicant in the educational program based on the adjusted applicant performance data and the adjusted predictor model; and displaying one or more of the adjusted applicant performance data, the adjusted predictor model, the one or more adjusted predictive parameters, and/or the probability of success for the applicant on a graphical interface communicatively coupled to the processor.

10. The system of claim 9, wherein the operations performed further comprise automatically altering, by the processor, an application status of the applicant responsive to the probability of success.

11. The system of claim 9, wherein changing each of the one or more predictive parameters between the upper bound and the lower bound of the respective predictive parameter to create the one or more adjusted predictive parameters and applying the one or more adjusted predictive parameters to the cohort performance data to create the adjusted predictor model based on the outcomes comprises:

selecting a plurality of values between the lower bound and the upper bound for each of the one or more predictive parameters, recalculating, by the processor, the predictor model for each of the plurality of values to create predicted outcomes; and creating, by the processor, the adjusted predictor model and the one or more adjusted predictive parameters based on a comparison of the predicted outcomes to the outcomes.

12. The system of claim 9, wherein the one or more predictive parameters comprises a rigor index associated with institutions of the cohort performance data, and wherein at least some of the institutions of the cohort performance data have a different value for the rigor index with higher values corresponding to institutions having higher degrees of educational rigor.

13. The system of claim 12, wherein the one or more predictive parameters further comprise:

a relative value index that indicates a relative weight of a first data entry of the cohort performance data as associated with a second data entry in the cohort performance data;

an academic level index associated with institutions of the cohort performance data; and/or an age index associated with an age of the cohort performance data.

14. The system of claim 9, wherein the operations performed further comprise:

upon completion of the educational program, adding the applicant performance data and corresponding applicant outcome for the applicant in the educational program to the cohort performance data.

15. The system of claim 9, wherein the applicant performance data comprises a plurality of data entries, each data entry comprising a score, and wherein generating adjusted applicant performance data based on the applicant performance data and the one or more adjusted predictive parameters comprises, for each data entry of the applicant performance data:

converting the score to a percentage; and calculating, by the processor, an institution-adjusted percentage based on the percentage and a rigor index of the one or more adjusted predictive parameters.

16. The system of claim 15, wherein generating adjusted applicant performance data based on the applicant performance data and the one or more adjusted predictive parameters further comprises, for each data entry of the applicant performance data:

calculating an academic level-adjusted percentage based on the institution-adjusted percentage and an academic level index of the one or more adjusted predictive parameters;

calculating an age-adjusted percentage based on the academic level-adjusted percentage and an age index of the one or more adjusted predictive parameters; and calculating a performance adjusted weight based on the age-adjusted percentage and a relative value index of the one or more adjusted predictive parameters.

17. A method for evaluating an applicant for an educational program comprising:

obtaining cohort performance data and outcomes for the education program for a plurality of participants of the educational program;

electronically generating a predictor model based on the cohort performance data and the outcomes, the predictor model comprising one or more predictive parameters, each having an upper bound and a lower bound;

electronically changing each of the one or more predictive parameters between the upper bound and the lower bound of the respective predictive parameter to create one or more adjusted predictive parameters and applying the one or more adjusted predictive parameters to the cohort performance data to create an adjusted predictor model based on the outcomes;

obtaining applicant performance data for the applicant;

electronically generating adjusted applicant performance data based on the applicant performance data and the one or more adjusted predictive parameters;

electronically generating a probability of success for the applicant in the educational program based on the adjusted applicant performance data and the adjusted predictor model; and displaying, via a graphical interface, one or more of the adjusted applicant performance data, the adjusted predictor model, the one or more adjusted predictive parameters, and/or the probability of success for the applicant.

18. The method of claim 17, wherein electronically changing each of the one or more predictive parameters between the upper bound and the lower bound of the respective predictive parameter to create the one or more adjusted predictive parameters and applying the one or more adjusted predictive parameters to the cohort performance data to create the adjusted predictor model based on the outcomes comprises:

electronically selecting a plurality of values between the lower bound and the upper bound for each of the one or more predictive parameters, electronically recalculating the predictor model for each of the plurality of values to create predicted outcomes; and creating the adjusted predictor model and the one or more adjusted predictive parameters based on a comparison of the predicted outcomes to the outcomes.

19. The method of claim 17, wherein the one or more predictive parameters comprises a rigor index associated with institutions of the cohort performance data, and wherein at least some of the institutions of the cohort performance data have a different value for the rigor index with higher values corresponding to institutions having higher degrees of educational rigor.

20. The method of claim 17, further comprising automatically electronically altering an application status of the applicant responsive to the probability of success.

21. A system for automatically evaluating applicants to an educational program comprising:

electronically obtaining cohort performance data and outcomes for the education program for a plurality of participants of the educational program;

electronically generating a predictor model based on the cohort performance data and the outcomes, the predictor model comprising one or more predictive parameters including a defined rigor index for each of a plurality of different educational institutions, each predictive parameter having an upper bound and a lower bound, wherein the defined rigor index for one or more of the plurality of different institutions is automatically changeable over time;

electronically changing each of the one or more predictive parameters between the upper bound and the lower bound of the respective predictive parameter to create one or more adjusted predictive parameters and applying the one or more adjusted predictive parameters to the cohort performance data to create an adjusted predictor model based on the outcomes;

obtaining applicant performance data for each of a plurality of different applicants, wherein the plurality of different applicants are from at least some of the plurality of different educational institutions and/or have completed different educational classes;

electronically generating adjusted applicant performance data based on the applicant performance data and the one or more adjusted predictive parameters;

electronically generating a probability of success for the plurality of different applicants in the educational program based on the adjusted applicant performance data and the adjusted predictor model; and displaying, via a graphical interface, the probability of success for the plurality of different applicants.

* * * * *

UNITED STATES PATENT AND TRADEMARK OFFICE

CERTIFICATE OF CORRECTION

PATENT NO. : 11,676,232 B2
APPLICATION NO. : 17/306289
DATED : June 13, 2023
INVENTOR(S) : Robert Todd Watkins, Jr.

It is certified that error appears in the above-identified patent and that said Letters Patent is hereby corrected as shown below:

In the Specification

Column 18, Line 42: Please correct “block 6400.” to read --block 640*f*).--

Signed and Sealed this
Fifteenth Day of August, 2023

Katherine Kelly Vidal

Katherine Kelly Vidal
*Director of the United States Patent and Trademark Office*